US012714255B2

(12) United States Patent
Liu et al.

(10) Patent No.: US 12,714,255 B2
(45) Date of Patent: Aug. 25, 2026

(54) LOCK STRUCTURE AND COOKING APPLIANCE

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Hongyu Liu, Foshan (CN); Xin Zhang, Foshan (CN); Tian Tang, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 1116 days.

(21) Appl. No.: 17/833,135

(22) Filed: Jun. 6, 2022

(65) Prior Publication Data

US 2023/0097653 A1 Mar. 30, 2023

Related U.S. Application Data

(63) Continuation of application No. PCT/CN2021/138661, filed on Dec. 16, 2021.

(30) Foreign Application Priority Data

Sep. 29, 2021 (CN) .......................... 202111150475.5
Sep. 29, 2021 (CN) ........................ 202122376593.X
Sep. 29, 2021 (CN) ......................... 202122379904.8

(51) Int. Cl.
*A47J 36/00* (2006.01)
*E05B 65/00* (2006.01)
(Continued)

(52) U.S. Cl.
CPC ........... *A47J 36/00* (2013.01); *E05B 65/0014* (2013.01); *E05C 1/10* (2013.01); *F24C 15/02* (2013.01); *F24C 15/022* (2013.01)

(58) Field of Classification Search
CPC .......... E05B 65/0014; E05C 1/10; E05C 1/02; B43K 24/08; B43K 24/082; B43K 24/084; B43K 24/086
See application file for complete search history.

(56) References Cited

U.S. PATENT DOCUMENTS

2018/0100657 A1 4/2018 Yantis

FOREIGN PATENT DOCUMENTS

CN 2545313 Y 4/2003
CN 2846654 Y 12/2006
(Continued)

OTHER PUBLICATIONS

International Search Report and Written Opinion dated Jun. 27, 2022 received in International Application No. PCT/CN2021/138661 together with an English language translation.

(Continued)

*Primary Examiner* — John J Norton
*Assistant Examiner* — Dilnessa B Belay
(74) *Attorney, Agent, or Firm* — Scully, Scott, Murphy & Presser, P.C.

(57) ABSTRACT

A lock structure and a cooking appliance are provided. The locking structure a fixing member and a locking assembly. The locking assembly has a mount, a driving member, a first elastic member and a locking member. At least a portion of the driving member is provided within the mount. A first end of the first elastic member is connected to the driving member. The locking member is connected to a second end of the first elastic member. The locking member is capable of moving relative to the mount under the driving of the driving member and the first elastic member, and is locked to or separated from the fixing member.

20 Claims, 24 Drawing Sheets

(51) Int. Cl.

| | |
|---|---|
| ***E05C 1/10*** | (2006.01) |
| ***F24C 15/02*** | (2006.01) |

(56) References Cited

FOREIGN PATENT DOCUMENTS

| | | | | | |
|---|---|---|---|---|---|
| CN | 203704057 | U | | 7/2014 | |
| CN | 110206409 | A | | 9/2019 | |
| CN | 212054229 | U | * | 12/2020 | |
| CN | 212562871 | U | | 2/2021 | |
| CN | 113261794 | A | | 8/2021 | |
| CN | 213927916 | U | | 8/2021 | |
| CN | 214246964 | U | | 9/2021 | |
| CN | 216043211 | U | | 3/2022 | |
| EP | 0859106 | A1 | | 8/1998 | |
| EP | 2489817 | A2 | | 8/2012 | |
| WO | WO-2010076133 | A2 | * | 7/2010 | ............ F24C 15/022 |

OTHER PUBLICATIONS

First office Action dated May 24, 2025 received in Chinese Patent Application No. 202111150475.5.

* cited by examiner

LOCK STRUCTURE AND COOKING APPLIANCE

CROSS-REFERENCE TO RELATED APPLICATIONS

This application is a continuation application of PCT International Patent Application No. PCT/CN2021/138661, filed on Dec. 16, 2021, which claims priority to and benefits of Chinese Patent Application No. 202122376593.X filed with China National Intellectual Property Administration on Sep. 29, 2021, Chinese Patent Application No. 202122379904.8 filed with China National Intellectual Property Administration on Sep. 29, 2021, and Chinese Patent Application No. 202111150475.5 filed with China National Intellectual Property Administration on Sep. 29, 2021, the entire contents of which are herein incorporated by reference for all purposes. No new matter has been introduced.

FIELD

The present disclosure relates to the field of kitchen appliance, and in particular, to a lock structure and a cooking appliance.

BACKGROUND

After cooking is done, a user can directly open a door body assembly of a cooking appliance, and the food cooked at this time tends to be at a higher temperature, with the possibility of scalding the user. Especially after the children cook food with the cooking appliance, accidents are more likely to occur.

In the related art, a key-type lock structure or a snap-type lock structure is used to limit the opening and closing of a door body assembly, but the above-mentioned structure tends to be opened by a user by mistake and thus is not safe.

SUMMARY

The present disclosure aims to solve at least one of the technical problems existing in the prior art.

To this end, a first aspect of the present disclosure provides a lock structure.

A second aspect of the present disclosure provides a cooking appliance.

A third aspect of the present disclosure provides a lock structure.

A fourth aspect of the present disclosure provides a cooking appliance.

The first aspect of the present disclosure provides a lock structure. The lock structure comprises a fixing member and a locking assembly. The locking assembly comprises a mount, a locking member and a first elastic member. At least a portion of the locking member is provided in the mount. The locking member is capable of being provided through a first side of the mount and is locked to or separated from the fixing member. The first elastic member abuts against a second side of the locking member and the mount. The first elastic member is used for keeping the locking member locked to the fixing member.

The lock structure as provided herein comprises a fixing member and a locking assembly. The locking assembly and the fixing member can cooperate to be connected to restrain. For example, the lock structure provided in the present disclosure is applicable to the cooking appliance and is used as a child lock for the cooking appliance.

The locking assembly includes a mount, a locking member, and a first elastic member. The mount can be connected to an external object (such as, a door body assembly or a cavity body assembly of a cooking appliance), thereby securing the mounting of the entire locking assembly. The locking member can be provided through the first side of the mount and locked or disengage from the mount to be connected to restrain. The first elastic member abuts against the locking member and the second side of the mount; further, the first elastic member is in a compressed state, the first elastic member is in a compressed state in the absence of an external force, and the locking member is given a pushing force towards the first side of the mount, such that the locking member penetrates through the first side of the mount. Thus, the locking member can be held in a locked position by the first elastic member, thereby keeping the locking member locked to the fixing member.

For example, in the lock structure provided in the present disclosure, the fixing member and the locking assembly may be respectively mounted to the door body assembly of the cavity body assembly. In this way, when the door body assembly is in a closed state, the locking member is provided through the first side of the mount under the action of the first elastic member and is locked to the fixing member; at this time, the user cannot open the door body assembly. During the process of opening the door body assembly, the locking member needs to be pulled to separate the locking member from the fixing member; in addition, the user needs to open the door body assembly while pulling the locking member. The user can't complete the door opening operation only by pulling the locking member or directly opening the door body assembly. The user releases the locking member after the door body assembly is opened; the first elastic member, now in compression, drives the locking member toward the first side of the mount, thereby restoring the locking member to the locked position.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly and the fixing member, if the user wants to open the door body assembly, it is necessary to pull the locking member while opening the door body assembly. Thus, on the one hand, the user can be prompted, and on the other hand, the children can be prevented from mistakenly opening the door body assembly, which greatly improves the safety of the cooking appliance. Therefore, the present disclosure provides that the lock structure cooperates with the fixing member via the locking assembly so that the user must pull the locking member when removing the connection restraint between the locking member and the fixing member, thereby improving the unlocking difficulty of the lock structure, avoiding the user, especially children, from mistakenly opening the door body assembly, and improving the use security of the cooking appliance using the lock structure.

In some possible designs, the locking member comprises a locking portion capable of being provided through a first side of the mount and being locked to or separated from the fixing member.

In this design, the locking member includes a locking portion. The locking portion is located at an end portion of the locking member and can be provided through the first side of the mount, so that the locking portion protrudes into the fixing opening of the fixing member to achieve locking between the locking member and the fixing member.

In the absence of an external force, the locking portion is located outside the mount under the driving of the first elastic member; at this time, the locking portion can protrude into the fixing opening of the fixing member, thereby achieving the locking restraint between the locking member and the fixing member. During the process of the user opening the door body assembly, the user pulls the locking member so that the locking portion runs towards the inside of the mount; at this time, the locking portion is withdrawn from the fixing opening of the fixing member, and the locking restraint between the locking member and the fixing member is released.

In addition, the user releases the locking member after the door body assembly is opened; at this time, the locking portion extends out of the first side of the mount again by being pushed by the first elastic member and is locked to the fixing member.

In some possible designs, the locking member further comprises a pull-out portion, wherein the pull-out portion is provided through the second side of the mount and is used for driving the locking member to be separated from the fixing member.

In this design, the locking member further includes a pull-out portion. The pull-out portion is provided through the second side of the mount, at least a portion of the pull-out portion is located outside the mount and on an outer surface of the cooking appliance. In this way, when the user wants to open the door body assembly, the locking member is driven toward the inside of the mount by pulling the pull-out portion so that the locking member is withdrawn from the fixing opening of the fixing member, thereby releasing the connection restraint between the locking member and the fixing member.

In addition, after the door body assembly is opened, the user releases the pull-out portion; at this time, the locking portion is again protruded out of the first side of the mount by being pushed by the first elastic member.

In some possible designs, the locking member further comprises a driving inclined surface provided at the locking member and abutting against a fixing member to drive the locking member to move relative to the mount.

In this design, the locking member further comprises a driving inclined surface. After the door body assembly is opened, the locking portion is pushed by the first elastic member to extend out of the first side of the mount again. At this time, the user can directly drive the closing door body assembly without pulling the pull-out portion again during the closing of the door body assembly, which is more convenient for the user.

In the process of closing the door body assembly by the user, the fixing member first comes into contact with the driving inclined surface of the locking portion, and the driving inclined surface decomposes the force applied to the locking portion by the fixing member into a horizontal component force and a vertical component force, wherein the vertical component force can be used to counteract the pushing force applied to the locking member by the first elastic member so that the locking member moves under the action of the above-mentioned vertical component force so that the locking member returns to the inside of the mount. At this time, the user closes the door body assembly.

Subsequently, after the door body assembly is operated to the closed position, the locking member is moved again by the driving of the first elastic member, so that the locking portion is protruded to the outside of the mount and connected with the fixing member.

In some possible designs, the locking member further comprises an abutment portion provided between the locking portion and the pull-out portion, and the first elastic member abuts against the abutment portion and the second side of the mount.

In this design, the locking member further includes an abutment portion. The abutment portion is provided between the locking portion and the pull-out portion; the first elastic member abuts against the abutment portion and the second side of the mount, and the first elastic member is in a compressed state. For example, the abutment portion projects from a sidewall of the locking member to ensure that the first elastic member abuts against the locking member.

Furthermore, the first elastic member abuts against the abutment portion and the second side of the mount such that the first elastic member in a compressed state provides a pushing force to the locking member towards the first side of the mount such that the locking member is held in the locked position by the first elastic member. Thus, the user needs to pull the locking member while opening the door body assembly, and once the user releases the locking member, the locking member returns to the locked position under the action of the first elastic member, further increasing the difficulty of unlocking the door body assembly.

In some possible designs, the lock structure further comprises a second elastic member provided within the mount and abuts a first side of the locking member and the mount, the second elastic member is used for the elastic connection between the locking member and the mount.

In this design, the lock structure further comprises a second elastic member. A second elastic member is provided in the mount, and the second elastic member abuts against a first side of the locking member and the mount, and the second elastic member is used for realizing an elastic connection between the locking member and the mount. For example, the second elastic member abuts against the abutment portion and the first side of the mount, and the first elastic member and the second elastic member abut against both sides of the abutment portion.

The second elastic member abuts against the first side of the locking member and the mount such that the first elastic member cooperates with the second elastic member, further improving the stability of the locking member. For example, in the absence of an external force, the locking member moves toward the side of the second elastic member under the action of the first elastic member and is in the locked position; at this time, the first elastic member and the second elastic member jointly abut against the locking member from opposite directions, ensuring a stable position of the locking member so that the locking member does not shake and move (the second elastic member may be in a compressed state at this time).

In some possible designs, the mount comprises a fixing bracket, wherein the first elastic member abuts against the locking member and the fixing bracket; a first opening provided in the fixing bracket, wherein the locking member penetrates through the first opening; a cover plate connected to the fixing bracket; a second opening provided in the cover plate, and the locking member can be provided through the second opening.

In this design, the mount comprises a fixing bracket, a first opening, a cover plate, and a second opening. The fixing bracket can ensure the stable mounting of the whole locking assembly; the cover plate is connected to the fixing bracket so that the cover plate cooperates with the fixing bracket to ensure components such as the locking member and the first elastic member; the first elastic member abuts against the locking member and the fixing bracket and is in a compressed state, thereby ensuring that the locking member is in a locked state.

In addition, the fixing bracket is provided with a first opening, the cover plate is provided with a second opening, and the first opening is provided corresponding to the second opening. The pull-out portion of the locking member is provided through the first opening and is located on the surface of the cooking appliance; the locking portion of the locking member is driven through the second opening by the first elastic member and protrudes into the fixing opening of the fixing member to complete the limiting of the door body assembly.

A second aspect of the present disclosure provides a cooking appliance comprising: cavity body assembly; a door body assembly connected to the cavity body assembly in an opening and closing manner; a lock structure of any of the above designs. The fixing member is provided on one of the cavity body assembly and the door body assembly, and the locking assembly is provided on the other of the cavity body assembly and the door body assembly.

The cooking appliance of the present disclosure comprises a cavity body assembly, a door body assembly, and a lock structure of any of the designs. The cavity body assembly comprises a cooking cavity, and the cooking cavity is used for placing the food to be cooked; the door body assembly is connected to the cavity body assembly and is used to open or close the cooking cavity. For example, the door body assembly may be rotatably connected to the cavity body assembly or slidably connected to the cavity body assembly. One of the cavity body assembly and door body assembly is provided with the other locking assembly of the fixing member, the cavity body assembly, and the door body assembly, and the locking assembly cooperates with the fixing member to lock the door body assembly to the cavity body assembly. For example, the above-mentioned locking assembly is a child lock and functions as an auxiliary connection.

For example, when the door body assembly is in the closed state, the locking member is provided through the first side of the mount under the action of the first elastic member and is connected to the fixing member; at this time, the user cannot open the door body assembly. During the process of opening the door body assembly, the locking member needs to be pulled to separate the locking member from the fixing member; also, the user needs to open the door body assembly while pulling the locking member. The user can't complete the door opening operation only by pulling the locking member or directly opening the door body assembly. The user releases the locking member after the door body assembly is opened; the first elastic member, now in compression, drives the locking member toward the first side of the mount, thereby restoring the locking member to the locked position.

For example, after the cooking is finished, the temperature of the food in the cooking cavity is high, and at this time, the user directly opens the door body to take out the food with a risk of scalding. Therefore, in the present disclosure, through the cooperation of the above-mentioned locking assembly and the fixing member, if the user wants to open the door body assembly, it is necessary to pull the locking member while opening the door body assembly. Thus, on the one hand, the user can be prompted, and on the other hand, the children can be prevented from mistakenly opening the door body assembly, which greatly improves the safety of the cooking appliance.

Therefore, in the cooking appliance provided in the present disclosure, a pull-out type locking assembly is used to cooperate with a fixing member, and a user must simultaneously pull out the locking member while opening the door body assembly, thereby improving the difficulty of opening the door of the user, avoiding the user, especially children, from mistakenly opening the door body assembly, and improving the use safety of the cooking appliance.

In some possible designs, the cavity body assembly comprises a cavity body; a cover body surrounding at least a portion of the cavity body.

In this design, the cavity body assembly comprises a cavity body and a cover body. The cavity body is provided with a cooking cavity, and the cooking cavity is used for placing the food to be cooked; the cover body surrounds at least a portion of the cavity body, thereby providing good protection for the cavity body. In addition, there is a certain mounting cavity between the cavity body and the cover body so that the relevant components of the cooking appliance are mounted in the mounting cavity between the cavity body and the cover body.

In some possible designs, the door body assembly comprises a door body; a door seal connected to the door body; a lock catch provided in the door body, or the door seal for the open-close connection with the cavity body assembly.

In this design, the door body assembly comprises a door body, a door seal, and a lock catch. The door body is connected with the cavity body assembly and can be used to open or close the cooking cavity; the door seal interfaces with the door body and provides a good seal when the door body closes the cooking cavity to ensure that the cooking cavity seals well during operation. In addition, the locking member is provided with a door body or a door seal, and when the door body closes the cooking cavity, the locking member is connected with the cavity body assembly to ensure an open-close connection between the door body assembly and the cavity body assembly.

For example, in the cooking appliance provided in the present disclosure, the door body assembly comprises a lock catch, and the lock catch is used for connecting with the cavity body assembly, thereby ensuring a stable connection between the door body assembly and the cavity body assembly. That is, the cooking appliance provided in the present disclosure can first ensure the connection between the door body assembly and the cavity body assembly via the lock catch, and then can use the locking assembly as the child lock so that the locking assembly cooperates with the fixing member to further restrict the user from opening the door body assembly.

In some possible designs, the mount is connected to the cavity body based on the locking assembly being provided on the cavity body assembly.

In this design, the fixing member can be provided at the cavity body assembly. When the locking assembly is provided in the cavity body assembly, the mount, which may be the locking assembly, is connected to the cavity body. At this time, the fixing member is provided in the door body assembly, thereby ensuring that the locking assembly corresponds to the position of the fixing member. For example, a fastener such as a screw can be used for connection between the fixing member and the cavity body, or a snap fit may be used.

In addition, the cavity body itself has good strength and hardness, and connecting the mount of the locking assembly with the cavity body can further ensure the secure connection of the locking assembly and improve the stability of cooperation of the locking assembly with the fixing member to extend the service life of the locking assembly and the whole cooking appliance.

For example, the cavity body includes an end plate that is a front panel of the cavity body assembly, and the mount is connected to the end plate of the cavity body.

In some possible designs, the mount is connected to the cover body based on the locking assembly being provided in the cavity body assembly.

In this design, the fixing member can be provided at the cavity body assembly. When the locking assembly is being provided in the cavity body assembly, the mount of the locking assembly can be connected to the cover body. At this time, the fixing member is provided in the door body assembly, thereby ensuring that the locking assembly corresponds to the position of the fixing member. For example, a fastener such as a screw can be used for connection between the mount and the cover body, or a snap fit may be used.

In addition, the cover body has a relatively simple structure, and the mount of the locking assembly is connected to the cover body so that the difficulty of mounting the locking assembly can be reduced, thereby improving the assembly efficiency of the locking assembly and the cooking appliance. Furthermore, the connection between the locking assembly and the cover body can reduce the structural and manufacturing requirements of the cavity body and further improve the manufacturing efficiency of the cavity body.

For example, the cover body includes a top plate, a first side plate, and a second side plate. The first side plate is connected to a first side of the top plate and the second side plate is connected to a second side of the top plate. The mount of the locking assembly is connected to the top plate and is positioned between the first side plate and the second side plate. In this way, the locking assembly is located at the top of the cavity body and a snap-in mounting of the mount is ensured.

In some possible designs, the fixing member is connected to the door body based on the fixing member being provided in the door body assembly.

In this design, the fixing member can be provided at the door body assembly. When the fixing member is provided in the door body assembly, the fixing member can be connected with the door body. At this time, the locking assembly is provided in the cavity body assembly, thereby ensuring that the locking assembly corresponds to the position of the fixing member. For example, a fastener such as a screw can be used for connection between the fixing member and the door body, or a snap fit may be used.

In addition, the door body itself has good strength and hardness, and the connection between the fixing member and the door body can further ensure the secure connection of the fixing member and promote the stability of cooperation of the locking assembly with the fixing member to extend the service life of the fixing member and the whole cooking appliance.

In some possible designs, the fixing member is connected to the door seal based on the fixing member being provided in the door body assembly.

In this design, the fixing member can be provided at the door body assembly. When the fixing member is provided in the door body assembly, the fixing member can be connected with the door seal. At this time, the locking assembly is provided in the cavity body assembly, thereby ensuring that the locking assembly corresponds to the position of the fixing member. For example, a fastener such as a screw can be used for connection between the fixing member and the door seal, or a snap fit may be used.

Additionally, during the use of the cooking appliance, the door seal is in direct contact with the cavity body assembly and is closer to the cavity body assembly than the door body. Thus, mounting the fixing member in the door seal reduces the size requirements for the fixing member and simplifies the construction of the fixing member as well as the entire cooking appliance.

In some possible designs, the fixing member and the door body are of an integrated structure based on the fixing member being provided in the door body assembly.

In this design, the fixing member can be provided at the door body assembly. When a fixing member is provided at the door body assembly, the fixing member and the door body can be an integrated structure. For example, the fixing member and the door body are of an integrated structure, which on the one hand can reduce the use of connectors between the fixing member and the door body, and on the other hand can greatly improve the connection strength between the fixing member and the door body, thereby ensuring the connection stability of the fixing member and the locking member to prolong the service life of the fixing member and the whole cooking appliance.

In some possible designs, the fixing member and the door seal are of an integrated structure based on the fixing member being provided in the door body assembly.

In this design, the fixing member can be provided at the door body assembly. When fixing member is provided at the door body assembly, the fixing member and the door seal can be an integrated structure. For example, the fixing member and the door seal are of an integrated structure, which on the one hand can reduce the use of connectors between the fixing member and the door seal, and on the other hand can greatly improve the connection strength between the fixing member and the door seal, thereby ensuring the connection stability of the fixing member and the locking member to prolong the service life of the fixing member and the whole cooking appliance.

In some possible designs, the fixing member is connected to the cavity body based on the fixing member being provided in the cavity body assembly.

In this design, the fixing member can be provided at the cavity body assembly. When the fixing member is provided in the cavity body assembly, the fixing member can be connected with the cavity body. At this time, the locking assembly is provided in the door body assembly, thereby ensuring that the locking assembly corresponds to the position of the fixing member. For example, a fastener such as a screw can be used for connection between the fixing member and the cavity body, or a snap fit may be used.

In addition, the cavity body itself has good strength and hardness, and the connection between the fixing member and the cavity body can further ensure the secure connection of the fixing member and promote the stability of cooperation of the locking assembly with the fixing member to extend the service life of the fixing member and the whole cooking appliance.

For example, the cavity body includes an end plate, which is a front panel of the cavity body assembly, and the fixing member is connected to the end plate of the cavity body.

In some possible designs, the fixing member is connected to the cover body based on the fixing member being provided in the cavity body assembly.

In this design, the fixing member can be provided at the cavity body assembly. When the fixing member is provided in the cavity body assembly, the fixing member can be connected with the cover body. At this time, the locking assembly is provided in the door body assembly, thereby ensuring that the locking assembly corresponds to the position of the fixing member. For example, a fastener such as a screw can be used for connection between the fixing member and the cover body, or a snap fit may be used.

In addition, the structure of the cover body is relatively simple, and the connection of the fixing member with the cover body can reduce the mounting difficulty of the fixing member, thus improving the assembly efficiency of the locking assembly and the cooking appliance. Furthermore, the connection between the fixing member and the cover body can reduce the structural and manufacturing requirements of the cavity body and further improve the manufacturing efficiency of the cavity body.

For example, the cover comprises a top plate, a first side plate, and a second side plate; the first side plate is connected to a first side of the top plate and the second side plate is connected to a second side of the top plate. A fixing member is connected to the top plate and is positioned between the first side plate and the second side plate. In this way, the fixing member is located at the top of the cavity body.

In some possible designs, the mount is connected to the door body based on the locking assembly being provided on the door body assembly.

In this design, the locking assembly may be provided on the door body assembly. Where the locking assembly is provided on the door body assembly, the mount of the locking assembly can be connected to the door body. At this time, the locking assembly is provided in the cavity body assembly, thereby ensuring that the locking assembly corresponds to the position of the fixing member. For example, a fastener such as a screw can be used for connection between the mount and the door body, or a snap fit may be used.

In addition, the cavity body itself has good strength and hardness, and the mount of the locking assembly is connected to the cavity body so that the secure connection of the locking assembly can be further ensured, and the stability of cooperation of the locking assembly with the fixing member can be improved so that the service life of the locking assembly and the entire cooking appliance can be prolonged.

In some possible designs, the mount is connected to the door seal based on the locking assembly being provided on the door body assembly.

In this design, the locking assembly may be provided on the door body assembly. When the locking assembly is being provided on the door body assembly, the mount of the locking assembly can be connected to the door seal. At this time, the fixing member is provided in the cavity body assembly, thereby ensuring that the locking assembly corresponds to the position of the fixing member. For example, a fastener such as a screw can be used for connection between the mount and the door body, or a snap fit may be used.

Additionally, during the use of the cooking appliance, the door seal is in direct contact with the cavity body assembly and is closer to the cavity body assembly than the door body. Therefore, by mounting the mount of the locking assembly to the door seal, the size requirement of the locking assembly can be reduced, and the structure of the locking assembly and the entire cooking appliance can be simplified.

In some possible designs, the mount is of an integrated structure with the door body based on the locking assembly being provided on the door body assembly.

In this design, the locking assembly may be provided on the door body assembly. The locking assembly is provided in the door body assembly, the mount of the locking assembly may be of an integrated structure with the door body. For example, the mount and the door body are of an integrated structure, which on the one hand can reduce the use of connectors between the mount and the door body, and on the other hand can greatly improve the connection strength between the mount and the door body, thereby ensuring the connection stability of the mount and the locking member to prolong the service life of the mount and the whole cooking appliance.

In some possible designs, the mount and the door seal are of an integrated structure based on the locking assembly being provided on the door body assembly.

In this design, the locking assembly may be provided on the door body assembly. When the locking assembly is being provided on the door body assembly, the mount of the locking assembly can be of an integrated structure with the door seal. For example, the mount and the door seal are of an integrated structure, which on the one hand can reduce the use of connectors between the mount and the door seal, and on the other hand can greatly improve the connection strength between the mount and the door seal, thereby ensuring the connection stability of the mount and the locking member to prolong the service life of the mount and the whole cooking appliance.

In some possible designs, the cooking appliance comprises a wave oven, an oven, a steaming box, or a steaming and roasting integrated machine.

In this design, the cooking appliances provided by the present disclosure include, but are not limited to: a microwave oven, an oven, a steaming box, or a steaming and roasting integrated machine.

A third aspect of the present disclosure provides a lock structure. The lock structure comprises a fixing member and a locking assembly provided on the other of the cavity body assembly and the door body assembly. The locking assembly comprises: a mount; a driving member; a first elastic member and locking member. At least a portion of the driving member is provided within the mount. A first end of the first elastic member is connected to the driving member. The locking member is connected to the second end of the first elastic member. The locking member can move relative to the mount under the driving of the driving member and the first elastic member, and to lock to or separate from the fixing member.

The lock structure as provided herein comprises a fixing member and a locking assembly. The locking assembly and the fixing member can cooperate to play the role of locking to restrain. For example, the lock structure provided in the present disclosure is applicable to the cooking appliance and is used as a child lock for the cooking appliance.

The locking assembly comprises a mount, a driving member, a first elastic member, and a locking member. The mount is mounted to an external object (such as a door body assembly or a cavity body assembly of the cooking appliance). At least a portion of the driving member is provided within the mount, and a first end of the first elastic member is connected to the driving member; a second end of the first elastic member is linked to the locking member. Thus, the driving member may be applied to the locking member via the first elastic member with a pushing force such that the locking member moves relative to the mount driven by the driving member and the first elastic member, thereby causing the locking member to lock with the fixing member through the mount.

In the lock structure provided by the present disclosure, the first elastic member abuts against the driving member and the locking member, thereby achieving a flexible connection between the locking member and the driving member. Thus, in the case where the locking assembly is at the locked position, the locking member can still move towards a side of the driving member due to the presence of the first elastic member.

For example, the fixing member and the locking assembly can be mounted to the cavity body assembly and the door body assembly, respectively so that, once the user inadvertently closes the locking assembly with the door body assembly opened, the fixing member contacts the locking member when the user closes the door body assembly without switching the locking member station, thereby forcing the locking member to move toward a side of the driving member. In this way, on the one hand, the connection for restraining between the locking member and the fixing member can be ensured, and on the other hand, the connection for restraining between the locking member and the fixing member does not require user operation, which greatly improves the convenience of using the locking assembly.

When the door body assembly is in a closed state, the locking member is in a locking station; at this time, the locking member is connected to the fixing member for restraining and the user could not open the door body assembly. The connection for restraining between the locking member and the fixing member is removed before opening the door body assembly; at this time, the locking member is at the unlocking station, and the locking member is separated from the fixing member.

In the process of opening the door body assembly, the door body assembly can be directly driven to separate from the cavity body assembly to complete the door opening operation; at this time, the locking member is still in the unlocking station. In the process of closing the door body assembly, the work position of the locking member can be switched again after the door body assembly is directly closed so that the locking member is connected to the fixing member for restraining. Furthermore, as soon as the user switches the locking member to the locking position when the door body assembly is opened, the first elastic member abuts against the locking member and the driving member so that the locking member and the driving member are elastically connected. In this way, the user does not need to switch the station of the locking member in advance to ensure that the locking member can still lock with the fixing member during the close of the door body assembly.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly and the fixing member, if the user wants to open the door body assembly, it is necessary to pull the locking member while opening the door body assembly. Thus, on the one hand, the user can be prompted, and on the other hand, the children can be prevented from mistakenly opening the door body assembly, which greatly improves the safety of the cooking appliance. Therefore, the lock structure provided in the present disclosure cooperates with the fixing member via the locking assembly to enhance the unlocking difficulty of the lock structure, avoid the user, especially children, from opening the door body assembly by mistake, and improve the use security of the cooking appliance to which the lock structure is applied. Furthermore, the flexible connection between the driving member and the locking member can close the door body assembly without driving the locking member and ensure that the connection between the locking member and the fixing member is restrained even if the user mistakenly switches the locking member to the locking position when the door body assembly is opened.

In some possible designs, the locking assembly further comprises a guide structure provided on the mount, at least a portion of the driving member being movable along the guide structure and restrained at an end of the guide structure.

In this design, the locking assembly further comprises a guide structure. The guide structure is provided inside the mount, and at least a portion of the driving member is slidably connected to the guide structure and is capable of restraining the end portion of the guide structure such that the locking member stays at the locking station.

For example, the end portion of the guide structure is provided with a restraining portion, and at least a portion of the driving member can move along the guide structure; when at least a portion of the driving member moves to the end portion of the guide structure, at least a portion of the driving member abuts against the restraining portion of the guide structure end portion, thereby restraining the locking member to the locked position.

For example, the guide structure comprises a guide rib, and the extending direction of the guide rib coincides with the moving direction of the locking member; at least a portion of the driving member can move along the guide rib and at least a portion of the driving member can abut against the end portion of the guide rib, thereby restraining the locking member to the locked position.

In some possible designs, the driving member comprises a pressing member and a moving member. The pressing member is provided through the mount and is movably connected to the mount. The pressing member comprises a first inclined surface. The moving member is sin sliding connection with the guide structure. The moving member connects with a first end of the first elastic member, and can be restrained to an end portion of the guide structure. The moving member comprises a second inclined surface, and the first inclined surface can abut against the second inclined surface to drive the moving member to drive the locking member to switch the station.

In this design, the driving member comprises a pressing member and a moving member. The pressing member is movably connected to the mount and penetrates through the mount, and at least a portion of the pressing member is located throughout the outside surface of the cooking appliance; during the use of the cooking appliance, the station of the locking member can be switched by pressing the pressing member. The moving member is placed inside the mount and is slidingly connected to the guide structure. In addition, the moving member is connected to the first end of the first elastic member such that the first elastic member is located between the moving member and the locking member. Therefore, during the use of the cooking appliance, the user can press the pressing member, and the pressing member drives the moving member to operate, and the moving member drives the locking member to switch the station via the first elastic member.

The pressing member comprises a first inclined surface and the moving member comprises a second inclined surface. When the user presses the pressing member, the first inclined surface of the pressing member comes in contact with the second inclined surface of the moving member. When the pressing member is pressed for the first time, the moving member will move along the guide structure; when the moving member moves to an end portion of the guide structure, the second inclined surface cooperates with the first inclined surface to drive the moving member to rotate, and the moving member can abut against the restraining portion, and the locking member can be restrained to the locked position. When the pressing member is pressed for a second time, the second inclined surface, in cooperation with the first inclined surface, again drives the moving member into the rotation, at which time the moving member moves in an opposite direction along the guide structure, thereby separating the moving member from the restraining portion, and the locking member is switched from the locked position to the unlocked position.

In some possible designs, the pressing member comprises a key column, a sidewall of the key column is provided with a third protruding portion, and the third protruding portion is used for restraining the key column.

In this design, the pressing member comprises a key column. The sidewall of the key column is provided with a third protruding portion, and the third protruding portion can abut against an end portion of the mount, thereby ensuring that at least a portion of the mounting column is always inside the mount, thereby ensuring that the key column is connected to the mount.

During use, the first elastic member abuts against the locking member and the moving member. In this way, by restraining the abutment portion of the third protruding portion against the mount, it is ensured that the key column does not disengage from the mount under the elastic force action of the first elastic member.

In some possible designs, the moving member comprises a sliding jaw sleeve, a sidewall of the sliding jaw sleeve is provided with a first protruding portion which is slidably connected to the guide structure and can abut against the end portion of the guide structure, and the second inclined surface is provided at the first protruding portion.

In this design, the moving member comprises a sliding jaw sleeve. The sidewall of the sliding jaw sleeve is provided with a first protruding portion which is slidably connected to the guide structure, and the first protruding portion can abut against the end portion of the guide structure, thereby restraining the locking member to the locked position.

For example, the interior of the key column is hollow and at least a portion of the sliding jaw sleeve can extend into the interior of the key column. In addition, the first inclined surface is at an open end of the key column and a second inclined surface is provided at the first protruding portion. When the pressing member is pressed for the first time, the first protruding portion drives the moving member to move along the guide structure; when the moving member moves to an end portion of the guide structure, the second inclined surface cooperates with the first inclined surface to drive the moving member to rotate, and at this time, the first protruding portion can abut against the restraining portion, and the locking member can be restrained to the locked position. When the pressing member is pressed for the second time, the second inclined surface cooperates with the first inclined surface to drive the moving member to rotate again. At this time, the moving member moves in a reverse direction along the guide structure under the action of a first elastic member so that the first protruding portion is separated from the restraining portion, and the locking member is switched from the locked position to the unlocked position.

In some possible designs, the interior of the moving member is hollow, the sidewall of the moving member is provided with a guide groove, and the extending direction of the guide groove is consistent with the moving direction of the locking member; at least a portion of the locking member is located within the moving member, a sidewall of the locking member is provided with a second protruding portion, and the second protruding portion is slidably connected to the guide groove.

In this design, the interior of the moving member is hollow and at least a portion of the locking member is located inside the moving member. In addition, a sidewall of the moving member is provided with a guide groove, and an extending direction of the guide groove is consistent with the moving direction of the locking member; the second protruding portion is provided on the locking member, the second protruding portion is located in the guide groove, and the second protruding portion is slidably connected to the guide groove. In this way, during use, the locking member can move relative to the moving member under the action of the external force, thereby ensuring that even if the user inadvertently closes the locking assembly, the locking member can be retracted into the mount to ensure that the locking member and the fixing member can be connected for restraining.

With the door body assembly opened, the first elastic member abuts against the moving member and the locking member. At this time, the second protruding portion is in the middle of the guide groove or in the first end of the guide groove near the bottom of the mount to ensure that the locking member retracts inside the mount driven by the external force. As a result, the locking member can still lock with the fixing member even if the user inadvertently closes the locking assembly.

In addition, during the movement of the locking member, the second protruding portion moves along the guide groove, and thus plays a certain restraining and guiding role through the cooperation of the second protruding portion and the guide groove to improve the running stability of the locking member.

In some possible designs, the locking member further comprises a driving inclined surface abutting against a fixing member to drive the locking member to move relative to the mount.

In this design, the locking member further comprises a driving inclined surface. After the door body assembly is opened, if the user falsely triggers the locking assembly, the locking member is extended out of the mount. At this time, in the process of closing the door body assembly by the user, the closing of the door body assembly can be directly driven without pressing the pressing member again, which is more convenient for the user operation.

For example, in the process of closing the door body assembly by the user, the fixing member first comes into contact with the driving inclined surface of the locking member, and the driving inclined surface decomposes the force applied to the locking member by the fixing member into a horizontal component force and a vertical component force. The vertical component force can be used to counteract the pushing force applied to the locking member by the first elastic member so that the locking member moves under the action of the above-mentioned vertical component force so that the locking member returns to the inside of the mount. At this time, the user closes the door body assembly.

In some possible designs, the locking assembly further comprises a second elastic member provided in the mount and is connected to the driving member and the mount for moving the locking member back. At least a portion of the first elastic member is located inside the locking member, and the second elastic member is sleeved on the locking member.

In this design, the locking assembly further comprises a second elastic member. The second elastic member is provided within the mount and abuts a moving member of the driving member and a cover plate of the mount. Thus, the stability of the locking member is further improved by the cooperation of the first elastic member and the second elastic member.

During the pressing of the pressing member, the pressing member extrudes the second elastic member before the pressing member contacts the moving member, when the second elastic member is in a compressed state; after the pressing member contacts the moving member, the pressing member extrudes both the first elastic member and the second elastic member while the first elastic member and the second elastic member are in compression.

When the moving member is restrained to the end portion of the guide structure, both the first elastic member and the second elastic member in a compressed state apply a pushing force to the moving member, thereby enabling the moving member to be stably restrained to the end portion of the guide structure. After pressing the pressing member again, the moving member rotates and disengages from an end portion of the guide structure; at this time, the first elastic member and the second elastic member cooperate in compression to move back the moving member to the previous position. In this process, due to the cooperation of the above-mentioned first elastic member and second elastic member, the pushing force to the driving member can be greatly improved, thereby further improving the stability of the locking member.

In some possible designs, the mount comprises a fixing bracket; a third opening provided in the fixing bracket, and the driving member is provided through the third opening; a cover plate connected to the fixing bracket; and a fourth opening provided in the cover plate, wherein the locking member can penetrate through the fourth opening.

In this design, the mount comprises a fixing bracket, a first opening, a cover plate, and a second opening. The fixing bracket can ensure the stable mounting of the whole locking assembly; the cover plate interfaces with the fixing bracket, such that the cover plate mates with the fixing bracket to secure components such as a locking member and a first elastic member.

In addition, the fixing bracket is provided with a first opening, the cover plate is provided with a second opening, and the first opening is provided corresponding to the second opening. The pressing part of the locking member is provided through the first opening and is located on the surface of the cooking appliance; the locking member can be driven by the moving member and the first elastic member through the second opening and into a fixing opening of the fixing member to restrain the door body assembly.

A fourth aspect of the present disclosure provides a cooking appliance. The cooking appliance comprises: a cavity body assembly; a door body assembly that is in an open-close connection with the cavity body assembly; and a lock structure of any of the above designs. The mount is provided on one of the cavity body assembly and the door body assembly and the locking assembly is provided on the other of the cavity body assembly and the door body assembly.

The cooking appliance of the present disclosure comprises a cavity body assembly, a door body assembly, and a lock structure of any of the designs. The cavity body assembly comprises a cooking cavity, and the cooking cavity is used for placing the food to be cooked; the door body assembly is connected to the cavity body assembly and is used to open or close the cooking cavity. For example, the door body assembly may be rotatably connected to the cavity body assembly or slidably connected to the cavity body assembly. One of the cavity body assembly and door body assembly is provided with the other locking assembly of the fixing member, the cavity body assembly, and the door body assembly, and the locking assembly cooperates with the fixing member to lock the door body assembly to the cavity body assembly. For example, the above-mentioned locking assembly is a child lock and functions as an auxiliary connection.

When the door body assembly is in a closed state, the locking member is in a locking station; at this time, the locking member is connected to the fixing member for restraining and the user could not open the door body assembly. The connection for restraining between the locking member and the fixing member is removed before opening the door body assembly; at this time, the locking member is at the unlocking station, and the locking member is separated from the fixing member.

In the process of opening the door body assembly, the door body assembly can be directly driven to separate from the cavity body assembly to complete the door opening operation; at this time, the locking member is still in the unlocking station. In the process of closing the door body assembly, the work position of the locking member can be switched again after the door body assembly is directly closed so that the locking member is connected to the fixing member for restraining.

Furthermore, as soon as the user switches the locking member to the locking position when the door body assembly is opened, the first elastic member abuts against the locking member and the driving member so that the locking member and the driving member are elastically connected. In this way, the user does not need to switch the station of the locking member in advance to ensure that the locking member can still connect with the fixing member for restraining during the close of the door body assembly.

In some possible designs, the cavity body assembly comprises a cavity body and a cover body surrounding at least a portion of the cavity body.

In this design, the cavity body assembly comprises a cavity body and a cover body. The cavity body is provided with a cooking cavity, and the cooking cavity is used for placing the food to be cooked; the cover body surrounds at least a portion of the cavity body, thereby providing good protection for the cavity body. In addition, there is a certain mounting cavity between the cavity body and the cover body, so that the relevant components of the cooking appliance are mounted in the mounting cavity between the cavity body and the cover body.

In some possible designs, the door body assembly comprises a door body; a door seal connected to the door body; and a lock catch provided in the door body, or the door seal for the open-close connection with the cavity body assembly.

In this design, the door body assembly comprises a door body, a door seal, and a lock catch. The door body is connected with the cavity body assembly and can be used to open or close the cooking cavity; the door seal interfaces with the door body and provides a good seal when the door body closes the cooking cavity to ensure that the cooking cavity seals well during operation. In addition, the lock catch is provided with a door body or a door seal to open and close with the cavity body assembly. When the door body closes the cooking cavity, the lock catch connects to the cavity body assembly to ensure the connection between the door body assembly and the cavity body assembly.

In the cooking appliance provided in the present disclosure, the door body assembly comprises a lock catch, and the lock catch is used for connecting with the cavity body assembly, thereby ensuring a stable connection between the door body assembly and the cavity body assembly. That is, the cooking appliance provided in the present disclosure can first ensure the connection between the door body assembly and the cavity body assembly via the lock catch, and then can use the locking assembly as the child lock so that the locking assembly cooperates with the fixing member to further restrict the user from opening the door body assembly.

In some possible designs, the mount is connected to the cavity body based on the locking assembly being provided on the cavity body assembly.

In this design, the locking assembly may be provided in the cavity body assembly. When the locking assembly is provided in the cavity body assembly, the mount, which may be the locking assembly, is connected to the cavity body. At this time, the fixing member is provided in the door body assembly, thereby ensuring that the locking assembly corresponds to the position of the fixing member. For example, a fastener such as a screw can be used for connection between the fixing member and the cavity body, or a snap fit may be used.

In addition, the cavity body itself has good strength and hardness, and connecting the mount of the locking assembly with the cavity body can further ensure the secure connection of the locking assembly and improve the stability of cooperation of the locking assembly with the fixing member to extend the service life of the locking assembly and the whole cooking appliance.

For example, the cavity body includes an end plate that is a front panel of the cavity body assembly, and the mount is connected to the end plate of the cavity body.

In some possible designs, the mount is connected to the cover body based on the locking assembly being provided in the cavity body assembly.

In this design, the fixing member can be provided at the cavity body assembly. When the locking assembly is being provided in the cavity body assembly, the mount of the locking assembly can be connected to the cover body. At this time, the fixing member is provided in the door body assembly, thereby ensuring that the locking assembly corresponds to the position of the fixing member. For example, a fastener such as a screw can be used for connection between the mount and the cover body, or a snap fit may be used.

In addition, the cover body has a relatively simple structure, and the mount of the locking assembly is connected to the cover body so that the difficulty of mounting the locking assembly can be reduced, thereby improving the assembly efficiency of the locking assembly and the cooking appliance. Furthermore, the connection between the locking assembly and the cover body can reduce the structural and manufacturing requirements of the cavity body and further improve the manufacturing efficiency of the cavity body.

For example, the cover body includes a top plate, a first side plate, and a second side plate. The first side plate is connected to a first side of the top plate and the second side plate is connected to a second side of the top plate. The mount of the locking assembly is connected to the top plate and is positioned between the first side plate and the second side plate. In this way, the locking assembly is located at the top of the cavity body and a snap-in mounting of the mount is ensured.

In some possible designs, the fixing member is connected to the door body based on the fixing member being provided in the door body assembly.

In this design, the fixing member can be provided at the door body assembly. When the fixing member is provided in the door body assembly, the fixing member can be connected with the door body. At this time, the locking assembly is provided in the cavity body assembly, thereby ensuring that the locking assembly corresponds to the position of the fixing member. For example, a fastener such as a screw can be used for connection between the fixing member and the door body, or a snap fit may be used.

In addition, the door body itself has good strength and hardness, and the connection between the fixing member and the door body can further ensure the secure connection of the fixing member and promote the stability of cooperation of the locking assembly with the fixing member to extend the service life of the fixing member and the whole cooking appliance.

In some possible designs, the fixing member is connected to the door seal based on the fixing member being provided in the door body assembly.

In this design, the fixing member can be provided at the door body assembly. When the fixing member is provided in the door body assembly, the fixing member can be connected with the door seal. At this time, the locking assembly is provided in the cavity body assembly, thereby ensuring that the locking assembly corresponds to the position of the fixing member. For example, a fastener such as a screw can be used for connection between the fixing member and the door seal, or a snap fit may be used.

Additionally, during the use of the cooking appliance, the door seal is in direct contact with the cavity body assembly and is closer to the cavity body assembly than the door body. Thus, mounting the fixing member in the door seal reduces the size requirements for the fixing member and simplifies the construction of the fixing member as well as the entire cooking appliance.

In some possible designs, the fixing member and the door body are of an integrated structure based on the fixing member being provided in the door body assembly.

In this design, the fixing member can be provided at the door body assembly. When a fixing member is provided at the door body assembly, the fixing member and the door body can be an integrated structure. For example, the fixing member and the door body are of an integrated structure, which on the one hand can reduce the use of connectors between the fixing member and the door body, and on the other hand can greatly improve the connection strength between the fixing member and the door body, thereby ensuring the connection stability of the fixing member and the locking member to prolong the service life of the fixing member and the whole cooking appliance.

In some possible designs, the fixing member and the door seal are of an integrated structure based on the fixing member being provided in the door body assembly.

In this design, the fixing member can be provided at the door body assembly. When fixing member is provided at the door body assembly, the fixing member and the door seal can be an integrated structure. For example, the fixing member and the door seal are of an integrated structure, which on the one hand can reduce the use of connectors between the fixing member and the door seal, and on the other hand can greatly improve the connection strength between the fixing member and the door seal, thereby ensuring the connection stability of the fixing member and the locking member to prolong the service life of the fixing member and the whole cooking appliance.

In some possible designs, the fixing member is connected to the cavity body based on the fixing member being provided in the cavity body assembly.

In this design, the fixing member can be provided at the cavity body assembly. When the fixing member is provided in the cavity body assembly, the fixing member can be connected with the cavity body. At this time, the locking assembly is provided in the door body assembly, thereby ensuring that the locking assembly corresponds to the position of the fixing member. For example, a fastener such as a screw can be used for connection between the fixing member and the cavity body, or a snap fit may be used.

In addition, the cavity body itself has good strength and hardness, and the connection between the fixing member and the cavity body can further ensure the secure connection of the fixing member and promote the stability of cooperation of the locking assembly with the fixing member to extend the service life of the fixing member and the whole cooking appliance.

In some possible designs, the fixing member is connected to the cover body based on the fixing member being provided in the cavity body assembly.

In this design, the fixing member can be provided at the cavity body assembly. When the fixing member is provided in the cavity body assembly, the fixing member can be connected with the cover body. At this time, the locking assembly is provided in the door body assembly, thereby ensuring that the locking assembly corresponds to the position of the fixing member. For example, a fastener such as a screw can be used for connection between the fixing member and the cover body, or a snap fit may be used.

In addition, the structure of the cover body is relatively simple, and the connection of the fixing member with the cover body can reduce the mounting difficulty of the fixing member, thus improving the assembly efficiency of the locking assembly and the cooking appliance. Furthermore, the connection between the fixing member and the cover body can reduce the structural and manufacturing requirements of the cavity body and further improve the manufacturing efficiency of the cavity body.

For example, the cover comprises a top plate, a first side plate, and a second side plate; the first side plate is connected to a first side of the top plate and the second side plate is connected to a second side of the top plate. A fixing member is connected to the top plate and is positioned between the first side plate and the second side plate. In this way, the fixing member is located at the top of the cavity body.

In some possible designs, the mount is connected to the door body based on the locking assembly being provided on the door body assembly.

In this design, the locking assembly may be provided on the door body assembly. Where the locking assembly is provided on the door body assembly, the mount of the locking assembly can be connected to the door body. At this time, the locking assembly is provided in the cavity body assembly, thereby ensuring that the locking assembly corresponds to the position of the fixing member. For example, a fastener such as a screw can be used for connection between the mount and the door body, or a snap fit may be used.

In addition, the cavity body itself has good strength and hardness, and the mount of the locking assembly is connected to the cavity body so that the secure connection of the locking assembly can be further ensured, and the stability of cooperation of the locking assembly with the fixing member can be improved so that the service life of the locking assembly and the entire cooking appliance can be prolonged.

In some possible designs, the mount is connected to the door seal based on the locking assembly being provided on the door body assembly.

In this design, the locking assembly may be provided on the door body assembly. When the locking assembly is being provided on the door body assembly, the mount of the locking assembly is connected to the door seal. At this time, the fixing member is provided in the cavity body assembly, thereby ensuring that the locking assembly corresponds to the position of the fixing member. For example, a fastener such as a screw can be used for connection between the mount and the door body, or a snap fit may be used.

Additionally, during the use of the cooking appliance, the door seal is in direct contact with the cavity body assembly and is closer to the cavity body assembly than the door body. Therefore, by mounting the mount of the locking assembly to the door seal, the size requirement of the locking assembly can be reduced, and the structure of the locking assembly and the entire cooking appliance can be simplified.

In some possible designs, the mount is of an integrated structure with the door body based on the locking assembly being provided on the door body assembly.

In this design, the locking assembly may be provided on the door body assembly. The locking assembly is provided in the door body assembly, the mount of the locking assembly may be of an integrated structure with the door body. For example, the mount and the door body are an integrated structure, which on the one hand can reduce the use of connectors between the mount and the door body, and on the other hand can greatly improve the connection strength between the mount and the door body, thereby ensuring the connection stability of the mount and the locking member to prolong the service life of the mount and the whole cooking appliance.

In some possible designs, the mount and the door seal are of unitary construction based on the locking assembly being provided on the door body assembly.

In this design, the locking assembly may be provided on the door body assembly. When the locking assembly is being provided on the door body assembly, the mount of the locking assembly can be of an integrated structure with the door seal. For example, the mount and the door seal are an integrated structure, which on the one hand can reduce the use of connectors between the mount and the door seal, and on the other hand can greatly improve the connection strength between the mount and the door seal, thereby ensuring the connection stability of the mount and the locking member to prolong the service life of the mount and the whole cooking appliance.

In some possible designs, the cooking appliance comprises a wave oven, an oven, a steaming box, or a steaming and roasting integrated machine.

In this design, the cooking appliances provided by the present disclosure include, but are not limited to: a microwave oven, an oven, a steaming box, or a steaming and roasting integrated machine.

Additional aspects and advantages of the present disclosure will be set forth in part in the description which follows, and in part will be obvious from the description, or may be learned by practice of the present disclosure.

BRIEF DESCRIPTION OF THE DRAWINGS

The above and/or additional aspects and advantages of the present disclosure will become apparent and readily appreciated from the following description of embodiments taken in conjunction with the accompanying drawings of which.

The corresponding relationship between the reference signs and the component names in FIGS. 1 to 46 is provided as follows:

100 cooking appliance, 102 cavity body assembly, 104 door body assembly, 106 fixing member, 108 locking assembly, 110 mount, 112 locking member, 114 first elastic member, 116 locking portion, 118 pull-out portion, 120 driving inclined surface, 122 abutment portion, 124 second elastic member, 126 fixing bracket, 128 first opening, 130 cover plate, 132 second opening, 134 cavity body, 136 cover body, 138 door body, 140 door seal, 142 lock catch, 144 fastener, 146 fixing opening, 150 end plate, 152 top plate, 154 first side plate, 156 second side plate, 158 insertion opening, 160 driving member, 162 guide structure, 164 pressing member, 166 moving member, 168 first inclined surface, 170 second inclined surface, 172 first protruding portion, 174 second first protruding portion, 176 third first protruding portion, 178 guide groove.

DETAILED DESCRIPTION OF THE DISCLOSURE

In order that the above objects, features, and advantages of the present disclosure can be more clearly understood, the present disclosure will be described in further detail below with reference to the accompanying drawings and detailed description. It should be noted that the embodiments and features of the embodiments of the present disclosure may be combined with each other without conflict.

In the following description, numerous specific details are set forth in order to provide a thorough understanding of the present disclosure, however, the present disclosure may be practiced otherwise than as specifically described herein and, therefore, the scope of the present disclosure is not limited by the embodiments disclosed below.

Lock structures and cooking appliances 100 provided according to some embodiments of the present disclosure are described below with reference to FIGS. 1 to 46.

Figure 2:
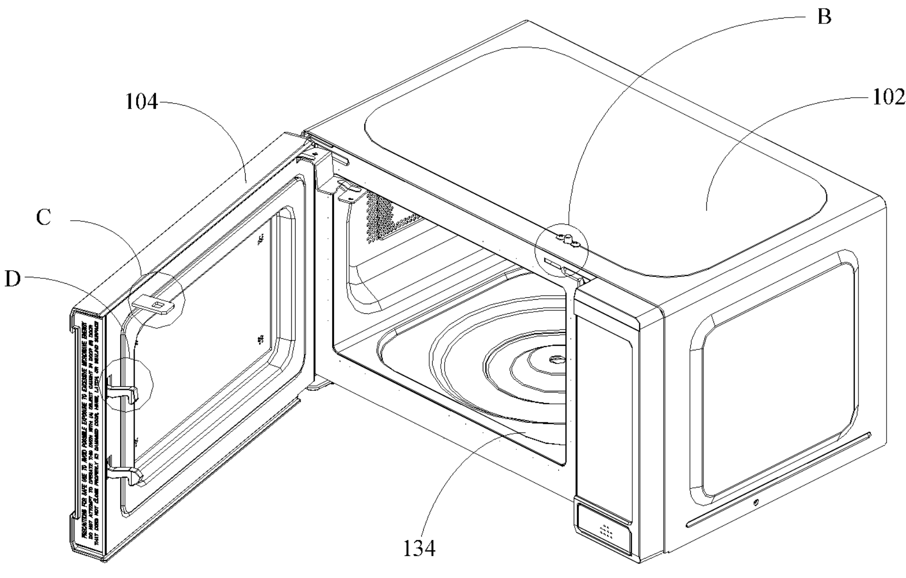
FIG. 2 is a second structural view of a cooking appliance according to an embodiment of the present disclosure (a door body assembly is opened)
Figure 3:
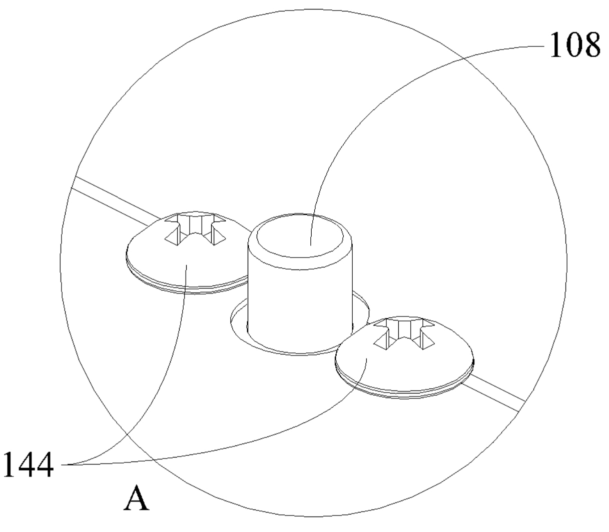
FIG. 3 is a partially enlarged view at A of the cooking appliance shown in FIG. 1.
Figure 4:
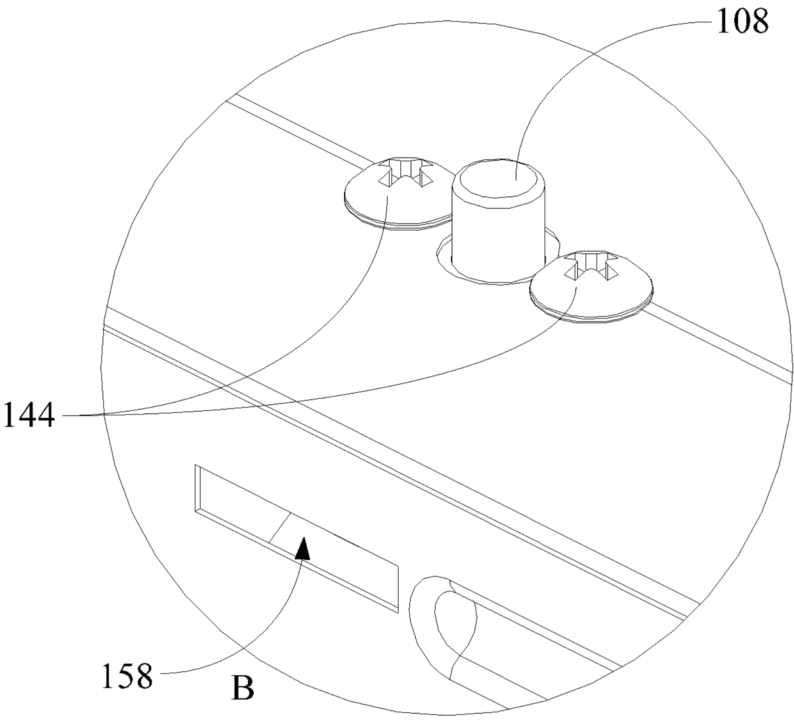
FIG. 4 is a partially enlarged view at B of the cooking appliance shown in FIG. 2.
Figure 5:
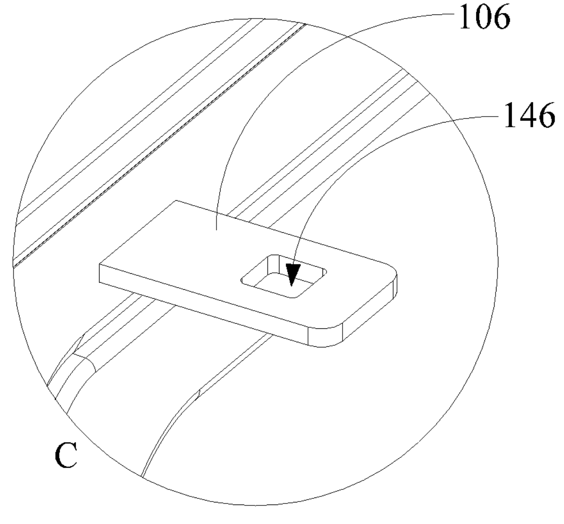
FIG. 5 is a partially enlarged view at C of the cooking appliance shown in FIG. 2.

As shown in FIGS. 3, 4, and 5, a first embodiment of the first aspect of the present disclosure provides a lock structure comprising a fixing member 106 and a locking assembly 108. The locking assembly 108 may cooperate with the fixing member 106 to be connected to restrain. For example, as shown in FIGS. 1 and 2, the lock structure provided in the present disclosure can be applied to a cooking appliance 100 and used as a child lock of the cooking appliance 100.

Figure 7:
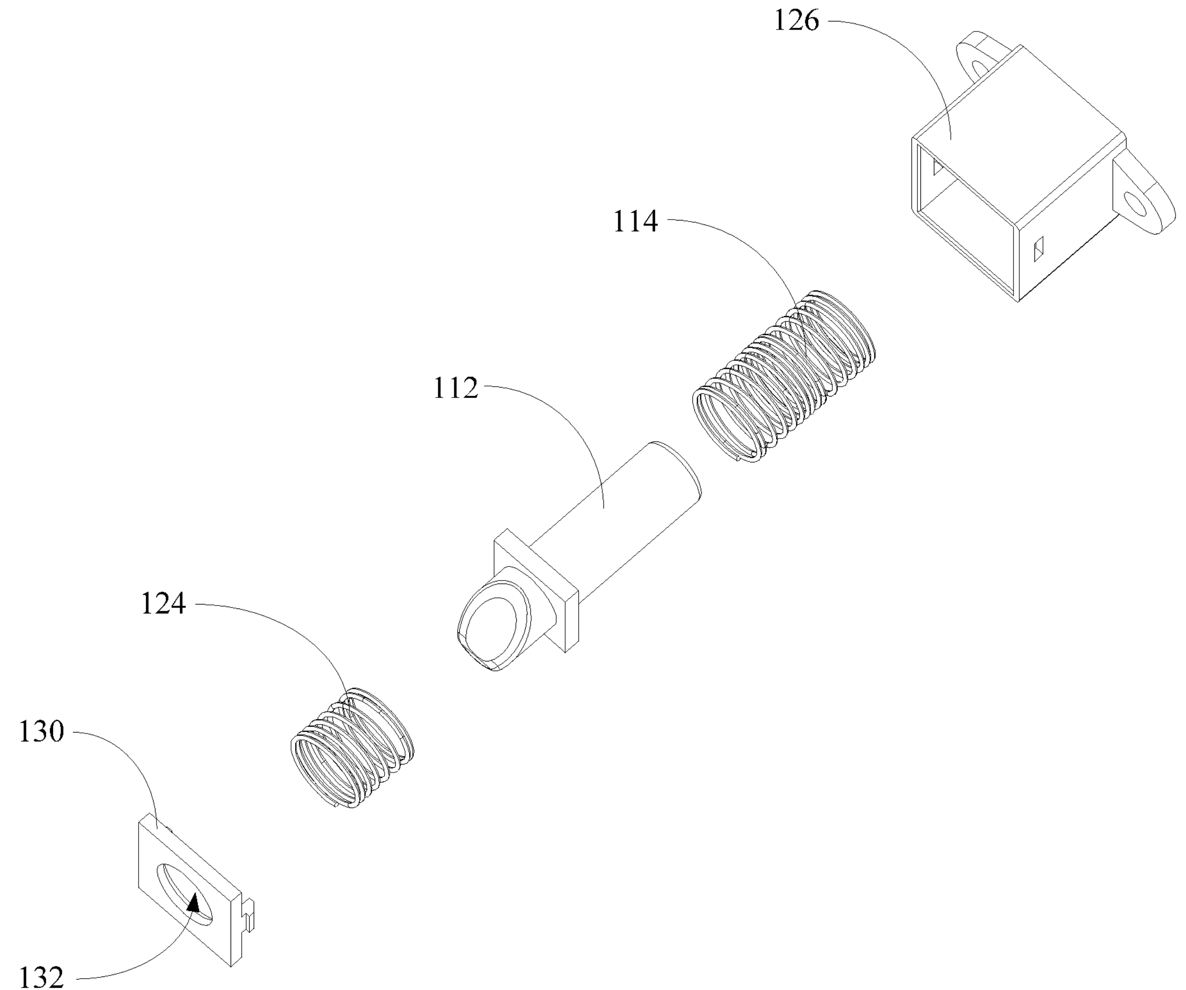
FIG. 7 is an exploded view of locking assembly in a lock structure of an embodiment of the present disclosure.

As shown in FIG. 7, the locking assembly 108 includes a mount 110, a locking member 112, and a first elastic member 114. The mount 110 can be connected to an external object, such as the door body assembly 104 or the cavity body assembly 102 of the cooking appliance 100, thereby ensuring mounting of the entire locking assembly 108. A locking member 112 can be provided through the first side of the mount 110 and lock to or disengage from the mount 106 to be connected to restrain.

The first elastic member 114 abuts against the locking member 112 and a second side of the mount 110; furthermore, the first elastic member 114 is in a compressed state and, in the absence of an external force, the first elastic member 114 is in a compressed state and gives the locking member 112 a pushing force towards the first side of the mount 110 so that the locking member 112 penetrates through the first side of the mount 110. Thus, the locking member 112 is held in the locked position by the first elastic member 114, thereby maintaining the locking member 112 locked to the fixing member 106.

Figure 1:
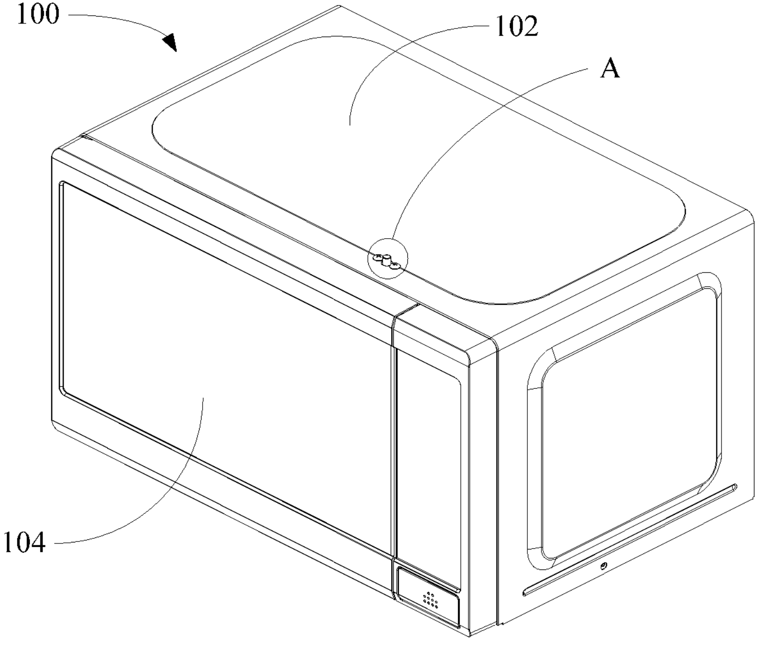
FIG. 1 is one of the structural view of a cooking appliance of according to an embodiment of the present disclosure (a door body assembly is closed)

For example, as shown in FIGS. 1, 2, 3, 4, and 5, the present disclosure provides a lock structure in which a fixing member 106 and a locking assembly 108 are respectively mounted to a door body assembly 104 of a cavity body assembly 102. In this way, as shown in FIG. 1, when the door body assembly 104 is in the closed state, the locking member 112 is provided through the first side of the mount 110 under the action of the first elastic member 114 and is locked to the fixing member 106; at this time, the user cannot open the door body assembly 104. As shown in FIG. 2, during the process of opening the door body assembly 104, the locking member 112 needs to be pulled to separate the locking member 112 from the fixing member 106; also, the user needs to open the door body assembly 104 while pulling the locking member 112 to open the door body assembly 104. The user cannot complete the door opening operation by merely pulling the locking member 112 or directly opening the door body assembly 104. After the door body assembly 104 is opened, the user releases the locking member 112; the first elastic member 114, now in compression, drives the locking member 112 toward the first side of the mount 110, thereby restoring the locking member 112 to the locked position.

For example, as shown in FIGS. 1 and 2, the lock structure provided in the present disclosure can be applied to a cooking appliance 100. After the cooking process of the cooking appliance 100 is finished, the temperature of the food in the cooking cavity is high, and at this time, there is a risk of scalding for the user to directly open the door body to remove the food. Therefore, in the present disclosure, through the cooperation of the above-mentioned locking assembly 108 and the fixing member 106, if the user wants to open the door body assembly 104, it is necessary to pull the locking member 112 while opening the door body assembly 104. Thus, on the one hand, the user can be prompted, and on the other hand, the children can be prevented from mistakenly opening the door body assembly 104, which greatly improves the safety of the cooking appliance 100.

Therefore, the present disclosure provides that the lock structure cooperates with the fixing member 106 via the locking assembly 108 so that a user must draw and pull the locking member 112 when removing the connection restraint between the locking member 112 and the fixing member 106, thereby improving the unlocking difficulty of the lock structure, avoiding the user, especially children, from erroneously opening the door body assembly 104, and improving the use security of the cooking appliance 100 using the lock structure.

Figure 8:
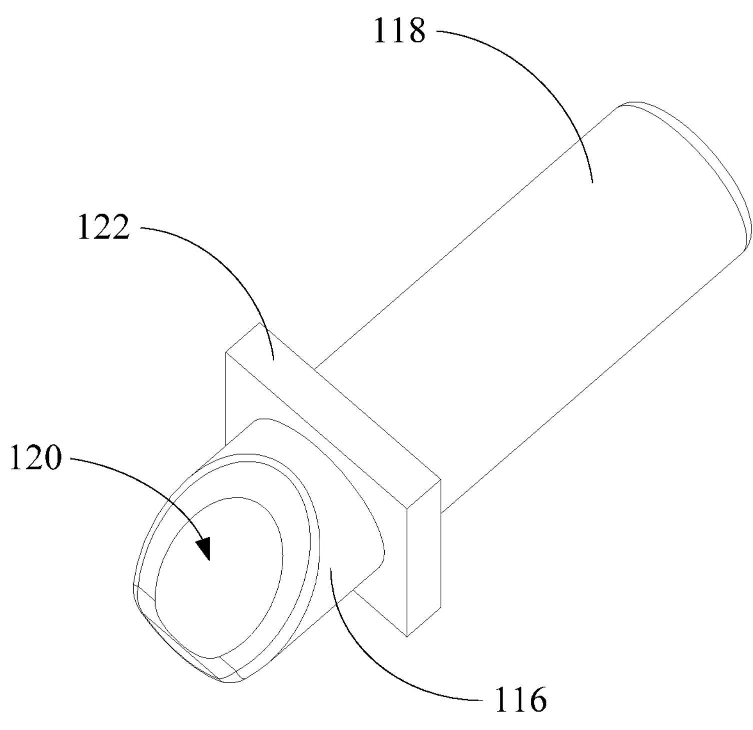
FIG. 8 is a schematic view showing a structure of a locking member in the locking assembly shown in FIG. 7.
Figure 9:
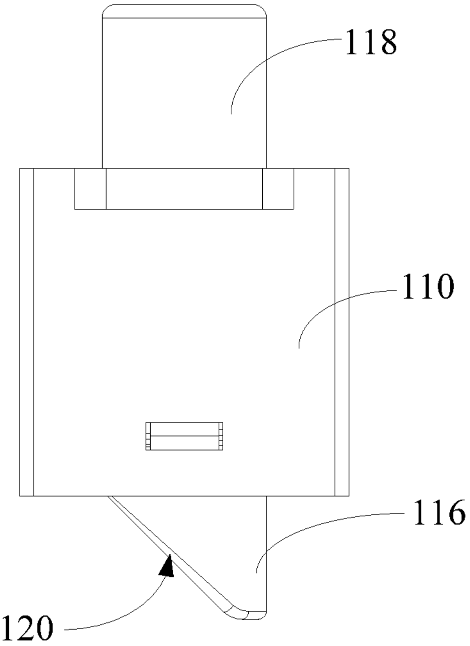
FIG. 9 is a schematic view of a locking assembly in a lock structure according to one embodiment of the present disclosure.
Figure 10:
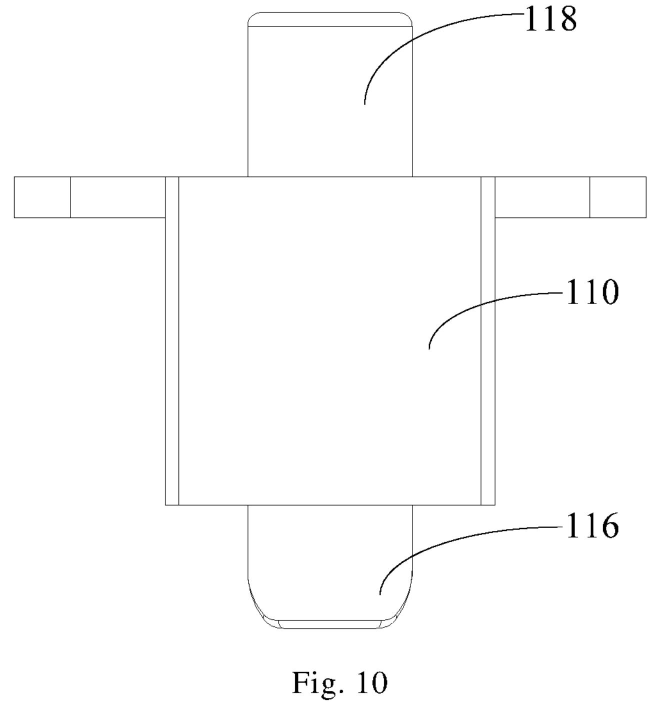
FIG. 10 is a side view of the locking assembly of FIG. 9.
Figure 11:
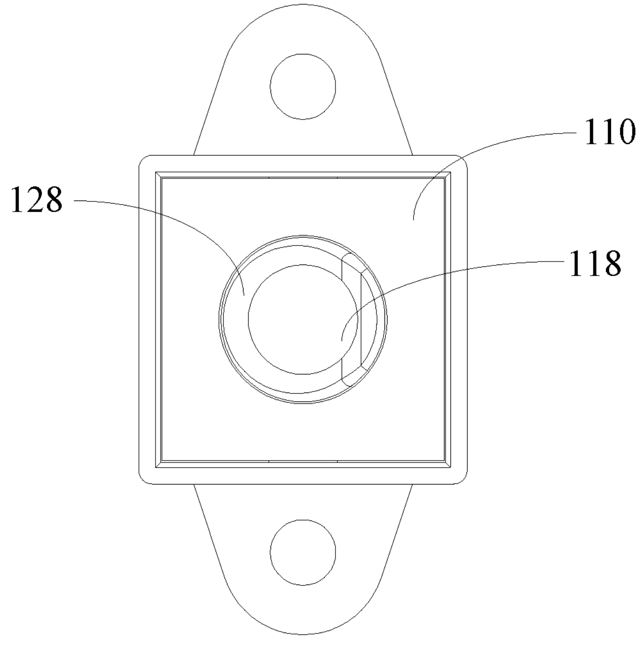
FIG. 11 is a top view of the locking assembly of FIG. 9.

A second embodiment of the first aspect of the present disclosure provides a lock structure. According to this embodiment that is based on the first embodiment of the first aspect, as shown in FIGS. 7 and 8, the locking member 112 includes a locking portion 116. The locking portion 116 is located at an end portion of the locking member 112 and can be provided through a first side of the mount 110 so that the locking portion 116 protrudes into a fixing opening of the fixing member 106 to achieve interlocking engagement between the locking member 112 and the fixing member 106. In the absence of an external force, as shown in FIGS. 9, 10, and 11, the locking portion 116 is outside the mount 110 under the driving of the first elastic member 114; at this time, the locking portion 116 can protrude into the fixing opening 146 of the fixing member 106, thereby achieving a locking restraint between the locking member 112 and the fixing member 106. During the opening of the door body assembly 104 by a user, the user pulls the locking member 112 such that the locking portion 116 travels toward the interior of the mount 110; at this time, the locking portion 116 is withdrawn from the fixing opening 146 of the fixing member 106, thereby releasing the locking restraint between the locking member 112 and the fixing member 106.

In addition, after the door body assembly 104 is opened, the user releases the locking member 112; at this time, the locking portion 116 extends out of the first side of the mount 110 again by being pushed by the first elastic member 114 and is locked to the fixing member 106.

In this embodiment, further, as shown in FIGS. 8 and 9, the locking member 112 also includes a driving inclined surface 120. Here, after the door body assembly 104 is opened, the locking portion 116 is pushed by the first elastic member 114 to extend out of the first side of the mount 110 again. At this time, the user can directly drive the closing door body assembly 104 without having to pull the pull-out portion 118 again during the closing of the door body assembly 104, which is more convenient for the user.

During the closing of the door body assembly 104 by a user, the fixing member 106 first comes into contact with the driving inclined surface 120 of the locking portion 116, which decomposes the force exerted by the fixing member 106 on the locking portion 116 into a horizontal component force and a vertical component force, the vertical component force acting to counteract the thrust exerted by the first elastic member 114 on the locking member 112, thereby causing the locking member 112 to move under the influence of the vertical component force, causing the locking portion 116 to retract inside the mount 110. At this time, the user closes the door body assembly 104.

Then, after the door body assembly 104 is operated to the closed position, the locking member 112 is moved again by the driving of the first elastic member 114 so that the locking portion 116 is protruded to the outside of the mount 110 and connected with the fixing member 106.

A third embodiment of the first aspect of the present disclosure provides a lock structure. According to this embodiment that is based on the second embodiment of the first aspect, as shown in FIGS. 7 and 8, the locking member 112 also includes a pull-out portion 118. A pull-out portion 118 is provided through the second side of the mount 110. At least part of the pull-out portion 118 is located outside the mount 110 and on the outer surface of the cooking appliance 100. Thus, when a user desires to open the door body assembly 104, the locking portion 116 may be driven toward the interior of the mount 110 by pulling on the pull-out portion 118 such that the locking portion 116 exits the fixing opening 146 of the fixing member 106, thereby relieving the limit of the connection between the locking member 112 and the fixing member 106.

In addition, after the door body assembly 104 is opened, the user releases the pull-out portion 118; at this time, the locking portion 116 is again protruded out of the first side of the mount 110 by being pushed by the first elastic member 114.

In this embodiment, as shown in FIGS. 7 and 8, the locking member 112 further includes an abutment portion 122. The abutment portion. 122 is provided between the locking portion 116 and the pull-out portion 118; the first elastic member 114 abuts against the abutment portion 122 and the second side of the mount 110, and the first elastic member 114 is in a compressed state. The abutment portion 122 protrudes from the sidewall of the locking member 112 to ensure that the first elastic member 114 abuts against the locking member 112.

Furthermore, as shown in FIG. 7, the first elastic member 114 abuts against the abutment portion 122 and the second side of the mount 110 such that the first elastic member 114 in a compressed state provides a pushing force to the locking member 112 toward the first side of the mount 110, thereby maintaining the locking member 112 in the locked position under the action of the first elastic member 114. Thus, the user needs to pull the locking member 112 while opening the door body assembly 104, and once the user releases the locking member 112, the locking member 112 returns to the locked position under the action of the first elastic member 114, further increasing the difficulty of unlocking the door body assembly 104.

A fourth embodiment of the first aspect of the present disclosure provides a lock structure. According to this embodiment that is based on the third embodiment of the first aspect, as shown in FIG. 7, the lock structure also includes a second elastic member 124. A second elastic member 124 is provided in the mount 110, and the second elastic member 124 abuts against the locking member 112 and a first side of the mount 110, and the second elastic member 124 is used for achieving an elastic connection between the locking member 112 and the mount 110. The second elastic member 124 abuts against the abutment portion 122 and the first side of the mount 110, and the first elastic member 114 and the second elastic member 124 abut against both sides of the abutment portion 122.

As shown in FIG. 7, the second elastic member 124 abuts against the first side of the locking member 112 and the mount 110 such that the first elastic member 114 engages the second elastic member 124, further improving the stability of the locking member 112. In the absence of an external force, the locking member 112 moves toward the side of the second elastic member 124 under the action of the first elastic member 114 and is in the locked position; at this time, the first elastic member 114 and the second elastic member 124 abut together against the locking member 112 from opposite directions, ensuring a stable position of the locking member 112 so that the locking member 112 does not shake and move (the second elastic member 124 may be in a compressed state at this time).

A fifth embodiment of the first aspect of the present disclosure provides a lock structure. According to this embodiment that is based on the first embodiment of the first aspect, as shown in FIGS. 7, 9, 10, and 11, the mount 110 includes a fixing bracket 126, a first opening 128, a cover plate 130, and a second opening 132. The fixing bracket 126 can ensure the stable mounting of the whole locking assembly 108; the cover plate 130 is connected to the fixing bracket 126 so that the cover plate 130 cooperates with the fixing bracket 126 to ensure components such as the locking member 112 and the first elastic member 114; the first elastic member 114 abuts against the locking member 112 and the fixing bracket 126 and is in a compressed state, thereby securing the locking member 112 in a locked state.

Furthermore, as shown in FIGS. 7 and 11, the fixing bracket 126 is provided with a first opening 128, and the cover plate 130 is provided with a second opening 132, and the first opening 128 is provided corresponding to the second opening 132. The pull-out portion 118 of the locking member 112 is provided through the first opening 128 and is located on the surface of the cooking appliance 100; the locking portion 116 of the locking member 112 is driven through the second opening 132 by the first elastic member 114 and protrudes into the fixing opening of the fixing member 106 to complete the restraint of the door body assembly 104.

For example, the inside of the mount 110 is provided with a guide groove (not shown), and the direction in which the guide groove extends is the same as the moving direction of the locking member 112. In this way, the locking member 112 is slidably connected with the guide groove to play a guiding role to ensure smooth movement of the locking member 112.

The first embodiment of the second aspect of the present disclosure provides a cooking appliance 100 comprising a cavity body assembly 102, a door body assembly 104, and the lock structure of any of the embodiments described above.

As shown in FIGS. 1 and 2, the cavity body assembly 102 comprises a cooking cavity for placing food to be cooked therein; the door body assembly 104 is in an open-close connection to the cavity body assembly 102, and serves to open or close the cooking cavity. For example, the door body assembly 104 may be rotatably connected to the cavity body assembly 102 or slidably connected to the cavity body assembly 102. As shown in FIGS. 3, 4, and 5, one of the cavity body assembly 102 and the door body assembly 104 is provided with a fixing member 106, and the other of the cavity body assembly 102 and the door body assembly 104 is provided with a locking assembly 108 that cooperates with the fixing member 106 to lock the door body assembly 104 to the cavity body assembly 102. For example, the above-mentioned locking assembly 108 is a child lock and functions as an auxiliary connection.

For example, as shown in FIG. 1, when the door body assembly 104 is in a closed state, the locking member 112 is provided on a first side of the mount 110 under the action of the first elastic member 114, and is connected to the fixing member 106; at this time, the user cannot open the door body assembly 104. As shown in FIG. 2, during the process of opening the door body assembly 104, the locking member 112 needs to be pulled to separate the locking member 112 from the fixing member 106; also, the user needs to open the door body assembly 104 while pulling the locking member 112 to open the door body assembly 104. The user cannot complete the door opening operation by merely pulling the locking member 112 or directly opening the door body assembly 104. After the door body assembly 104 is opened, the user releases the locking member 112; the first elastic member 114, now in compression, drives the locking member 112 toward the first side of the mount 110, thereby restoring the locking member 112 to the locked position.

For example, after the cooking is finished, the temperature of the food in the cooking cavity is high, and at this time, the user directly opens the door body to take out the food with a risk of scalding. Therefore, in the present disclosure, through the cooperation of the above-mentioned locking assembly 108 and the fixing member 106, if the user wants to open the door body assembly 104, it is necessary to pull the locking member 112 while opening the door body assembly 104. Thus, on the one hand, the user can be prompted, and on the other hand, the children can be prevented from mistakenly opening the door body assembly 104, which greatly improves the safety of the cooking appliance 100.

Therefore, in the cooking appliance 100 provided in the present disclosure, by using the pull-out type locking assembly 108 to cooperate with the fixing member 106, a user must simultaneously pull out and pull out the locking member 112 while opening the door body assembly 104, thereby of opening the door of the user, avoiding the user, especially children, from mistakenly opening the door body assembly 104, and improving the safety of the cooking appliance 100.

Figure 12:
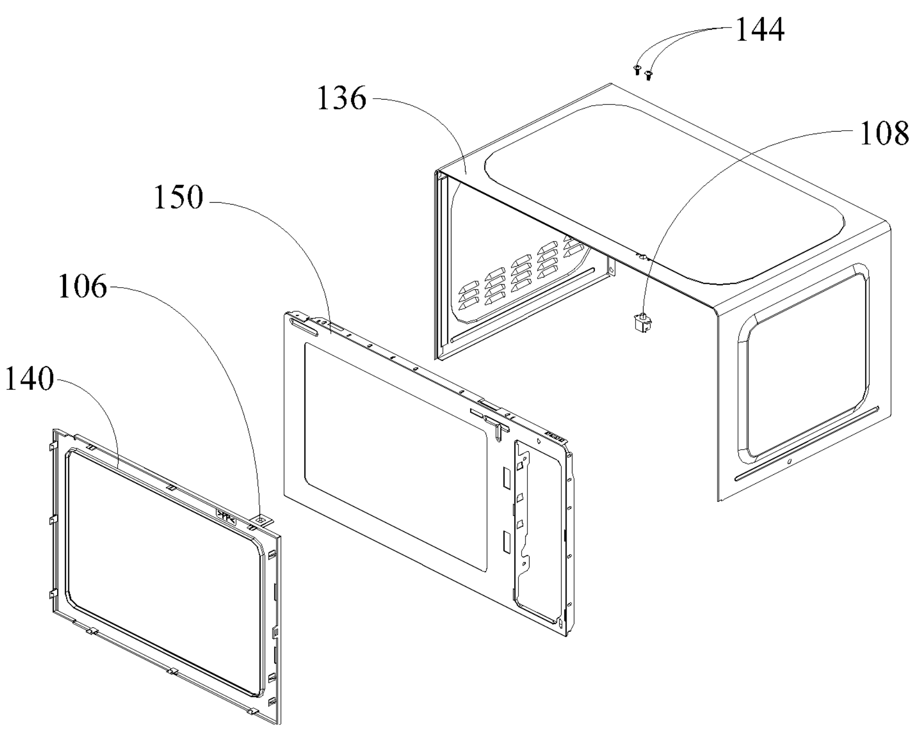
FIG. 12 is a schematic view showing the positional relationship between the locking assembly and the fixing member in the cooking appliance according to one embodiment of the present disclosure.

A second embodiment of the second aspect of the present disclosure provides a cooking appliance 100. According to this embodiment that is based on the first embodiment of the second aspect, as shown in FIGS. 2 and 12, the cavity body assembly 102 includes a cavity body 134 and a cover body 136. The cavity body 134 is provided with a cooking cavity, and the cooking cavity is used for placing the food to be cooked; the cover body 136 surrounds at least a portion of the cavity body 134, thereby providing good protection for the cavity body 134. In addition, there is a certain mounting cavity between the cavity body 134 and the cover body 136 so that the relevant components of the cooking appliance 100 are mounted in the mounting cavity between the cavity body 134 and the cover body 136.

Figure 6:
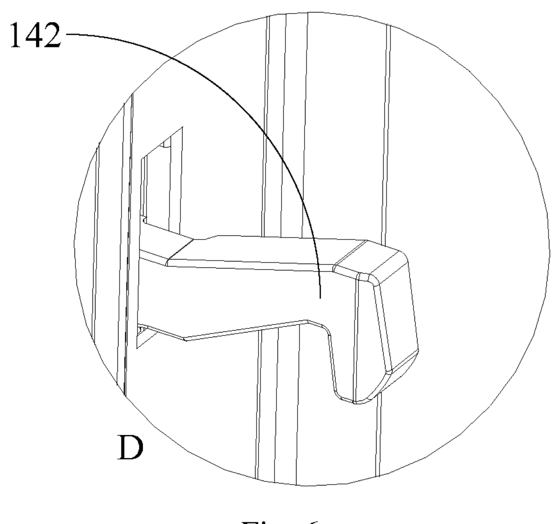
FIG. 6 is a partially enlarged view at D of the cooking appliance shown in FIG. 2.
Figure 15:
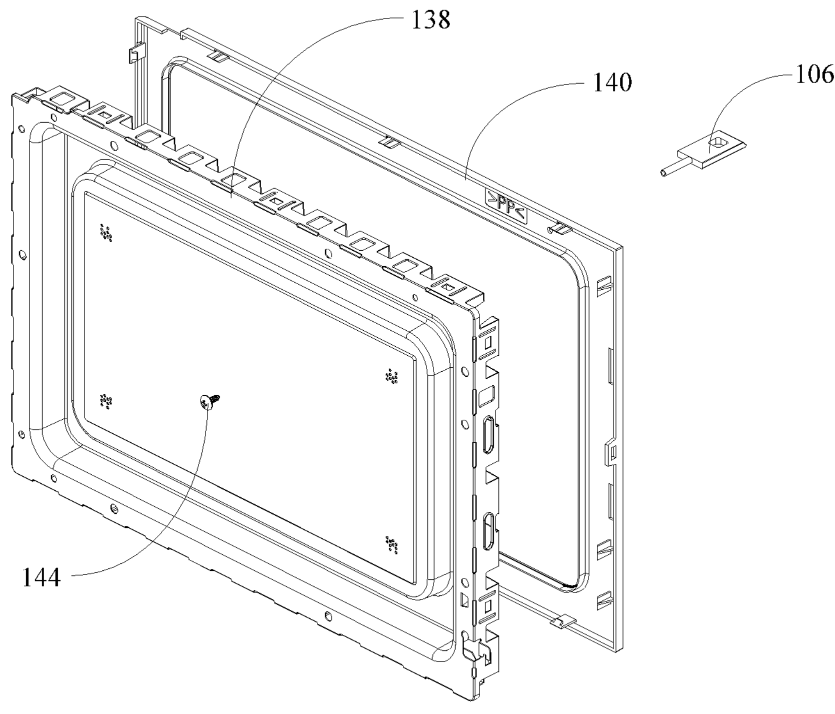
FIG. 15 is a third schematic view showing the mounting of a fixing member in a cooking appliance according to an embodiment of the present disclosure.

In this embodiment, further, as shown in FIGS. 6 and 15, the door body assembly 104 includes a door body 138, a door seal 140, and a lock catch 142. The door body 138 is in open-close connection with the cavity body assembly 102 and can be used for opening or closing the cooking cavity; the door seal 140 is connected to the door body 138, and can perform a good sealing function when the door body 138 closes the cooking cavity to ensure a good sealing effect of the cooking cavity during operation. In addition, a lock catch 142 is provided on the door body 138 or the door seal 140, and the lock catch 142 is connected with the cavity body assembly 102 when the door body 138 closes the cooking cavity to ensure an open-close connection between the door body assembly 104 and the cavity body assembly 102.

In the cooking appliance 100 provided in the present disclosure, the door body assembly 104 comprises a lock catch 142, and the lock catch 142 is used for connecting with the cavity body assembly 102, thereby ensuring a stable connection between the door body assembly 104 and the cavity body assembly 102. That is, the cooking appliance 100 provided in the present disclosure can first ensure the connection between the door body assembly 104 and the cavity body assembly 102 via the lock catch 142, and then can use the locking assembly 108 as a child lock so that the locking assembly 108 cooperates with the fixing member 106 to further restrict the user from opening the door body assembly 104.

A third embodiment of the second aspect of the present disclosure provides a cooking appliance 100. According to this embodiment that is based on the first embodiment of the second aspect, as shown in FIGS. 15 and 17, the mount 110 of the locking assembly 108 is connected to the cavity body 134 and the fixing member 106 is connected to the door body 138.

Figure 17:
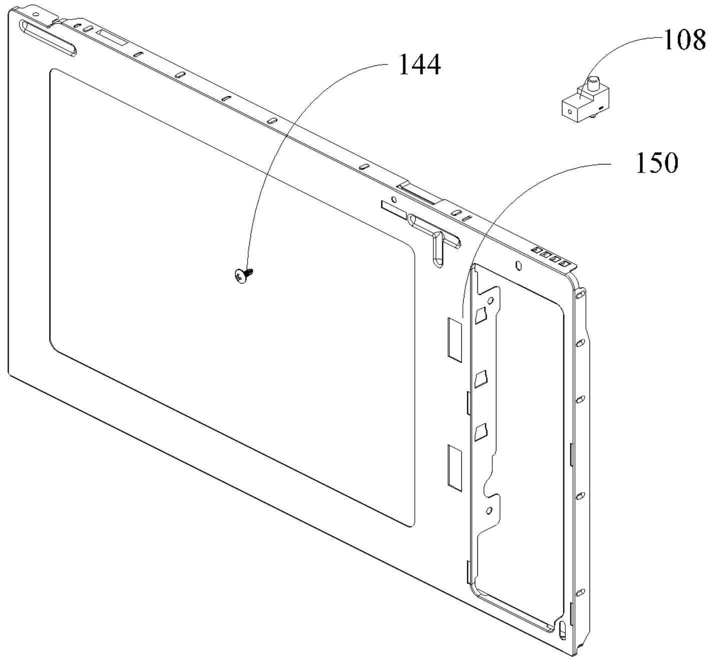
FIG. 17 is a second schematic view showing the mounting of a locking assembly in the cooking appliance according to one embodiment of the present disclosure.
Figure 18:
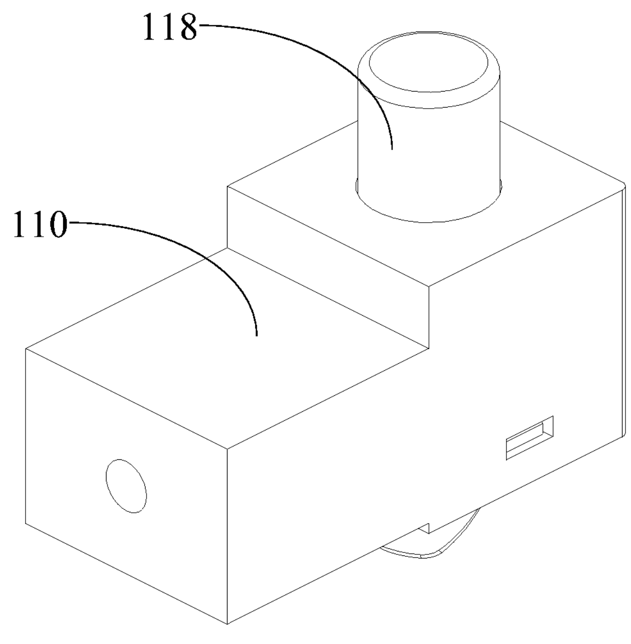
FIG. 18 is a schematic view of a locking assembly in a lock structure according to another embodiment of the present disclosure.
Figure 19:
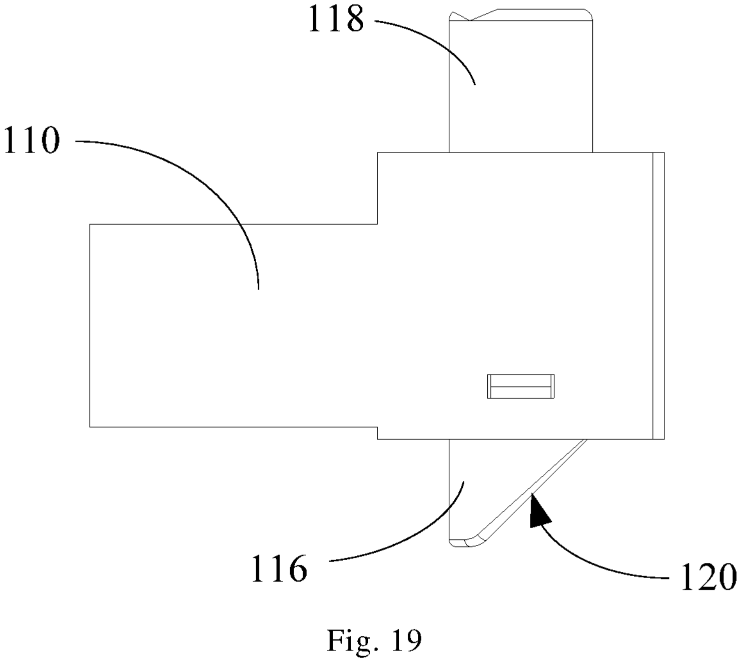
FIG. 19 is a top view of the locking assembly of FIG. 18.
Figure 20:
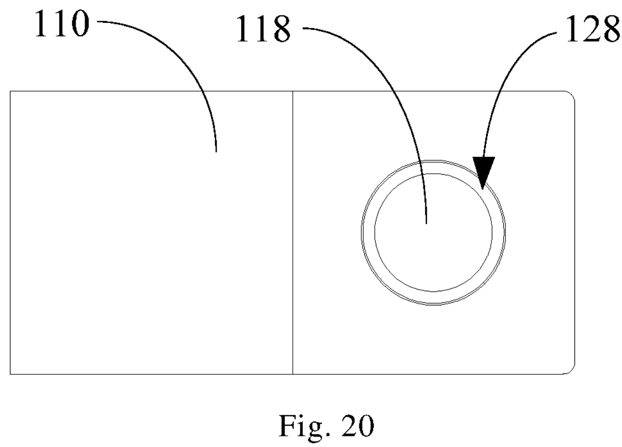
FIG. 20 is one of the side views of the locking assembly shown in FIG. 18.
Figure 21:
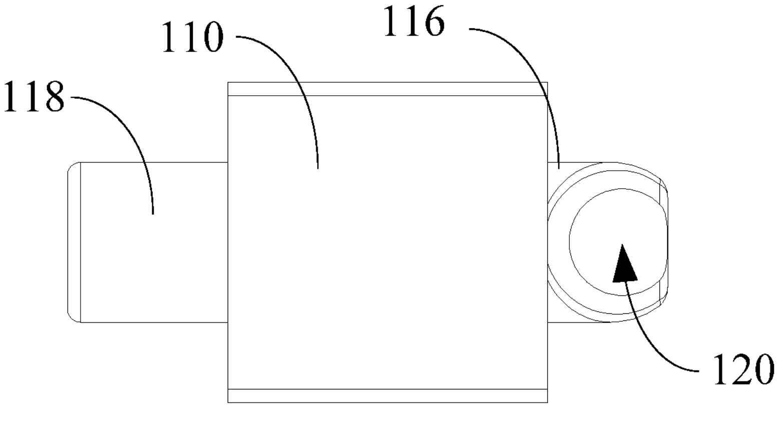
FIG. 21 is a second side view of the locking assembly of FIG. 18.

As shown in FIG. 17, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Furthermore, as shown in FIG. 15, the fixing member 106 is connected to the door body 138. In addition, the door body 138 itself has good strength and hardness, and connecting the fixing member 106 with the door body 138 can further ensure the secure connection of the fixing member 106 and improve the mating stability of the locking assembly 108 and the fixing member 106 to extend the service life of the fixing member 106 and the entire cooking appliance 100.

For example, a fastener 144, such as a screw, may be used to connect the fixing member 106 to the door body 138, or a snap fit may be used.

In this embodiment, further, as shown in FIG. 17, the cavity body 134 includes an end plate 150 that is a front panel of the cavity body assembly 102; the mount 110 is connected to an end plate 150 of the cavity body 134.

A fourth embodiment of the second aspect of the present disclosure provides a cooking appliance 100. According to this embodiment that is based on the first embodiment of the second aspect, as shown in FIGS. 14 and 17, the mount 110 of the locking assembly 108 is connected to the cavity body 134 and the fixing member 106 is connected to the door seal 140.

Here, as shown in FIG. 17, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Figure 14:
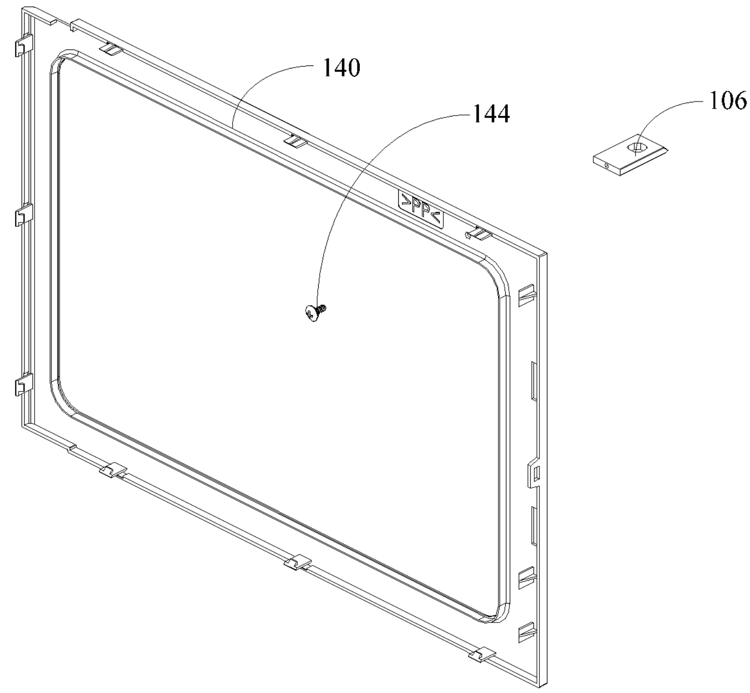
FIG. 14 is a second schematic view showing the mounting of a fixing member in a cooking appliance according to an embodiment of the present disclosure.

Furthermore, as shown in FIG. 14, the fixing member 106 is connected to a door seal 140. During the use of the cooking appliance 100, the door seal 140 is in direct contact with the cavity body assembly 102 and is closer to the cavity body assembly 102 than the door body 138. Thus, mounting the fixing member 106 in the door seal 140 reduces the size requirements for the fixing member 106 and simplifies the construction of the fixing member 106 as well as the entire cooking appliance 100.

For example, a fastener 144, such as a screw, may be used to connect the fixing member 106 to the door body 138, or a snap fit may be used.

For example, as shown in FIG. 17, the cavity body 134 includes an end plate 150 that is the front panel of the cavity body assembly 102; the mount 110 is connected to an end plate 150 of the cavity body 134.

A fifth embodiment of the second aspect of the present disclosure provides a cooking appliance 100. According to this embodiment that is based on the first embodiment of the second aspect, as shown in FIG. 17, the mount 110 of the locking assembly 108 is connected to the cavity body 134, and the fixing member 106 is a unitary structure (not shown) with the door body 138.

As shown in FIG. 17, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Furthermore, the fixing member 106 is of an integrated structure with the door body 138. For example, the fixing member 106 and the door body 138 are of an integral structure, on the one hand, the use of the connection between the fixing member 106 and the door body 138 can be reduced, and on the other hand, the connection strength between the fixing member 106 and the door body 138 can be greatly improved, thereby ensuring the stability of the connection between the fixing member 106 and the locking member 112 to extend the service life of the fixing member 106 and the entire cooking appliance 100.

For example, as shown in FIG. 17, the cavity body 134 includes an end plate 150 that is the front panel of the cavity body assembly 102; the mount 110 is connected to an end plate 150 of the cavity body 134.

A sixth embodiment of the second aspect of the present disclosure provides a cooking appliance 100. According to this embodiment that is based on the first embodiment of the second aspect, as shown in FIGS. 13 and 17, the mount 110 of the locking assembly 108 is connected to the cavity body 134 and the fixing member 106 and the door seal 140 are of an integrated structure.

As shown in FIG. 17, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Figure 13:
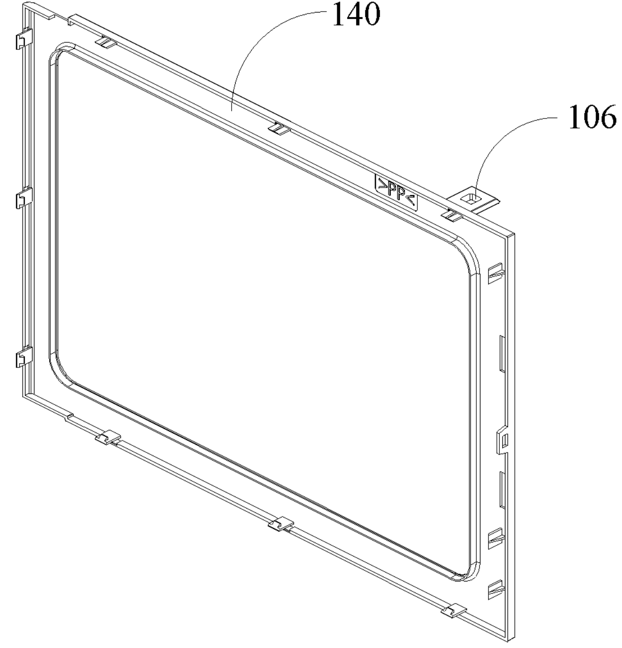
FIG. 13 is one of schematic views showing the mounting a fixing member in a cooking appliance according to an embodiment of the present disclosure.

Furthermore, as shown in FIG. 13, the fixing member 106 is of an integrated structure with the door seal 140. For example, the fixing member 106 and the door seal 140 are of an integrated structure, on the one hand, the use of the connection between the fixing member 106 and the door seal 140 can be reduced, and on the other hand, the connection strength between the fixing member 106 and the door seal 140 can be greatly improved, thereby ensuring the connection stability of the fixing member 106 and the locking member 112 to extend the service life of the fixing member 106 and the entire cooking appliance 100.

For example, as shown in FIG. 17, the cavity body 134 includes an end plate 150 that is the front panel of the cavity body assembly 102; the mount 110 is connected to an end plate 150 of the cavity body 134.

A seventh embodiment of the second aspect of the present disclosure provides a cooking appliance 100. According to this embodiment that is based on the first embodiment of the second aspect, as shown in FIGS. 15 and 16, the mount 110 of the locking assembly 108 is connected to the cover body 136 and the fixing member 106 is connected to the door body 138.

Figure 16:
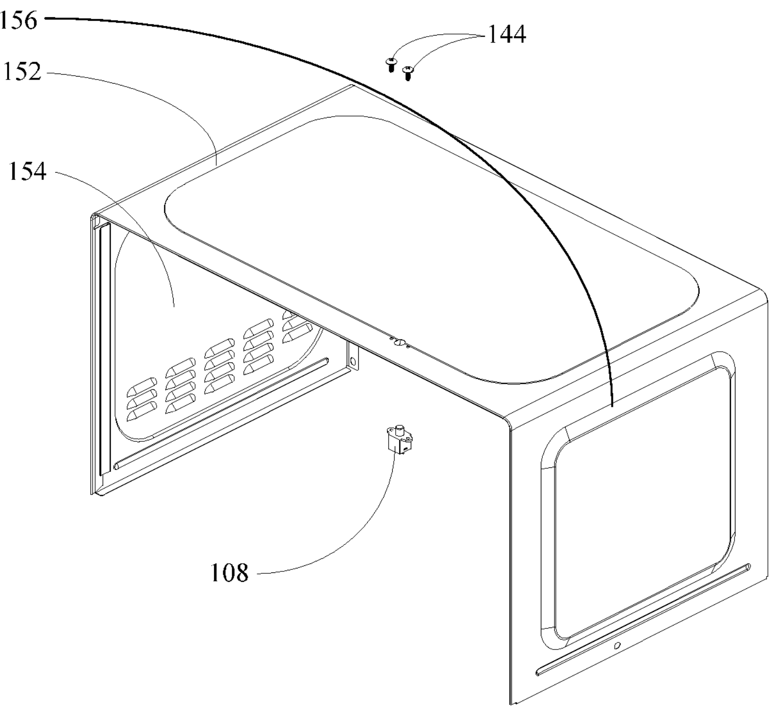
FIG. 16 is one of schematic views showing the mounting of a locking assembly in a cooking appliance according to an embodiment of the present disclosure.

As shown in FIG. 16, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 of the locking assembly 108 and the cover body 136 reduces the structural and manufacturing requirements for the cavity body 134, further improving the manufacturing efficiency of the cavity body 134.

For example, a fastener 144 such as a screw can be used for connection between the mount 110 and the cover body 136, or a snap fit may be used.

Furthermore, as shown in FIG. 15, the fixing member 106 is connected to the door body 138. The door body 138 itself has good strength and hardness, and connecting the fixing member 106 with the door body 138 can further ensure the secure connection of the fixing member 106 and improve the mating stability of the locking assembly 108 and the fixing member 106 to extend the service life of the fixing member 106 and the entire cooking appliance 100.

For example, a fastener 144, such as a screw, may be used to connect the fixing member 106 to the door body 138, or a snap fit may be used.

In this embodiment, further, as shown in FIG. 16, the cover body 136 includes a top plate 152, a first side plate 154, and a second side plate 156. The first side plate 154 is connected to a first side of the top plate 152, and the second side plate 156 is connected to a second side of the top plate 152. The mount 110 of the locking assembly 108 is connected to the top plate 152 and is positioned between a first side plate 154 and a second side plate 156. In this way, the locking assembly 108 is located at the top of the cavity body 134, and snap-in mounting of the mount 110 is ensured.

An eighth embodiment of the second aspect of the present disclosure provides a cooking appliance 100. According to this embodiment that is based on the first embodiment of the second aspect, as shown in FIGS. 14 and 16, the mount 110 of the locking assembly 108 is connected to the cover body 136 and the fixing member 106 is connected to the door seal 140.

As shown in FIG. 16, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 of the locking assembly 108 and the cover body 136 reduces the structural and manufacturing requirements for the cavity body 134, further improving the manufacturing efficiency of the cavity body 134.

For example, a fastener 144 such as a screw can be used for connection between the mount 110 and the cover body 136, or a snap fit may be used.

Furthermore, as shown in FIG. 14, the fixing member 106 is connected to a door seal 140. During the use of the cooking appliance 100, the door seal 140 is in direct contact with the cavity body assembly 102 and is closer to the cavity body assembly 102 than the door body 138. Thus, mounting the fixing member 106 in the door seal 140 reduces the size requirements for the fixing member 106 and simplifies the construction of the fixing member 106 as well as the entire cooking appliance 100.

For example, a fastener 144, such as a screw, may be used to connect the fixing member 106 to the door seal 140, or a snap fit may be used.

Furthermore, as shown in FIG. 16, the cover body 136 includes a top plate 152, a first side plate 154, and a second side plate 156. The mount 110 of the locking assembly 108 is connected to the top plate 152 and is positioned between a first side plate 154 and a second side plate 156.

A ninth embodiment of the second aspect of the present disclosure provides a cooking appliance 100. According to this embodiment that is based on the first embodiment of the second aspect, as shown in FIG. 16, the mount 110 of the locking assembly 108 is connected to the cover body 136, and the fixing member 106 is a unitary structure (not shown) with the door body 138.

As shown in FIG. 16, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 of the locking assembly 108 and the cover body 136 reduces the structural and manufacturing requirements for the cavity body 134, further improving the manufacturing efficiency of the cavity body 134.

For example, a fastener 144 such as a screw can be used for connection between the mount 110 and the cover body 136, or a snap fit may be used.

Furthermore, the fixing member 106 is of an integrated structure with the door body 138 The fixing member 106 is of an integrated structure with the door body 138. For example, the fixing member 106 and the door body 138 are of an integral structure, on the one hand, the use of the connection between the fixing member 106 and the door body 138 can be reduced, and on the other hand, the connection strength between the fixing member 106 and the door body 138 can be greatly improved, thereby ensuring the stability of the connection between the fixing member 106 and the locking member 112 to extend the service life of the fixing member 106 and the entire cooking appliance 100.

Furthermore, as shown in FIG. 16, the cover body 136 includes a top plate 152, a first side plate 154, and a second side plate 156. The mount 110 of the locking assembly 108 is connected to the top plate 152 and is positioned between a first side plate 154 and a second side plate 156.

A tenth embodiment of the second aspect of the present disclosure provides a cooking appliance 100. According to this embodiment that is based on the first embodiment of the second aspect, as shown in FIGS. 13 and 16, the mount 110 of the locking assembly 108 is connected to the cover body 136, and the fixing member 106 is of an integrated structure with the door seal 140.

As shown in FIG. 16, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 of the locking assembly 108 and the cover body 136 reduces the structural and manufacturing requirements for the cavity body 134, further improving the manufacturing efficiency of the cavity body 134.

For example, a fastener 144 such as a screw can be used for connection between the mount 110 and the cover body 136, or a snap fit may be used.

Furthermore, as shown in FIG. 13, the fixing member 106 is of an integrated structure with the door seal 140. For example, the fixing member 106 and the door seal 140 are of an integrated structure, on the one hand, the use of the connection between the fixing member 106 and the door seal 140 can be reduced, and on the other hand, the connection strength between the fixing member 106 and the door seal 140 can be greatly improved, thereby ensuring the connection stability of the fixing member 106 and the locking member 112 to extend the service life of the fixing member 106 and the entire cooking appliance 100.

Furthermore, as shown in FIG. 16, the cover body 136 includes a top plate 152, a first side plate 154, and a second side plate 156. The mount 110 of the locking assembly 108 is connected to the top plate 152 and is positioned between a first side plate 154 and a second side plate 156.

A eleventh embodiment of the second aspect of the present disclosure provides a cooking appliance 100. According to this embodiment that is based on the first embodiment of the second aspect, the fixing member 106 is connected to the cavity body 134, and the mount 110 of the locking assembly 108 is connected to the door body 138 (this arrangement is not shown in the figure, but this embodiment differs from the third embodiment of the second aspect in that the positions of the locking assembly 108 and the fixing member 106 are exchanged so that a person skilled in the art would understand this embodiment).

The fixing member 106 is connected to the cavity body 134. The cavity body 134 itself has good strength and hardness, and connecting the fixing member 106 with the cavity body 134 further ensures the firmness of the connection of the fixing member 106 and improves the stability of the cooperation of the locking assembly 108 with the fixing member 106 to extend the service life of the fixing member 106 and the entire cooking appliance 100.

For example, a fastener 144, such as a screw, may be used to connect the fixing member 106 to the cavity body 134, or a snap fit may be used.

In addition, the mount 110 of the locking assembly 108 is connected to the door body 138. The door body 138 itself has good strength and hardness, and the connection of the mount 110 of the locking assembly 108 to the door body 138 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the door body 138, or a snap fit may be used.

A twelfth embodiment of the second aspect of the present disclosure provides a cooking appliance 100. According to this embodiment that is based on the first embodiment of the second aspect, the fixing member 106 is connected to the cavity body 134, and the mount 110 of the locking assembly 108 is connected to the door seal 140 (this arrangement is not shown in the figure, but this embodiment differs from the fourth embodiment of the second aspect in that the positions of the locking assembly 108 and the fixing member 106 are exchanged so that a person skilled in the art would understand this embodiment).

The fixing member 106 is connected to the cavity body 134. The cavity body 134 itself has good strength and hardness, and connecting the fixing member 106 with the cavity body 134 further ensures the firmness of the connection of the fixing member 106 and improves the stability of the cooperation of the locking assembly 108 with the fixing member 106 to extend the service life of the fixing member 106 and the entire cooking appliance 100.

For example, a fastener 144, such as a screw, may be used to connect the fixing member 106 to the cavity body 134, or a snap fit may be used.

In addition, the mount 110 of the locking assembly 108 is connected to the door seal 140. During the use of the cooking appliance 100, the door seal 140 is in direct contact with the cavity body assembly 102 and is closer to the cavity body assembly 102 than the door body 138. Thus, mounting the mount 110 of the locking assembly 108 to the door seal 140 may reduce the size requirements for the mount 110 of the locking assembly 108 and may simplify the structure of the mount 110 of the locking assembly 108 and the overall cooking appliance 100.

For example, the mount 110 of the locking assembly 108 may be connected to the door body 138 using a fastener 144, such as a screw, or may be snap-fit.

A thirteenth embodiment of the second aspect of the present disclosure provides a cooking appliance 100. According to this embodiment that is based on the first embodiment of the second aspect, the fixing member 106 is connected to the cavity body 134, and the mount 110 of the locking assembly 108 and the door body 138 are of an integrated structure (this arrangement is not shown in the figure, but this embodiment differs from the fifth embodiment of the second aspect in that the positions of the locking assembly 108 and the fixing member 106 are exchanged so that a person skilled in the art would understand this embodiment).

The fixing member 106 is connected to the cavity body 134. The cavity body 134 itself has good strength and hardness, and connecting the fixing member 106 with the cavity body 134 further ensures the firmness of the connection of the fixing member 106 and improves the stability of the cooperation of the locking assembly 108 with the fixing member 106 to extend the service life of the fixing member 106 and the entire cooking appliance 100.

For example, a fastener 144, such as a screw, may be used to connect the fixing member 106 to the cavity body 134, or a snap fit may be used.

In addition, the mount 110 of the locking assembly 108 is of an integrated structure with the door body 138. For example, the mount 110 of the locking assembly 108 and the door body 138 are of an integrated structure, on the one hand, reducing the use of the connection between the mount 110 of the locking assembly 108 and the door body 138, and on the other hand, greatly improving the strength of the connection between the mount 110 of the locking assembly 108 and the door body 138, thereby ensuring the stability of the connection between the fixing member 106 and the locking member 112, thereby extending the service life of the locking assembly 108 and the entire cooking appliance 100.

A fourteenth embodiment of the second aspect of the present disclosure provides a cooking appliance 100. According to this embodiment that is based on the first embodiment of the second aspect, the fixing member 106 is connected to the cavity body 134, and the mount 110 of the locking assembly 108 and the door seal 140 are of an integrated structure (this arrangement is not shown in the figure, but this embodiment differs from the sixth embodiment of the second aspect in that the positions of the locking assembly 108 and the fixing member 106 are exchanged so that a person skilled in the art would understand this embodiment).

The fixing member 106 is connected to the cavity body 134. The cavity body 134 itself has good strength and hardness, and connecting the fixing member 106 with the cavity body 134 further ensures the firmness of the connection of the fixing member 106 and improves the stability of the cooperation of the locking assembly 108 with the fixing member 106 to extend the service life of the fixing member 106 and the entire cooking appliance 100.

For example, a fastener 144, such as a screw, may be used to connect the fixing member 106 to the cavity body 134, or a snap fit may be used.

In addition, the mount 110 of the locking assembly 108 is of an integrated structure with the door seal 140. On the one hand, the use of the connection between the mount 110 of the locking assembly 108 and the door seal 140 can be reduced, and on the other hand, the connection strength between the mount 110 of the locking assembly 108 and the door seal 140 can be greatly improved, thereby ensuring the connection stability between the fixing member 106 and the locking member 112, thereby extending the service life of the fixing member 106 and the entire cooking appliance 100.

A fifteenth embodiment of the second aspect of the present disclosure provides a cooking appliance 100. According to this embodiment that is based on the first embodiment of the second aspect, the fixing member 106 is connected to the cover body 136, and the mount 110 of the locking assembly 108 is connected to the door body 138 (this arrangement is not shown in the figure, but the present embodiment differs from the seventh embodiment of the second aspect in that the positions of the locking assembly 108 and the fixing member 106 are exchanged so that a person skilled in the art would understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is connected to the door body 138. The door body 138 itself has good strength and hardness, and the connection of the mount 110 of the locking assembly 108 to the door body 138 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the door body 138, or a snap fit may be used.

A sixteenth embodiment of the second aspect of the present disclosure provides a cooking appliance 100. According to this embodiment that is based on the first embodiment of the second aspect, the fixing member 106 is connected to the cover body 136, and the mount 110 of the locking assembly 108 is connected to the door seal 140 (this arrangement is not shown in the figure, but the present embodiment differs from the eighth embodiment of the second aspect in that the positions of the locking assembly 108 and the fixing member 106 are exchanged so that a person skilled in the art would understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is connected to the door seal 140. During the use of the cooking appliance 100, the door seal 140 is in direct contact with the cavity body assembly 102 and is closer to the cavity body assembly 102 than the door body 138. Thus, mounting the mount 110 of the locking assembly 108 to the door seal 140 may reduce the size requirements for the locking assembly 108 and may simplify the structure of the locking assembly 108 and the overall cooking appliance 100.

For example, a fastener 144 such as a screw can be used for connection between the mount 110 and the door body 138, or a snap fit may be used.

A seventeenth embodiment of the second aspect of the present disclosure provides a cooking appliance 100. According to this embodiment that is based on the first embodiment of the second aspect, the fixing member 106 is connected to the cover body 136, and the mount 110 of the locking assembly 108 and the door body 138 are of an integrated structure (this arrangement is not shown in the figure, but this embodiment differs from the ninth embodiment of the second aspect in that the positions of the locking assembly 108 and the fixing member 106 are exchanged so that a person skilled in the art would understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is of an integrated structure with the door body 138. For example, the mount 110 and the door body 138 are of an integrated structure that, on the one hand, reduces the use of the connection between the mount 110 and the door body 138, and, on the other hand, greatly improves the strength of the connection between the mount 110 and the door body 138, thereby ensuring the stability of the connection between the fixing member 106 and the locking member 112 to extend the service life of the locking assembly 108 and the entire cooking appliance 100.

An eighteenth embodiment of the second aspect of the present disclosure provides a cooking appliance 100. According to this embodiment that is based on the first embodiment of the second aspect, the fixing member 106 is connected to the cover body 136, and the mount 110 of the locking assembly 108 and the door seal 140 are of an integrated structure (this arrangement is not shown in the figure, but this embodiment differs from the tenth embodiment of the second aspect in that the positions of the locking assembly 108 and the fixing member 106 are exchanged so that a person skilled in the art would understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is of an integrated structure with the door seal 140. For example, the mount 110 and the door seal 140 are of an integrated structure that, on the one hand, reduces the use of the connection between the mount 110 and the door seal 140, and, on the other hand, greatly enhances the strength of the connection between the mount 110 and the door seal 140, thereby ensuring the stability of the connection between the fixing member 106 and the locking member 112 to extend the service life of the locking assembly 108 and the overall cooking appliance 100.

Based on any of the above embodiments, further, as shown in FIGS. 1 and 2, the cooking appliance 100 provided by the present disclosure includes, but is not limited to: a microwave oven, an oven, a steaming box, or a steaming and roasting integrated machine.

Based on any of the embodiments described above, further, as shown in FIGS. 1, 2, and 3, the locking assembly 108 is a child lock.

Based on any of the above-mentioned embodiments, further, as shown in FIGS. 7 and 8, in the cooking appliance 100 provided in the present disclosure, the first elastic member 114 includes a spring; the second elastic member 124 comprises a spring; the locking member 112 comprises a clamping bolt, and two ends of the clamping bolt are respectively provided with a pull-out portion 118 and a locking portion 116; the fixing member 106 includes a locking pin, and a fixing opening 146 is provided at a central portion of the locking pin.

Based on any of the embodiments described above, further, as shown in FIGS. 9, 10, and 11, the shape of the mount 110 of the locking assembly 108 is more flexible when the locking assembly 108 is provided in the cover body 136.

Based on any of the embodiments described above, further, as shown in FIGS. 18, 19, 20, and 21, when the locking assembly 108 is provided on the door body 138, the mount 110 of the locking assembly 108 needs to have a certain protrusion, thereby ensuring that the mount 110 can be connected to the door body 138 to avoid affecting the mounting of the locking assembly 108 due to the excessive thickness of the door body 138.

Based on any of the embodiments described above, further, as shown in FIG. 5, when the locking assembly 108 is provided in the cavity body assembly 102 and the fixing member 106 is provided in the door body assembly 104, the end plate 150 of the cavity body assembly 102 is provided with an opening 158. During the closing of the door body assembly 104, at least a portion of the fixing member 106 extends into the insertion opening 158 such that the insertion opening 158 engages the locking member 112 of the locking assembly 108.

Based on any of the embodiments described above, further, as shown in FIG. 4, the fixing member 106 is provided with a fixing opening 146 through which the locking member 112 of the locking assembly 108 can pass to achieve locking between the locking member 112 and the fixing member 106.

In the related arts, after cooking is done, a user can directly open a door body assembly of a cooking appliance, and the food just cooked at this time tends to be at a higher temperature, with the possibility of scalding the user. Especially after the children cook food with the cooking appliance, accidents are more likely to occur. In addition, in the related arts, a key-type structure or a snap-type structure is used to connect the door body assembly and the cavity body assembly, but the above-mentioned structure tends to be opened by a user by mistake and thus is not safe.

The present disclosure provides a cooking appliance 100 that limits the opening and closing of a door body assembly 104 through the cooperation of a locking assembly 108 with a fixing member 106. To complete the door opening or closing action, the user must first disengage the locking assembly 108 from the fixing member 106 to complete the door opening or closing action.

The locking assembly 108 includes a cover plate 130, a locking member 112, a first elastic member 114, and a second elastic member 124 (for enhancing the stability of the locking member 112, which may be removed as desired), and a fixing bracket 126. The locking assembly 108 is secured to the door body assembly 104 or the cavity body assembly 102 by screws. When the door body assembly 104 is in the closed state while the locking member 112 enters the fixing opening 146 of the fixing member 106, the door cannot be opened by simply pulling the handle of the door body assembly 104 or simply pressing the door opening key of the door body assembly 104.

When the door body assembly 104 is in the closed state and the locking portion 116 of the locking member 112 is in the fixing opening 146 of the fixing member 106, the opening of the door cannot be achieved by pulling only the handle of the door body assembly 104 or pressing only the door opening key of the door body assembly 104 so that the child lock function is achieved. When the user pulls the locking member 112, the first elastic member 114 is compressed, and the locking portion 116 of the lower portion of the locking member 112 is disengaged from the fixing opening 146 of the fixing member 106. If the door body assembly 104 is pulled at the same time, the door body assembly 104 is pulled apart, thereby completing the unlocking action.

When the door body assembly 104 is closed, the fixing member 106 will contact the driving inclined surface 120 below the locking member 112, at which time the fixing member 106 will push the locking member 112 upward. Upon completion of the closing of the door body assembly 104, the locking portion 116 of the locking member 112 automatically returns into the fixing opening 146 of the fixing member 106, thereby automatically creating a child lock while the door body assembly 104 is closed.

In the cooking appliance 100 of the present disclosure, the locking of the locking assembly 108 is done automatically upon closing the door body assembly 104; unlocking of the locking assembly 108 is accomplished by pulling on the locking member 112 such that the locking portion 116 of the locking member 112 clears the fixing opening 146 of the fixing member 106.

In certain embodiments, the locking assembly 108 and the fixing member 106 have a variety of mountings. For example, as shown in FIG. 16, the locking assembly 108 may be fitted to the housing of the cavity body assembly 102 by means of screws or the like; as shown in FIG. 17, the locking assembly 108 is also mounted to the end plate 150 of the cavity body assembly 102 by screws or the like. For example, as shown in FIG. 13, the fixing member 106 may be a unitary structure with the door seal 140 of the door body assembly 104; as shown in FIG. 14, the fixing member 106 can also be a separate structure, and is assembled to the door seal 140 of the door body assembly 104 by means of screws or the like; as shown in FIG. 15, the fixing member 106 may also be a separate structure and be fitted to the door body 138 of the door body assembly 104 by screws or the like.

As shown in FIGS. 23, 24, 26, and 28, the first embodiment of the third aspect of the present disclosure provides a lock structure comprising a fixing member 106 and a locking assembly 108. Among other things, the locking assembly 108 and the fixing member 106 may cooperate to lock to restrain. For example, as shown in FIGS. 1 and 2, the lock structure provided in the present disclosure can be applied to a cooking appliance 100 and used as a child lock of the cooking appliance 100.

Figure 28:
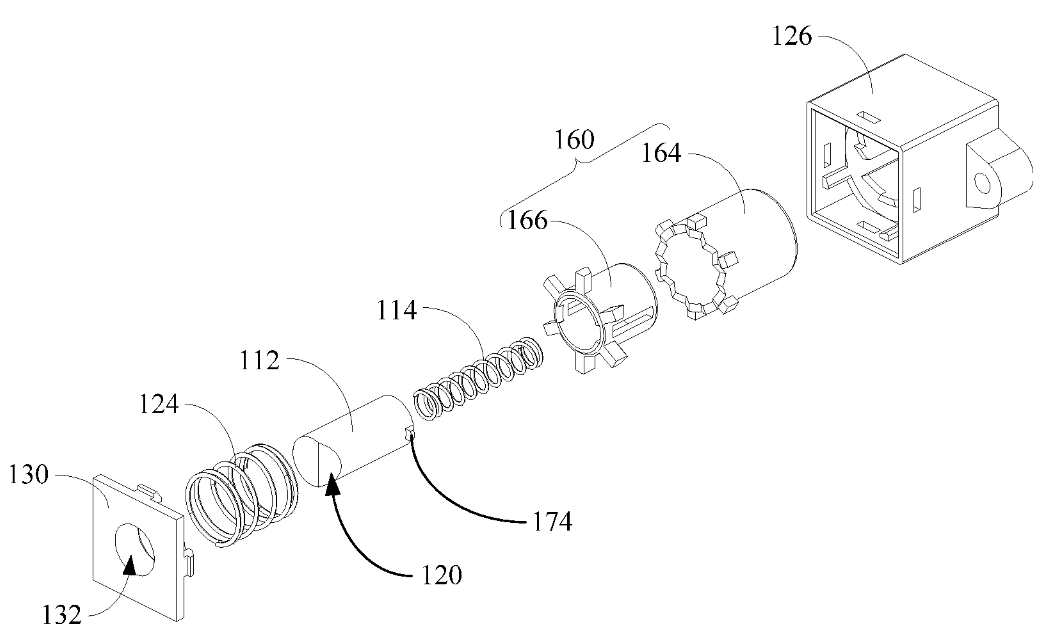
FIG. 28 is one of the exploded views of locking assembly in a lock structure of an embodiment of the present disclosure.
Figure 29:
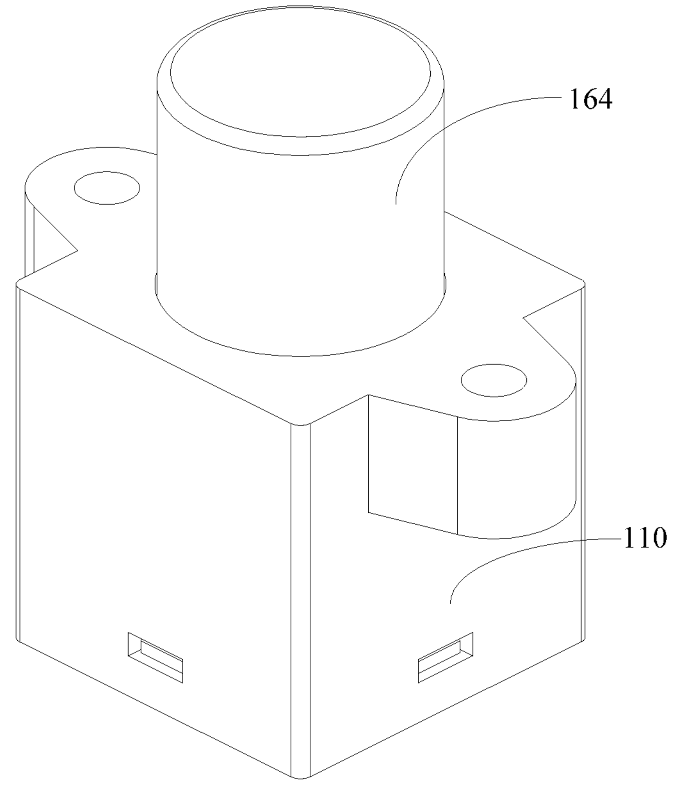
FIG. 29 is a schematic view of a locking assembly in a lock structure according to one embodiment of the present disclosure.
Figure 33:
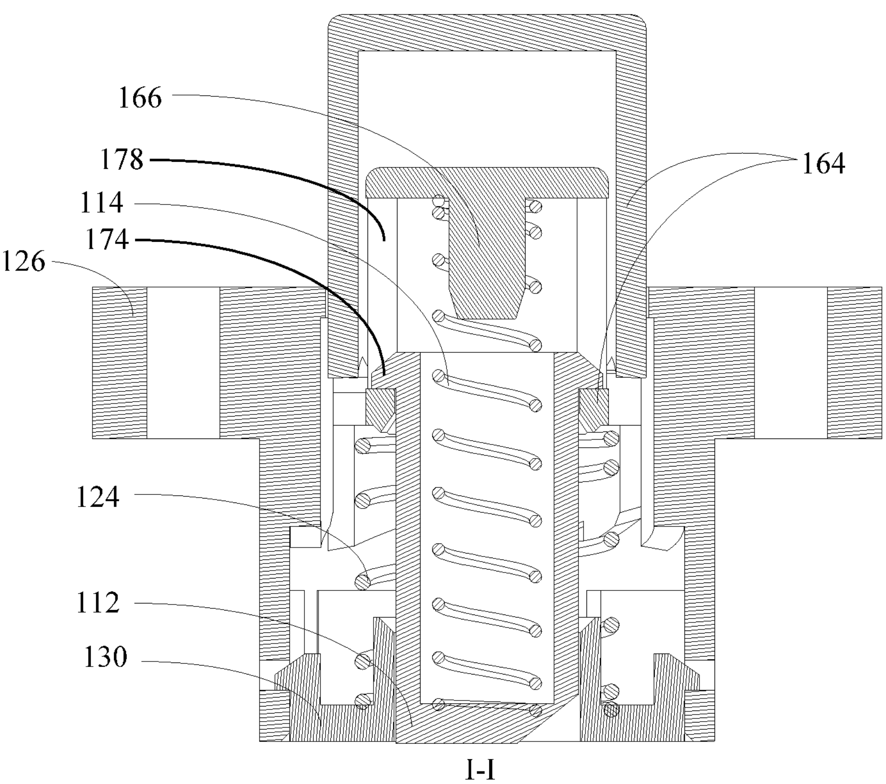
FIG. 33 is a cross-sectional view along I-I of the locking assembly shown in FIG. 32.

As shown in FIGS. 28, 29, and 33, the locking assembly 108 includes a mount 110, a driving member 160, a first elastic member 114, and a locking member 112. The mount 110 is mounted to an object external to the mount 110 (e.g. the door body assembly 104 or the cavity body assembly 102 of the cooking appliance 100). As shown in FIGS. 28 and 33, at least a portion of the driving member 160 is provided within the mount 110, and a first end of the first elastic member 114 is connected to the driving member 160, and a second end of the first elastic member 114 is connected to the locking member 112. Thus, the driving member 160 may be applied to the locking member 112 via the first elastic member 114 with a pushing force such that the locking member 112 is driven relative to the mount 110 by the driving member 160 and the first elastic member 114, thereby causing the locking member 112 to lock with the fixing member 106 through the mount 110.

In the lock structure provided by the present disclosure, as shown in FIGS. 28 and 33, the first elastic member 114 abuts against the driving member 160 and the locking member 112, thereby achieving a flexible connection between the locking member 112 and the driving member 160. Thus, with the locking assembly 108 at the locked position, the locking member 112 can still move towards the driving member 160 side due to the presence of the first elastic member 114.

For example, as shown in FIGS. 28 and 33, the fixing member 106 and the locking assembly 108 may be mounted to a cavity body assembly 102 and a door body assembly 104, respectively, such that, once the user inadvertently closes the locking assembly 108 with the door body assembly 104 opened, the fixing member 106 contacts the locking member 112 during the close of the door body assembly 104 by the user without switching the station of the locking member 112, thereby forcing the locking member 112 to move toward a side of the driving member 160. In this way, on the one hand, the connection for restraining between the locking member 112 and the fixing member 106 can be ensured, and on the other hand, the connection for restraining between the locking member 112 and the fixing member 106 does not require a user operation, which greatly improves the convenience of using the locking assembly 108.

Figure 22:
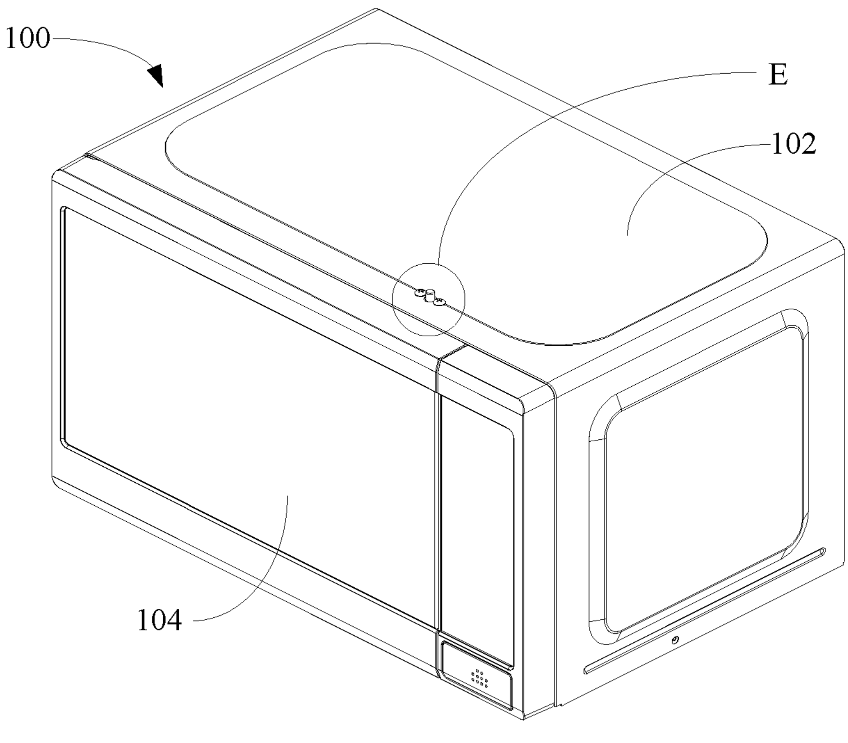
FIG. 22 is one of the structural schematic view of a cooking appliance of another embodiment of the present disclosure (a door body assembly is closed)

As shown in FIG. 22, when the door body assembly 104 is in a closed state, the locking member 112 is in a locking station; the locking member 112 is now connected to the fixing member 106 and the user cannot open the door body assembly 104. Before the door body assembly 104 is opened, the connection for restraining between the lock and the fixing member 106 is released; at this time, the locking member 112 is in an unlocking position, and the locking member 112 is separated from the fixing member 106.

Figure 23:
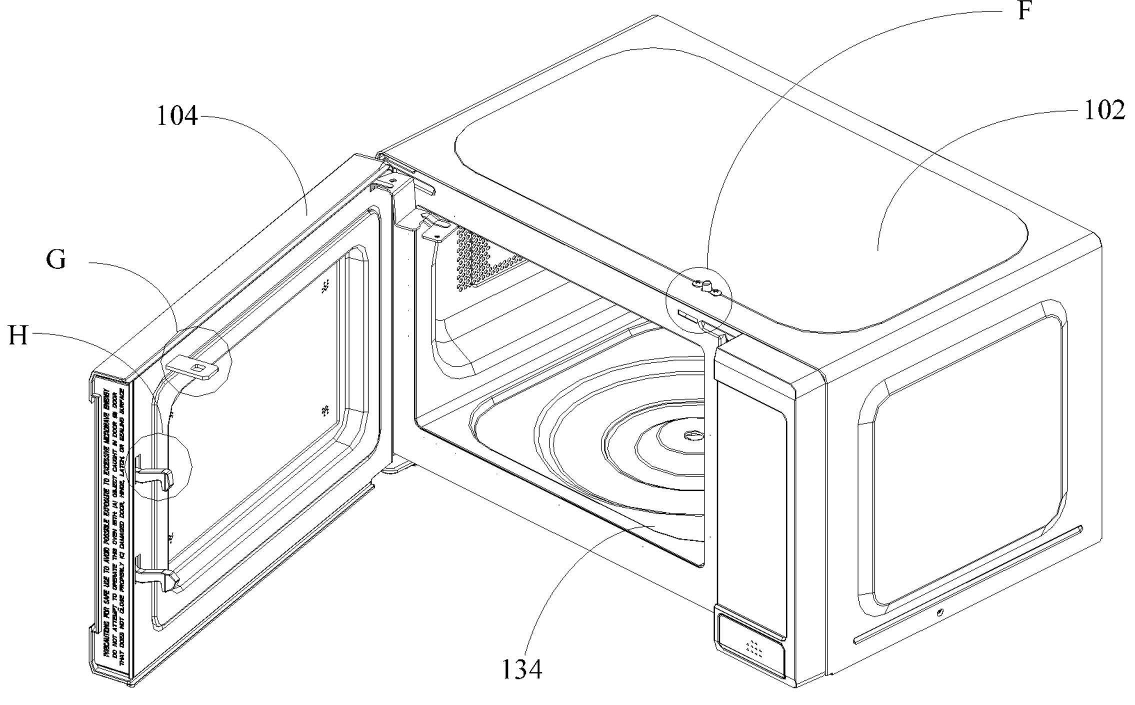
FIG. 23 is a second structural view of a cooking appliance according to another embodiment of the present disclosure (a door body assembly is opened)
Figure 24:
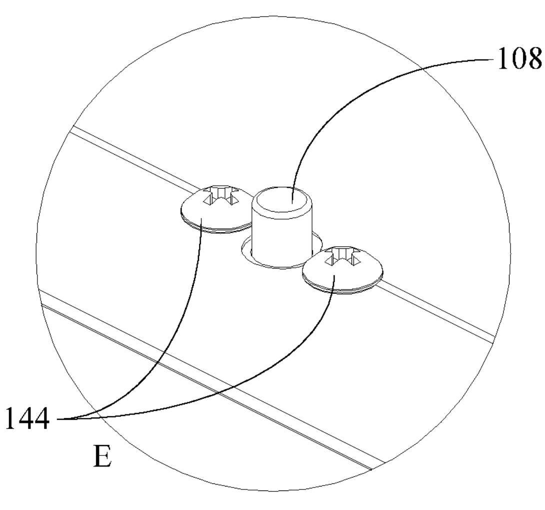
FIG. 24 is a partially enlarged view at E of the cooking appliance shown in FIG. 22.

As shown in FIG. 23, in the process of opening the door body assembly 104, the door body assembly 104 can be directly driven to separate from the cavity body assembly 102 to complete a door opening operation; at this time, the locking member 112 is still in the unlocking station. In the process of closing the door body assembly 104, the work position of the locking member 112 can be switched again after the door body assembly 104 is directly closed so that the locking member 112 is connected to the fixing member 106 for restraining.

Furthermore, as shown in FIGS. 28 and 33, as soon as the user switches the locking member 112 to the locking station when the door body assembly 104 is opened, the first elastic member 114 makes an elastic connection between the locking member 112 and the driving member 160 due to the abutment portion between the locking member 112 and the driving member 160. In this way, the user does not need to switch the station of the locking member 112 in advance to ensure that the locking member 112 can still lock with the fixing member 106 during the close of the door body assembly 104.

For example, the lock structure provided in the present disclosure is applicable to the cooking appliance 100. After the cooking process of the cooking appliance 100 is finished, the temperature of the food in the cooking cavity is high, and at this time, there is a risk of scalding for the user to directly open the door body to remove the food. Therefore, in the present disclosure, through the cooperation of the above-mentioned locking assembly 108 and the fixing member 106, if the user wants to open the door body assembly 104, it is necessary to pull the locking member 112 while opening the door body assembly 104. Thus, on the one hand, the user can be prompted, and on the other hand, the children can be prevented from mistakenly opening the door body assembly 104, which greatly improves the safety of the cooking appliance 100.

Therefore, the lock structure provided in the present disclosure cooperates with the fixing member 106 via the locking assembly 108 to enhance the unlocking difficulty of the lock structure, avoid the user, especially children, from opening the door body assembly 104 by mistake, and improve the use security of the cooking appliance 100 to which the lock structure is applied. Furthermore, the flexible connection between the driving member 160 and the locking member 112 can close the door body assembly 104 without driving the locking member 112 and ensure that the connection between the locking member 112 and the fixing member 106 is restrained even if the user mistakenly switches the locking member 112 to the locking position when the door body assembly 104 is opened.

Figure 36:
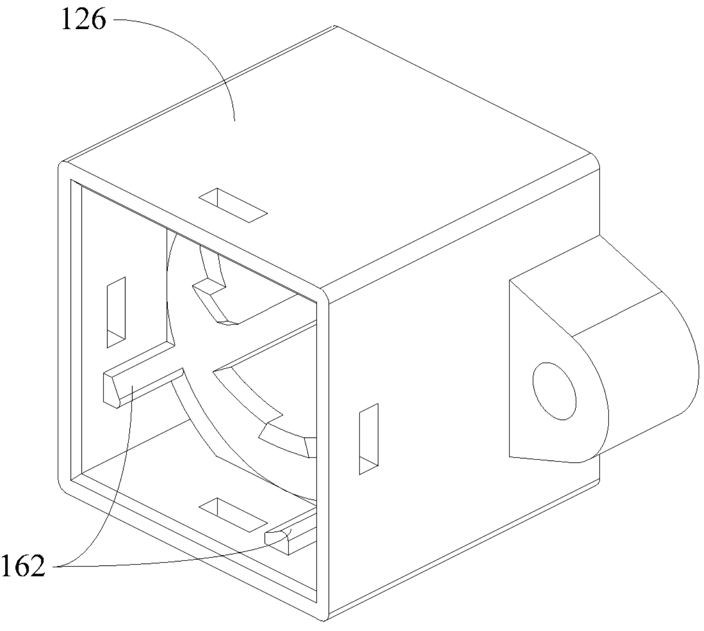
FIG. 36 is a schematic view showing a structure of a fixing bracket in the locking assembly shown in FIG. 28.
Figure 37:
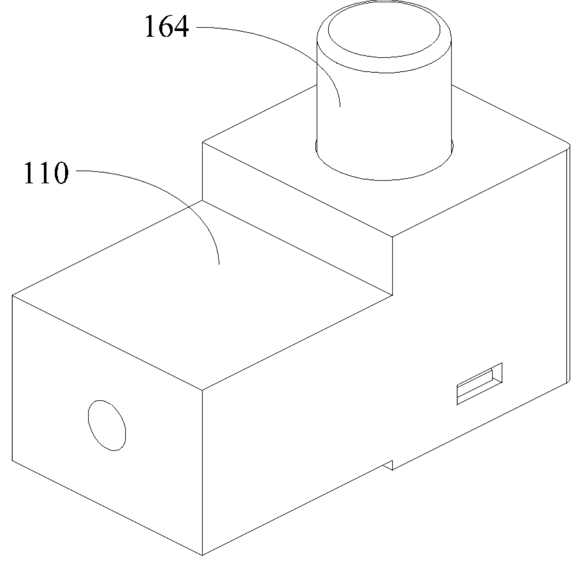
FIG. 37 is a schematic view of a locking assembly in a lock structure according to another embodiment of the present disclosure.
Figure 38:
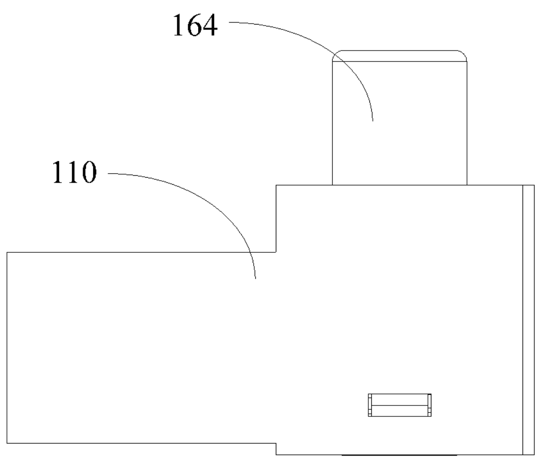
FIG. 38 is a schematic view of the locking assembly of FIG. 37 from another perspective.
Figure 39:
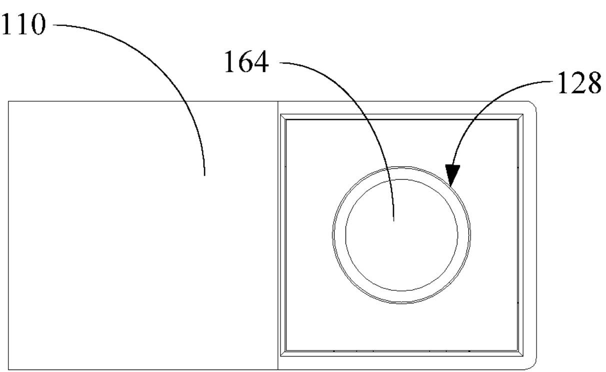
FIG. 39 is a schematic view of the locking assembly of FIG. 37 from another perspective.
Figure 40:
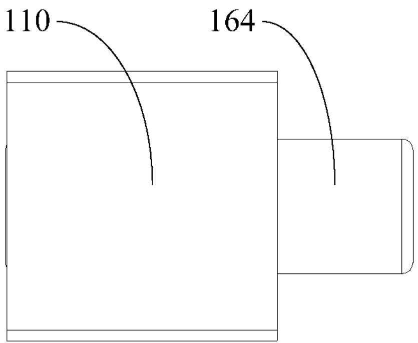
FIG. 40 is a schematic view of the locking assembly of FIG. 37 from another perspective.

A second embodiment of the third aspect of the present disclosure provides a lock structure. According to this embodiment that is and based on the first embodiment of the third aspect, as shown in FIGS. 28 and 36, the locking assembly 108 also includes a guide structure 162. The guide structure 162 is provided inside the mount 110, and at least a portion of the driving member 160 is slidably connected to the guide structure 162 and is capable of restraining the end portion of the guide structure 162 such that the locking member 112 stays at the locking station.

The end portion of the guide structure 162 is provided with a restraining portion, and at least a portion of the driving member 160 can move along the guide structure 162; when at least a portion of the driving member 160 moves to the end portion of the guide structure 162, at least a portion of the driving member 160 abuts against the restraining portion of the end portion of the guide structure 162, thereby restraining the locking member 112 to the locked position.

As shown in FIG. 36, the guide structure 162 comprises a guide rib, and the extending direction of the guide rib coincides with the moving direction of the locking member 112; at least a portion of the driving member 160 can move along the guide rib and at least a portion of the driving member 160 can abut against the end portion of the guide rib, thereby restraining the locking member 112 to the locked position.

Figure 34:
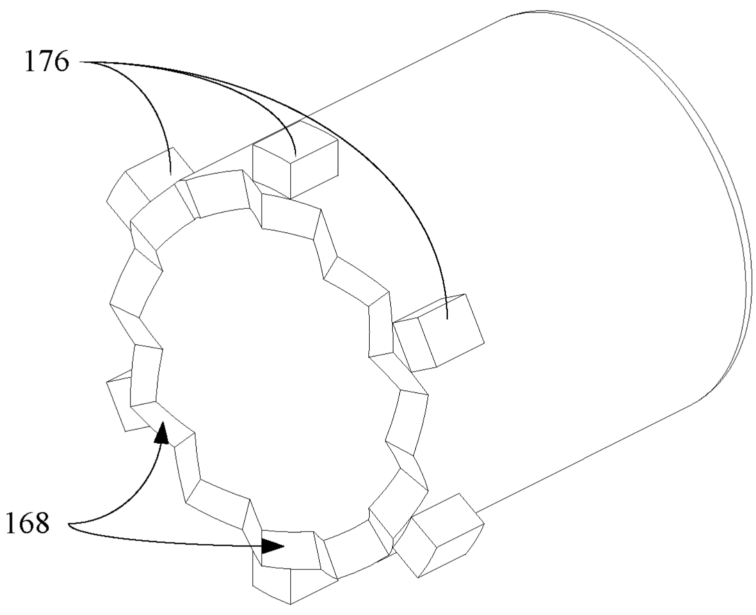
FIG. 34 is a schematic view showing a structure of a pressing member in the locking assembly shown in FIG. 28.
Figure 35:
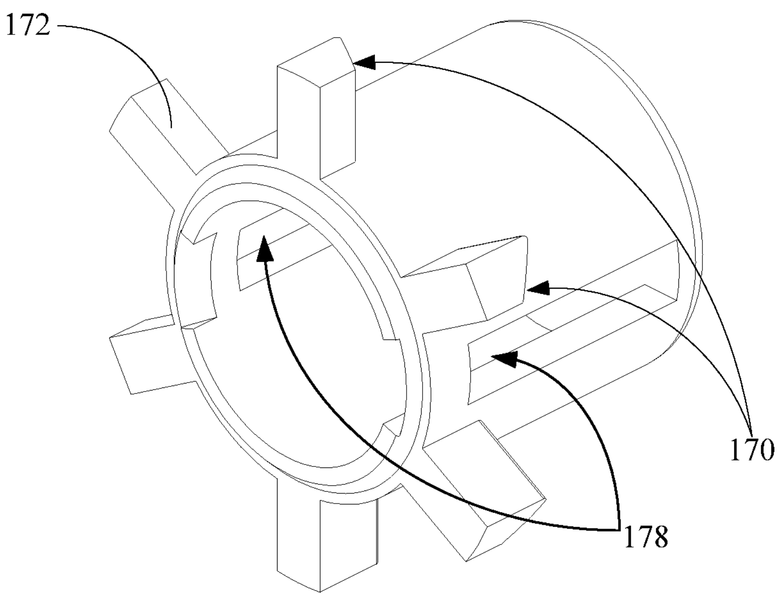
FIG. 35 is a schematic view of a moving member of the locking assembly of FIG. 28.

A third embodiment of the third aspect of the present disclosure provides a lock structure. According to this embodiment that is and based on the second embodiment of the third aspect, as shown in FIGS. 28, 34, and 35, the driving member 160 includes a pressing member 164 and a moving member 166. The pressing member 164 is movably connected to the mount 110 and penetrates through the mount 110, and at least a portion of the pressing member 164 is located throughout the outside surface of the cooking appliance 100; during the use of the cooking appliance 100, the station of the locking member 112 can be switched by pressing the pressing member 164. A moving member 166 is provided inside the mount 110 and is slidably connected to the guide structure 162.

In addition, the moving member 166 is connected to the first end of the first elastic member 114 such that the first elastic member 114 is located between the moving member 166 and the locking member 112. Therefore, during the use of the cooking appliance 100, the user can press the pressing member 164, and the pressing member 164 drives the moving member 166 to operate, and the moving member 166 drives the locking member 112 to switch the station via the first elastic member 114.

As shown in FIGS. 33, 34, and 35, the pressing member 164 includes a first inclined surface 168 and the moving member 166 includes a second inclined surface 170. When the user presses the pressing member 164, the first inclined surface 168 of the pressing member 164 contacts the second inclined surface 170 of the moving member 166.

As shown in FIG. 33, when the pressing member 164 is pressed for the first time, the moving member 166 moves along the guide structure 162; when the moving member 166 moves to the end portion of the guide structure 162, the second inclined surface 170 cooperates with the first inclined surface 168 to drive the moving member 166 to rotate so that the moving member 166 can abut against the restraining portion, and the locking member 112 is restrained to the locked position.

As shown in FIG. 33, when the pressing member 164 is pressed for a second time, the second inclined surface 170 cooperates with the first inclined surface 168 to drive the moving member 166 again into the rotation, at which time the moving member 166 moves in a reverse direction along the guide structure 162, thereby causing the moving member 166 to separate from the restraining portion, and the locking member 112 is switched from the locked position to the unlocked position.

A fourth embodiment of the third aspect of the present disclosure provides a lock structure. According to this embodiment that is and based on the third embodiment of the third aspect, as shown in FIGS. 33 and 34, the pressing member 164 includes a key column. The sidewall of the key column is provided with a third protruding portion 176 which can abut against an end portion of the mount 110, thereby ensuring that at least a portion of the mounting column is always inside the mount 110, thereby ensuring that the key column is connected to the mount 110.

During use, the first elastic member abuts against the locking member and the moving member. In this way, by restraining the abutment portion of the third protruding portion 176 against the mount, it is ensured that the key column does not disengage from the mount under the elastic force action of the first elastic member.

As shown in FIGS. 33 and 35, the moving member 166 includes a sliding jaw sleeve. The sidewall of the sliding jaw sleeve is provided with a first protruding portion 172 which is slidably connected to the guide structure 162, and the first protruding portion 172 can abut against the end portion of the guide structure 162, thereby restraining the locking member 112 to the locked position.

As shown in FIGS. 33 and 35, the interior of the key column is hollow and at least a portion of the sliding jaw sleeve can extend into the interior of the key column. In addition, the first inclined surface 168 is at an open end of the key column and a second inclined surface 170 is provided at the first protruding portion.

When the pressing member 164 is pressed for the first time, the first protruding portion 172 drives the moving member 166 to move along the guide structure 162; when the moving member 166 moves to the end portion of the guide structure 162, the second inclined surface 170 cooperates with the first inclined surface 168 to drive the moving member 166 to rotate, at which time the first protruding portion 172 abuts against the restraining portion and the locking member 112 is retained at the locked position.

When the pressing member 164 is pressed for a second time, the second inclined surface 170 cooperates with the first inclined surface 168 to again drive the moving member 166 into the rotation, at which time the moving member 166 moves in the opposite direction along the guide structure 162 under the action of the first elastic member 114, thereby separating the moving member 166 from the restraining portion, and the first protruding portion 172 is switched from the locked position to the unlocked position.

In certain embodiments, as shown in FIGS. 34 and 35, the first inclined surface 168 may be a serrated inclined surface on the key column and the second inclined surface 170 may be a serrated inclined surface on the moving member. In addition, the first inclined surface 168 and the second inclined surface 170 defined herein are not limited to the serrated inclined surfaces described above as long as they cooperate with the inclined surfaces that drive the rotation and movement of the locking member, as will be appreciated by a person skilled in the art.

In this embodiment, the interior of the moving member 166 is hollow and at least a portion of the locking member 112 is located inside the moving member 166. In addition, the sidewall of the moving member 166 is provided with the guide groove 178, and the extending direction of the guide groove 178 is consistent with the moving direction of the locking member 112; the locking member 112 is provided with a second protruding portion 174, which is located inside the guide groove 178 so that the second protruding portion 174 is slidably connected with the guide groove 178. In this way, during use, the locking member 112 can move relative to the moving member 166 under the action of the external force, thereby ensuring that even if the user inadvertently closes the locking assembly 108, the locking member 112 can be retracted into the mount 110 to ensure that the locking member 112 and the fixing member 106 can be connected for restraining.

With the door body assembly 104 opened, the first elastic member 114 abuts between the moving member 166 and the locking member 112. At this time, the second protruding portion 174 is in the middle of the guide groove 178 or in the first end of the guide groove 178 near the bottom of the mount 110 to ensure that the locking member 112 retracts inside the mount 110 driven by the external force to ensure that the locking member 112 can still lock with the fixing member 106 even if the user inadvertently closes the locking assembly 108.

In addition, during the movement of the locking member 112, the second protruding portion 174 moves along the guide groove 178, and thus plays a certain restraining and guiding role through the cooperation of the second protruding portion 174 and the guide groove 178 to improve the running stability of the locking member 112.

A fifth embodiment of the third aspect of the present disclosure provides a lock structure. According to this embodiment that is and based on the first embodiment of the third aspect, as shown in FIG. 28, the locking member 112 also includes a driving inclined surface 120. Here, after the door body assembly 104 is opened, if the user falsely triggers the locking assembly 108, and the locking member 112 is extended out of the mount 110. At this time, in the process of closing the door body assembly 104 by the user, the closing of the door body assembly 104 can be directly driven without pressing the pressing member 164 again, which is more convenient for the user operation.

In the process of closing the door body assembly 104 by the user, the fixing member 106 first comes into contact with the driving inclined surface 120 of the locking member 112, and the driving inclined surface 120 decomposes the force applied to the locking member 112 by the fixing member 106 into a horizontal component force and a vertical component force, wherein the vertical component force can be used to counteract the pushing force applied to the locking member 112 by the first elastic member 114 so that the locking member 112 moves under the action of the above-mentioned vertical component force so that the locking member 112 returns to the inside of the mount 110. At this time, the user closes the door body assembly 104.

A sixth embodiment of the third aspect of the present disclosure provides a lock structure. According to this embodiment that is based on the first embodiment of the third aspect, as shown in FIGS. 28 and 33, the locking assembly 108 further includes a second elastic member 124. The second elastic member 124 is provided within the mount 110 and abuts against the moving member 166 of the driving member 160 and the cover plate 130 of the mount 110. Thus, the stability of the locking member 112 is further improved by the cooperation of the first elastic member 114 and the second elastic member 124.

During the pressing of the pressing member 164, the pressing member 164 presses the second elastic member 124 before the pressing member 164 contacts the moving member 166, when the second elastic member 124 is in a compressed state; after the pressing member 164 contacts the moving member 166, the pressing member 164 compresses both the first elastic member 114 and the second elastic member 124 while both the first elastic member 114 and the second elastic member 124 are in compression.

As shown in FIGS. 28 and 33, when the moving member 166 is restrained to the end portion of the guide structure 162, both the first elastic member 114 and the second elastic member 124 in a compressed state apply a pushing force to the moving member 166, thereby enabling the moving member 166 to be stably restrained to the end portion of the guide structure 162. After pressing the pressing member 164 again, the moving member 166 rotates and disengages from an end portion of the guide structure 162; at this time, the first elastic member 114 and the second elastic member 124 cooperate in compression to move the moving member 166 back to the previous position. In this process, due to the cooperation of the above-mentioned first elastic member 114 and second elastic member 124, the pushing force to the driving member 160 can be greatly improved, thereby further improving the stability of the locking member 112.

A seventh embodiment of the third aspect of the present disclosure provides a lock structure. According to this embodiment that is based on the first embodiment of the third aspect, as shown in FIGS. 28, 33, and 36, the mount 110 includes a fixing bracket 126, a first opening 128, a cover plate 130, and a second opening 132. The fixing bracket 126 can ensure the stable mounting of the whole locking assembly 108; the cover plate 130 is connected to the fixing bracket 126 such that the cover plate 130 cooperates with the fixing bracket 126 to secure components such as a locking member 112 and a first elastic member 114.

Figure 32:
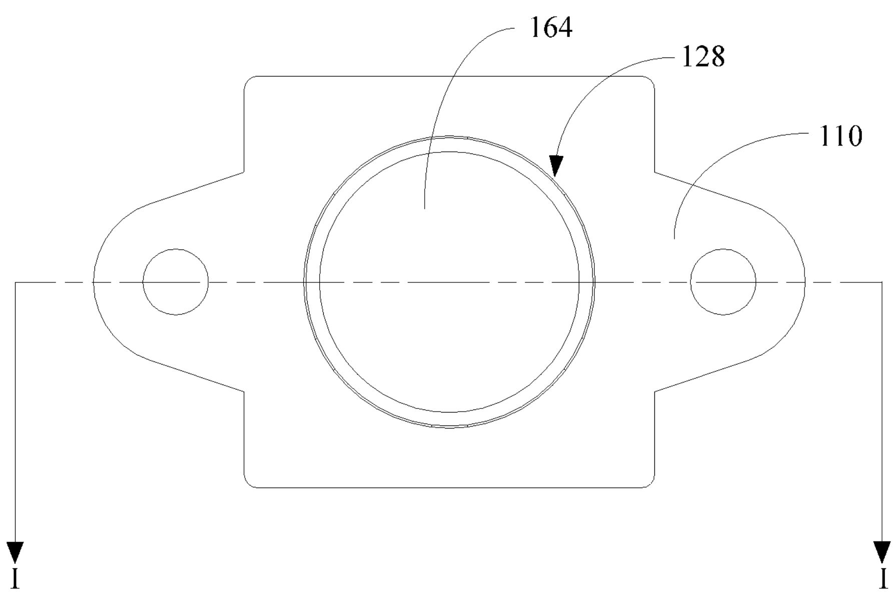
FIG. 32 is a schematic view of the locking assembly of FIG. 29 from another perspective.

In addition, as shown in FIG. 32, the fixing bracket 126 is provided with a first opening 128, the cover plate 130 is provided with a second opening 132, and the first opening 128 is provided corresponding to the second opening 132. The pressing part of the locking member 112 is provided through the first opening 128 and is located on the surface of the cooking appliance 100; the locking member 112 can be driven by the moving member 166 and the first elastic member 114 through the second opening 132 and into a fixing opening 146 of the fixing member 106 to restrain the door body assembly 104.

Figure 30:
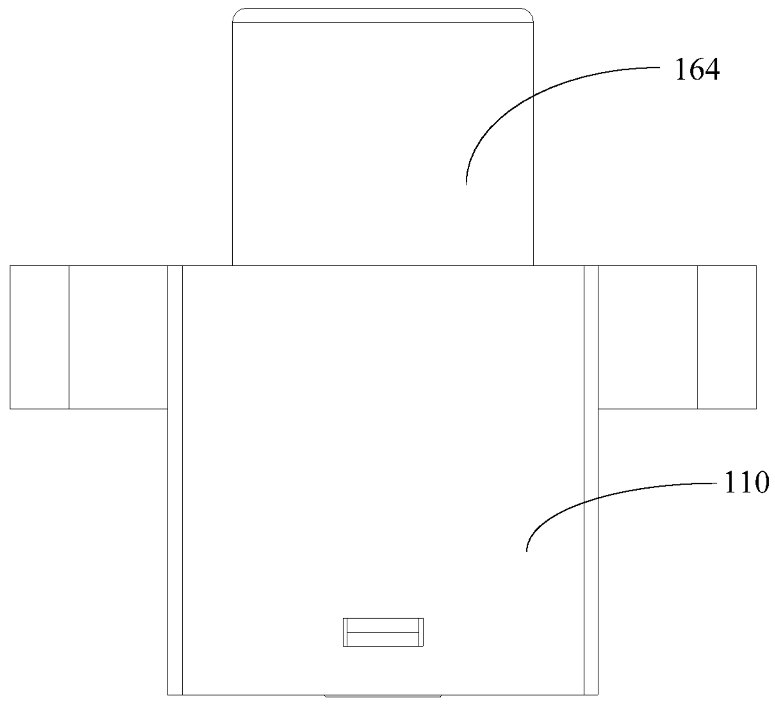
FIG. 30 is a schematic view of the locking assembly of FIG. 29 from another perspective.
Figure 31:
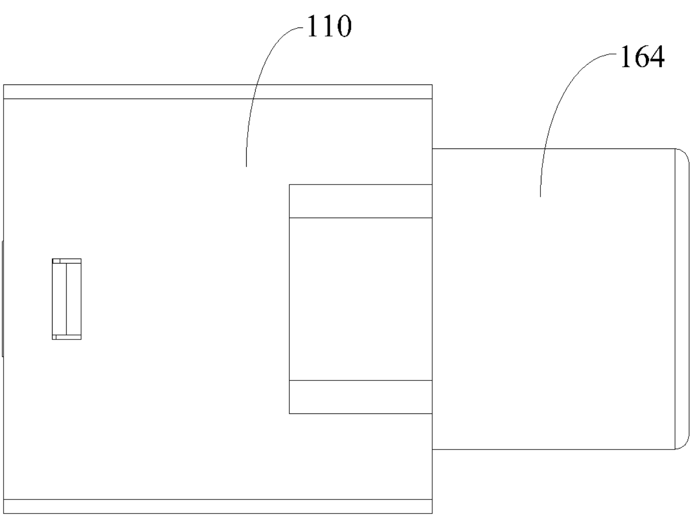
FIG. 31 is a schematic view of the locking assembly of FIG. 29 from another perspective.

In certain embodiments, as shown in FIGS. 29, 30, and 31, the fixing bracket 126 includes a snap-fit interface, and the cover plate 130 includes a snap-fit portion that snaps into the snap-fit interface to provide a connection between the cover plate 130 and the fixing bracket 126.

As shown in FIGS. 22 and 23, the first embodiment of the fourth aspect of the present disclosure provides a cooking appliance 100 comprising a cavity body assembly 102, a door body assembly 104, and a lock structure of any of the embodiments described above. Accordingly, all of the benefits of having the lock structure of any of the embodiments described above are not discussed in detail herein.

In addition, as shown in FIGS. 22 and 23, the cavity body assembly 102 comprises a cooking cavity for placing food to be cooked therein; the door body assembly 104 is in an open-close connection to the cavity body assembly 102, and serves to open or close the cooking cavity. For example, the door body assembly 104 may be rotatably connected to the cavity body assembly 102 or slidably connected to the cavity body assembly 102. One of the cavity body assembly 102 and the door body assembly 104 is provided with a fixing member 106, and the other of the cavity body assembly 102 and the door body assembly 104 is a locking assembly 108, and the locking assembly 108 cooperates with the fixing member 106 to lock the door body assembly 104 on the cavity body assembly 102. For example, the above-mentioned locking assembly 108 is a child lock and functions as an auxiliary connection.

As shown in FIG. 22, when the door body assembly 104 is in a closed state, the locking member 112 is in a locking station; the locking member 112 is now connected to the fixing member 106 and the user cannot open the door body assembly 104. Before the door body assembly 104 is opened, the connection for restraining between the lock and the fixing member 106 is released; at this time, the locking member 112 is in an unlocking position, and the locking member 112 is separated from the fixing member 106.

As shown in FIG. 23, in the process of opening the door body assembly 104, the door body assembly 104 can be directly driven to separate from the cavity body assembly 102 to complete a door opening operation; at this time, the locking member 112 is still in the unlocking station. In the process of closing the door body assembly 104, the work position of the locking member 112 can be switched again after the door body assembly 104 is directly closed so that the locking member 112 is connected to the fixing member 106 for restraining.

Furthermore, as soon as the user switches the locking member 112 to the locking station when the door body assembly 104 is opened, the first elastic member 114 makes an elastic connection between the locking member 112 and the driving member 160 due to the abutment portion between the locking member 112 and the driving member 160. In this way, the user does not need to switch the station of the locking member 112 in advance to ensure that the locking member 112 can still lock with the fixing member 106 during the close of the door body assembly 104 to restrain.

Figure 41:
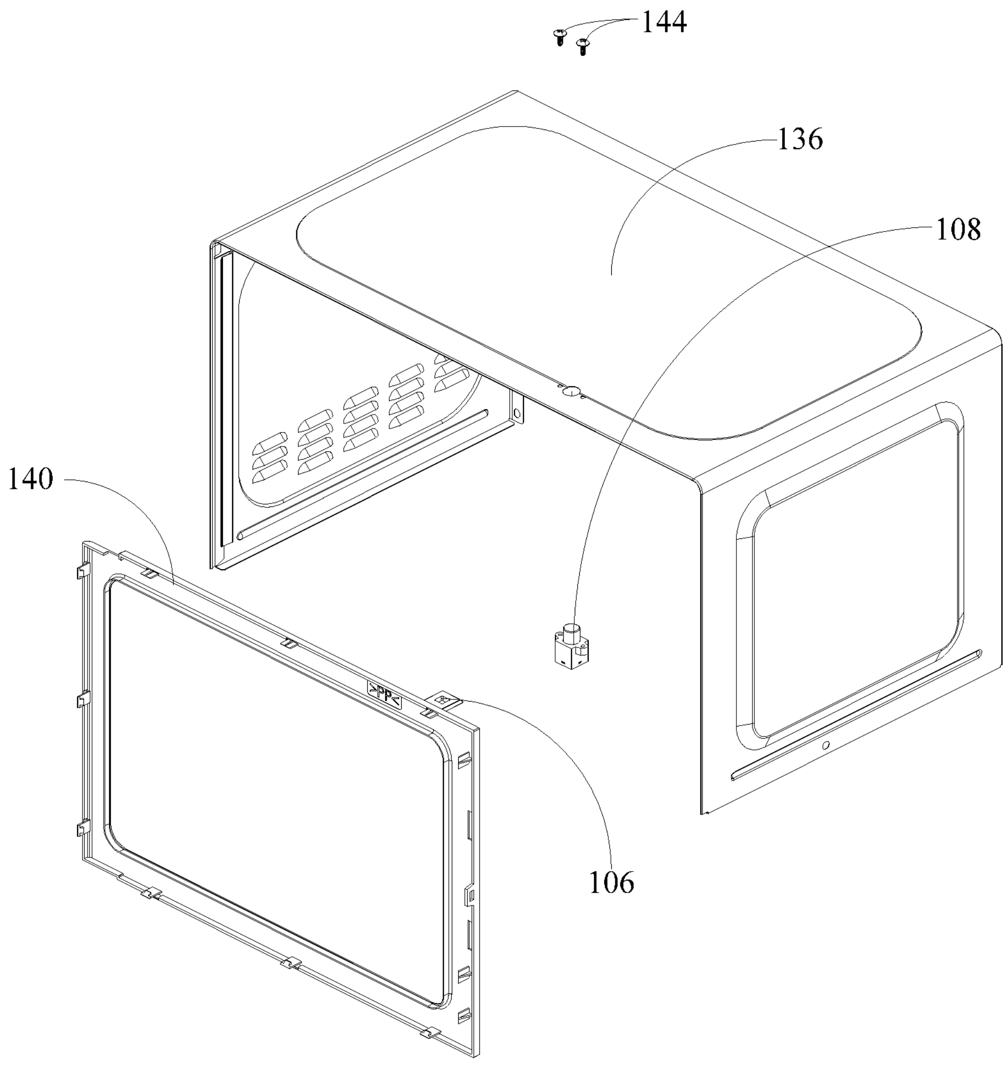
FIG. 41 is a schematic view showing the positional relationship between the locking assembly and the fixing member in the cooking appliance according to one embodiment of the present disclosure.

A second embodiment of the fourth aspect of the present disclosure provides a cooking appliance 100. According to this embodiment that is based on the first embodiment of the second aspect, as shown in FIGS. 23 and 41, the cavity body assembly 102 includes a cavity body 134 and a cover body 136. The cavity body 134 is provided with a cooking cavity, and the cooking cavity is used for placing the food to be cooked; the cover body 136 surrounds at least a portion of the cavity body 134, thereby providing good protection for the cavity body 134. In addition, there is a certain mounting cavity between the cavity body 134 and the cover body 136 so that the relevant components of the cooking appliance 100 are mounted in the mounting cavity between the cavity body 134 and the cover body 136.

Figure 27:
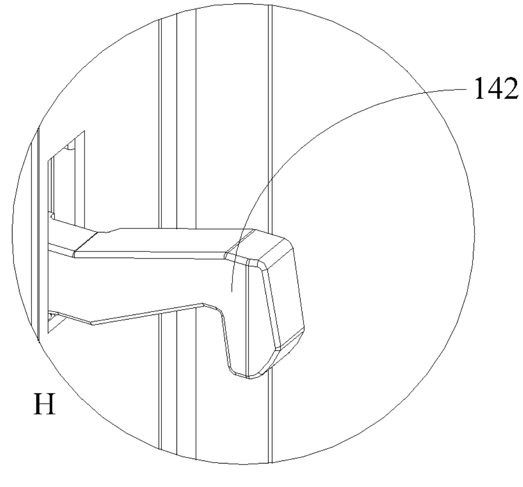
FIG. 27 is a partially enlarged view at H of the cooking appliance shown in FIG. 23.
Figure 44:
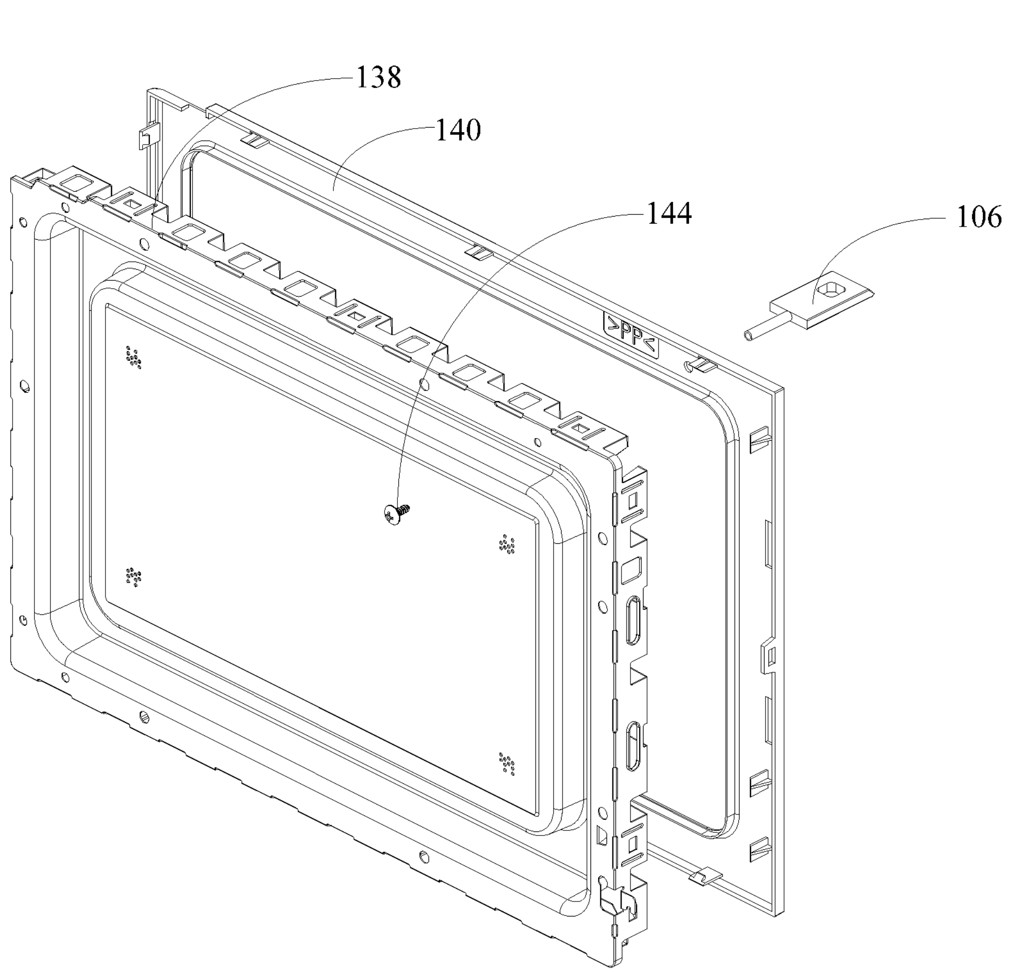
FIG. 44 is a third schematic view showing the mounting of a fixing member in a cooking appliance according to an embodiment of the present disclosure.

In this embodiment, further, as shown in FIGS. 27 and 44, the door body assembly 104 includes a door body 138, a door seal 140, and a lock catch 142. The door body 138 is connected with the cavity body assembly 102 and can be used to open or close the cooking cavity; the door seal 140 interfaces with the door body 138 and provides a good seal when the door body 138 closes the cooking cavity to ensure that the cooking cavity seals well during operation. In addition, a lock catch 142 is provided on the door body 138 or the door seal 140, and the lock catch 142 is connected with the cavity body assembly 102 when the door body 138 closes the cooking cavity to ensure a connection between the door body assembly 104 and the cavity body assembly 102.

Therefore, in the cooking appliance 100 provided in the present disclosure, the door body assembly 104 comprises a lock catch 142, and the lock catch 142 is used for connecting with the cavity body assembly 102, thereby ensuring a stable connection between the door body assembly 104 and the cavity body assembly 102. That is, the cooking appliance 100 provided in the present disclosure can first ensure the connection between the door body assembly 104 and the cavity body assembly 102 via the lock catch 142, and then can use the locking assembly 108 as a child lock so that the locking assembly 108 cooperates with the fixing member 106 to further restrict the user from opening the door body assembly 104.

A third embodiment of the third aspect of the present disclosure provides a cooking appliance 100. According to this embodiment that is based on the first embodiment of the third aspect, as shown in FIGS. 44 and 46, the mount 110 of the locking assembly 108 is connected to the cavity body 134 and the fixing member 106 is connected to the door body 138.

Figure 46:
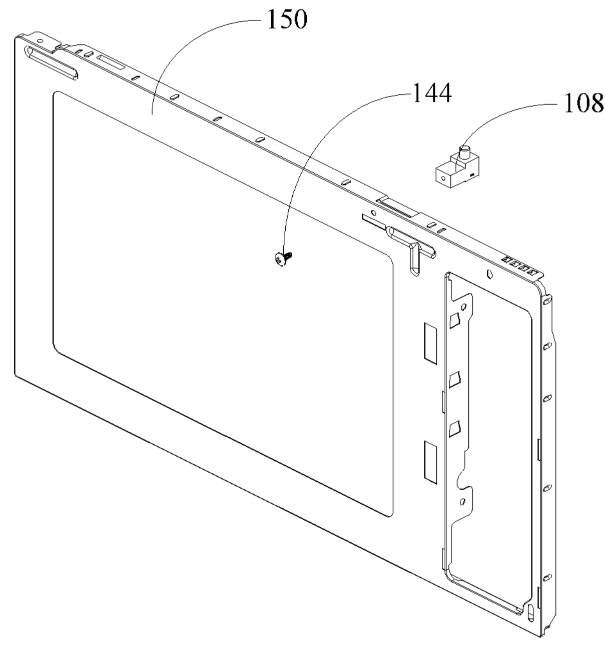
FIG. 46 is a second schematic view showing the mounting of a locking assembly in the cooking appliance according to one embodiment of the present disclosure.

As shown in FIG. 46, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Furthermore, as shown in FIG. 44, the fixing member 106 is connected to the door body 138. In addition, the door body 138 itself has a good strength and hardness, and connecting the fixing member 106 with the door body 138 can further ensure the secure connection of the fixing member 106, and improve the mating stability of the locking assembly 108 and the fixing member 106 to extend the service life of the fixing member 106 and the whole cooking appliance 100.

For example, a fastener 144, such as a screw, may be used to connect the fixing member 106 to the door body 138, or a snap fit may be used.

In this embodiment, further, the cavity body 134 includes an end plate 150 that is the front panel of the cavity body assembly 102; mount 110 is connected to end plate 150 of cavity body 134.

A fourth embodiment of the fourth aspect of the present disclosure provides a cooking appliance 100. According to this embodiment that is based on the first embodiment of the fourth aspect, as shown in FIGS. 43 and 46, the mount 110 of the locking assembly 108 is connected to the cavity body 134 and the fixing member 106 is connected to the door seal 140.

As shown in FIG. 46, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Figure 43:
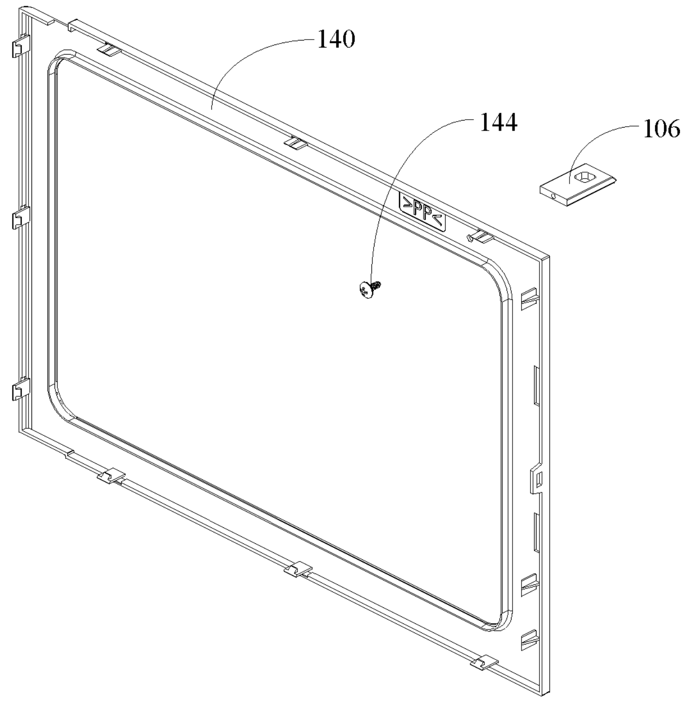
FIG. 43 is a second schematic view showing the mounting of a fixing member in a cooking appliance according to an embodiment of the present disclosure.

Furthermore, as shown in FIG. 43, the fixing member 106 is connected to a door seal 140. During the use of the cooking appliance 100, the door seal 140 is in direct contact with the cavity body assembly 102 and is closer to the cavity body assembly 102 than the door body 138. Thus, mounting the fixing member 106 in the door seal 140 reduces the size requirements for the fixing member 106 and simplifies the construction of the fixing member 106 as well as the entire cooking appliance 100.

For example, a fastener 144, such as a screw, may be used to connect the fixing member 106 to the door body 138, or a snap fit may be used.

The cavity body 134 includes an end plate 150 that is the front panel of the cavity body assembly 102; mount 110 is connected to end plate 150 of cavity body 134.

A fifth embodiment of the fourth aspect of the present disclosure provides a cooking appliance 100. According to this embodiment that based on the first embodiment of the fourth aspect, as shown in FIG. 46, the mount 110 of the locking assembly 108 is connected to the cavity body 134, and the fixing member 106 is a unitary structure (not shown) with the door body 138.

As shown in FIG. 46, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Furthermore, the fixing member 106 is of an integrated structure with the door body 138. For example, the fixing member 106 and the door body 138 are of an integrated structure, which on the one hand can reduce the use of connectors between the fixing member 106 and the door body 138, and on the other hand can greatly improve the connection strength between the fixing member 106 and the door body 138, thereby ensuring the connection stability of the fixing member 106 and the locking member 112 to prolong the service life of the fixing member 106 and the whole cooking appliance 100.

The cavity body 134 includes an end plate 150 that is the front panel of the cavity body assembly 102; mount 110 is connected to end plate 150 of cavity body 134.

A sixth embodiment of the fourth aspect of the present disclosure provides a cooking appliance 100. According to this embodiment that is based on the first embodiment of the fourth aspect, as shown in FIGS. 42 and 46, the mount 110 of the locking assembly 108 is connected to the cavity body 134 and the fixing member 106 and the door seal 140 are of an integrated structure.

As shown in FIG. 46, the mount 110 of the locking assembly 108 is connected to the cavity body 134. The cavity body 134 itself has good strength and hardness, and the connection of the mount 110 of the locking assembly 108 to the cavity body 134 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the cavity body 134, or a snap fit may be used.

Figure 42:
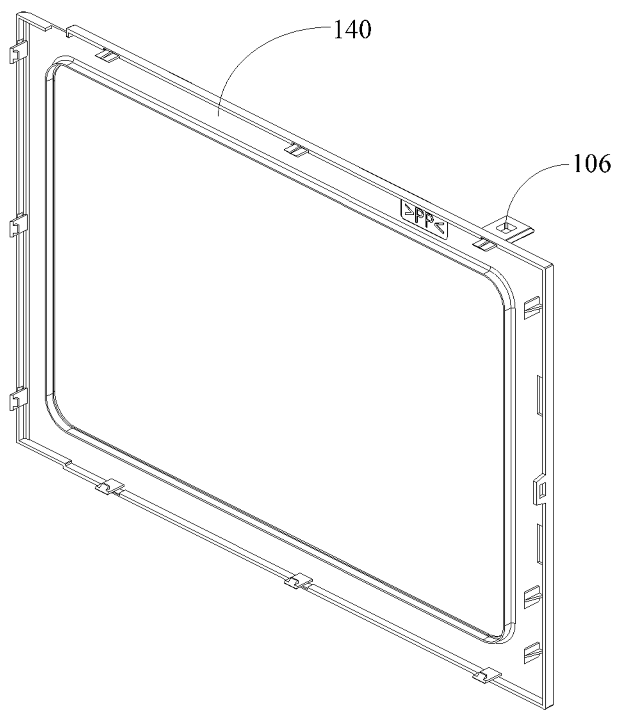
FIG. 42 is one of schematic views showing the mounting a fixing member in a cooking appliance according to an embodiment of the present disclosure.

Furthermore, as shown in FIG. 42, the fixing member 106 is of an integrated structure with the door seal 140. The fixing member 106 and the door seal 140 are of an integrated structure, which on the one hand can reduce the use of connectors between the fixing member 106 and the door seal 140, and on the other hand can greatly improve the connection strength between the fixing member 106 and the door seal 140, thereby ensuring the connection stability of the fixing member 106 and the locking member 112 to prolong the service life of the fixing member 106 and the whole cooking appliance 100.

The cavity body 134 includes an end plate 150 that is the front panel of the cavity body assembly 102; mount 110 is connected to end plate 150 of cavity body 134.

A seventh embodiment of the fourth aspect of the present disclosure provides a cooking appliance 100. According to this embodiment that is based on the first embodiment of the fourth aspect, as shown in FIGS. 44 and 45, the mount 110 of the locking assembly 108 is connected to the cover body 136 and the fixing member 106 is connected to the door body 138.

Figure 45:
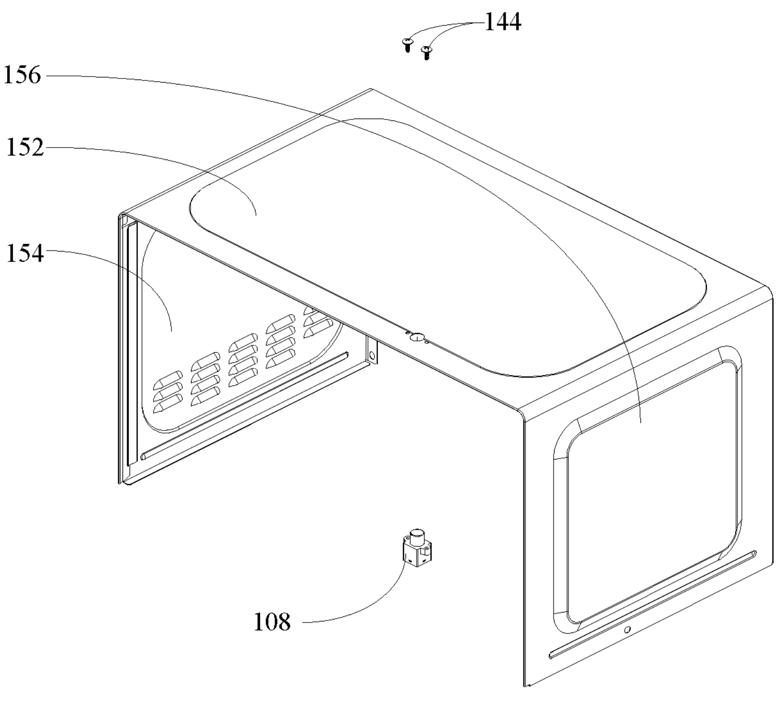
FIG. 45 is one of mounting schematics of a locking assembly in a cooking appliance according to an embodiment of the present disclosure.

As shown in FIG. 45, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 of the locking assembly 108 and the cover body 136 can reduce the structural and manufacturing requirements of the cavity body 134 and further improve the manufacturing efficiency of the cavity body 134.

For example, a fastener 144 such as a screw can be used for connection between the mount 110 and the cover body 136, or a snap fit may be used.

Furthermore, as shown in FIG. 44, the fixing member 106 is connected to the door body 138. The door body 138 itself has a good strength and hardness, and connecting the fixing member 106 with the door body 138 can further ensure the secure connection of the fixing member 106, and improve the mating stability of the locking assembly 108 and the fixing member 106 to extend the service life of the fixing member 106 and the whole cooking appliance 100.

For example, a fastener 144, such as a screw, may be used to connect the fixing member 106 to the door body 138, or a snap fit may be used.

In this embodiment, further, as shown in FIG. 45, the cover body 136 includes a top plate 152, a first side plate 154, and a second side plate 156. The first side plate 154 is connected to a first side of the top plate 152 and the second side plate 156 is connected to a second side of the top plate 152. The mount 110 of the locking assembly 108 is connected to the top plate 152 and is positioned between a first side plate 154 and a second side plate 156. In this way, the locking assembly 108 is located at the top of the cavity body 134, and snap-in mounting of the mount 110 is ensured.

An eighth embodiment of the fourth aspect of the present disclosure provides a cooking appliance 100. According to this embodiment that is based on the first embodiment of the fourth aspect, as shown in FIGS. 43 and 44, the mount 110 of the locking assembly 108 is connected to the cover body 136 and the fixing member 106 is connected to the door seal 140.

As shown in FIG. 45, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 and the cover body 136 can reduce the structural and manufacturing requirements of the cavity body 134 and further improve the manufacturing efficiency of the cavity body 134.

For example, a fastener 144 such as a screw can be used for connection between the mount 110 and the cover body 136, or a snap fit may be used.

Furthermore, as shown in FIG. 43, the fixing member 106 is connected to a door seal 140. During the use of the cooking appliance 100, the door seal 140 is in direct contact with the cavity body assembly 102 and is closer to the cavity body assembly 102 than the door body 138. Thus, mounting the fixing member 106 in the door seal 140 reduces the size requirements for the fixing member 106 and simplifies the construction of the fixing member 106 as well as the entire cooking appliance 100.

For example, a fastener 144 such as a screw can be used for connection between the fixing member 106 and the door seal 140, and a snap can also be used for snap-fitting.

Furthermore, the cover body 136 includes a top plate 152, a first side plate 154, and a second side plate 156. The mount 110 of the locking assembly 108 is connected to the top plate 152 and is positioned between a first side plate 154 and a second side plate 156.

A ninth embodiment of the fourth aspect of the present disclosure provides a cooking appliance 100. According to this embodiment that is based on the first embodiment of the fourth aspect, as shown in FIG. 45, the mount 110 of the locking assembly 108 is connected to the cover body 136, and the fixing member 106 is a unitary structure (not shown) with the door body 138.

As shown in FIG. 45, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 and the cover body 136 can reduce the structural and manufacturing requirements of the cavity body 134 and further improve the manufacturing efficiency of the cavity body 134.

For example, a fastener 144 such as a screw can be used for connection between the mount 110 and the cover body 136, or a snap fit may be used.

Furthermore, the fixing member 106 is of an integrated structure with the door body 138. The fixing member 106 is of an integrated structure with the door body 138. For example, the fixing member 106 and the door body 138 are of an integrated structure, which on the one hand can reduce the use of connectors between the fixing member 106 and the door body 138, and on the other hand can greatly improve the connection strength between the fixing member 106 and the door body 138, thereby ensuring the connection stability of the fixing member 106 and the locking member 112 to prolong the service life of the fixing member 106 and the whole cooking appliance 100.

Furthermore, the cover body 136 includes a top plate 152, a first side plate 154, and a second side plate 156. The mount 110 of the locking assembly 108 is connected to the top plate 152 and is positioned between a first side plate 154 and a second side plate 156.

A tenth embodiment of the fourth aspect of the present disclosure provides a cooking appliance 100. According to this embodiment that is based on the first embodiment of the fourth aspect, as shown in FIGS. 42 and 45, the mount 110 of the locking assembly 108 is connected to the cover body 136, and the fixing member 106 is of an integrated structure with the door seal 140.

As shown in FIG. 45, the mount 110 of the locking assembly 108 is connected to the cover body 136. The cover body 136 has a relatively simple structure, and the connection of the mount 110 of the locking assembly 108 to the cover body 136 can reduce the difficulty in mounting the locking assembly 108, thereby improving the assembly efficiency of the locking assembly 108 and the cooking appliance 100. Furthermore, the connection between the mount 110 and the cover body 136 can reduce the structural and manufacturing requirements of the cavity body 134 and further improve the manufacturing efficiency of the cavity body 134.

For example, a fastener 144 such as a screw can be used for connection between the mount 110 and the cover body 136, or a snap fit may be used.

Furthermore, as shown in FIG. 42, the fixing member 106 is of an integrated structure with the door seal 140. For example, the fixing member 106 and the door seal 140 are of an integrated structure, which on the one hand can reduce the use of connectors between the fixing member 106 and the door seal 140, and on the other hand can greatly improve the connection strength between the fixing member 106 and the door seal 140, thereby ensuring the connection stability of the fixing member 106 and the locking member 112 to prolong the service life of the fixing member 106 and the whole cooking appliance 100.

Furthermore, the cover body 136 includes a top plate 152, a first side plate 154, and a second side plate 156. The mount 110 of the locking assembly 108 is connected to the top plate 152 and is positioned between a first side plate 154 and a second side plate 156.

A eleventh embodiment of the fourth aspect of the present disclosure provides a cooking appliance 100. According to this embodiment that is based on the first embodiment of the fourth aspect, the fixing member 106 is connected to the cavity body 134, and the mount 110 of the locking assembly 108 is connected to the door body 138 (this arrangement is not shown, and this embodiment changes the arrangement position of the locking assembly 108 and the fixing member 106 with respect to the third embodiment of the fourth aspect so that a person skilled in the art can understand this embodiment).

The fixing member 106 is connected to the cavity body 134. The cavity body 134 itself has a good strength and hardness, and connecting the fixing member 106 with the cavity body 134 can further ensure the secure connection of the fixing member 106, and improve the mating stability of the locking assembly 108 and the fixing member 106 to extend the service life of the fixing member 106 and the whole cooking appliance 100.

For example, a fastener 144 such as a screw can be used for connection between the fixing member 106 and the cavity body 134, and a snap can also be used for snap-fitting.

In addition, the mount 110 of the locking assembly 108 is connected to the door body 138. The door body 138 itself has good strength and hardness, and the connection of the mount 110 of the locking assembly 108 to the door body 138 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the door body 138, or a snap fit may be used.

A twelfth embodiment of the fourth aspect of the present disclosure provides a cooking appliance 100. According to this embodiment that is based on the first embodiment of the fourth aspect, the fixing member 106 is connected to the cavity body 134, and the mount 110 of the locking assembly 108 is connected to the door seal 140 (this arrangement is not shown, and this embodiment changes the arrangement position of the locking assembly 108 and the fixing member 106 with respect to the fourth embodiment of the fourth aspect so that a person skilled in the art can understand this embodiment).

The fixing member 106 is connected to the cavity body 134. The cavity body 134 itself has a good strength and hardness, and connecting the fixing member 106 with the cavity body 134 can further ensure the secure connection of the fixing member 106, and improve the mating stability of the locking assembly 108 and the fixing member 106 to extend the service life of the fixing member 106 and the whole cooking appliance 100.

For example, a fastener 144 such as a screw can be used for connection between the fixing member 106 and the cavity body 134, and a snap can also be used for snap-fitting.

In addition, the mount 110 of the locking assembly 108 is connected to the door seal 140. During the use of the cooking appliance 100, the door seal 140 is in direct contact with the cavity body assembly 102 and is closer to the cavity body assembly 102 than the door body 138. Thus, mounting the mount 110 of the locking assembly 108 to the door seal 140 may reduce the size requirements for the mount 110 of the locking assembly 108 and may simplify the structure of the mount 110 of the locking assembly 108 and the overall cooking appliance 100.

For example, the mount 110 of the locking assembly 108 may be connected to the door body 138 using a fastener 144, such as a screw, or may be snap-fit.

A third embodiment of the fourth aspect of the present disclosure provides a cooking appliance 100. According to the embodiment that is based on the first embodiment of the fourth aspect, the fixing member 106 is connected to the cavity body 134, and the mount 110 of the locking assembly 108 and the door body 138 are of an integrated structure (this arrangement is not shown in the drawings, and this embodiment changes the arrangement position of the locking assembly 108 and the fixing member 106 with respect to the fifth embodiment of the fourth aspect so that a person skilled in the art can understand this embodiment).

The fixing member 106 is connected to the cavity body 134. The cavity body 134 itself has a good strength and hardness, and connecting the fixing member 106 with the cavity body 134 can further ensure the secure connection of the fixing member 106, and improve the mating stability of the locking assembly 108 and the fixing member 106 to extend the service life of the fixing member 106 and the whole cooking appliance 100.

For example, a fastener 144 such as a screw can be used for connection between the fixing member 106 and the cavity body 134, and a snap can also be used for snap-fitting.

In addition, the mount 110 of the locking assembly 108 is of an integrated structure with the door body 138. For example, the mount 110 of the locking assembly 108 and the door body 138 are of an integrated structure, on the one hand, reducing the use of the connection between the mount 110 of the locking assembly 108 and the door body 138, and on the other hand, greatly improving the strength of the connection between the mount 110 of the locking assembly 108 and the door body 138, thereby ensuring the stability of the connection between the fixing member 106 and the locking member 112, thereby extending the service life of the locking assembly 108 and the entire cooking appliance 100.

A fourteenth embodiment of the fourth aspect of the present disclosure provides a cooking appliance 100. According to this embodiment that is based on the first embodiment of the fourth aspect, the fixing member 106 is connected to the cavity body 134, and the mount 110 of the locking assembly 108 and the door seal 140 are of an integrated structure (this arrangement is not shown in the drawings, and this embodiment changes the arrangement position of the locking assembly 108 and the fixing member 106 with respect to the sixth embodiment of the fourth aspect so that a person skilled in the art can understand this embodiment).

The fixing member 106 is connected to the cavity body 134. The cavity body 134 itself has a good strength and hardness, and connecting the fixing member 106 with the cavity body 134 can further ensure the secure connection of the fixing member 106, and improve the mating stability of the locking assembly 108 and the fixing member 106 to extend the service life of the fixing member 106 and the whole cooking appliance 100.

For example, a fastener 144 such as a screw can be used for connection between the fixing member 106 and the cavity body 134, and a snap can also be used for snap-fitting.

In addition, the mount 110 of the locking assembly 108 is of an integrated structure with the door seal 140. On the one hand, the use of the connection between the mount 110 of the locking assembly 108 and the door seal 140 can be reduced, and on the other hand, the connection strength between the mount 110 of the locking assembly 108 and the door seal 140 can be greatly improved, thereby ensuring the connection stability between the fixing member 106 and the locking member 112, thereby extending the service life of the fixing member 106 and the entire cooking appliance 100.

A fifteenth embodiment of the fourth aspect of the present disclosure provides a cooking appliance 100. According to this embodiment that is based on the first embodiment of the fourth aspect, the fixing member 106 is connected to the cover body 136, and the mount 110 of the locking assembly 108 is connected to the door body 138 (this arrangement is not shown, and this embodiment changes the arrangement position of the locking assembly 108 and the fixing member 106 with respect to the seventh embodiment of the fourth aspect, so it will be understood by a person skilled in the art).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is connected to the door body 138. The door body 138 itself has good strength and hardness, and the connection of the mount 110 of the locking assembly 108 to the door body 138 further ensures the secure connection of the locking assembly 108 and improves the stability of the cooperation of the locking assembly 108 with the fixing member 106 to extend the service life of the locking assembly 108 and the entire cooking appliance 100.

For example, a fastener 144 such as a screw can be used for connection between the mount 110 and the door body 138, or a snap fit may be used.

A sixteenth embodiment of the fourth aspect of the present disclosure provides a cooking appliance 100. According to this embodiment that is based on the first embodiment of the fourth aspect, the fixing member 106 is connected to the cover body 136, and the mount 110 of the locking assembly 108 is connected to the door seal 140 (this arrangement is not shown, and this embodiment changes the arrangement position of the locking assembly 108 and the fixing member 106 with respect to the eighth embodiment of the fourth aspect, so it will be understood by a person skilled in the art).

The fixing member 106 is connected to the cover body 136. The structure of the cover body 136 is relatively simple, and the connection of the fixing member 106 with the cover body 136 can reduce the mounting difficulty of the fixing member 106, thereby improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is connected to the door seal 140. During the use of the cooking appliance 100, the door seal 140 is in direct contact with the cavity body assembly 102 and is closer to the cavity body assembly 102 than the door body 138. Thus, mounting the mount 110 of the locking assembly 108 to the door seal 140 may reduce the size requirements for the locking assembly 108 and may simplify the structure of the locking assembly 108 and the overall cooking appliance 100.

For example, a fastener 144 such as a screw can be used for connection between the mount 110 and the door body 138, or a snap fit may be used.

A seventeenth embodiment of the fourth aspect of the present disclosure provides a cooking appliance 100. According to this embodiment that is based on the first embodiment of the fourth aspect, the fixing member 106 is connected to the cover body 136, and the mount 110 of the locking assembly 108 and the door body 138 are of an integrated structure (this arrangement is not shown in the drawings, and this embodiment changes the arrangement position of the locking assembly 108 and the fixing member 106 with respect to the ninth embodiment of the fourth aspect so that a person skilled in the art can understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is of an integrated structure with the door body 138. For example, the mount 110 and the door body 138 are of an integrated structure that, on the one hand, reduces the use of the connection between the mount 110 and the door body 138, and, on the other hand, greatly improves the strength of the connection between the mount 110 and the door body 138, thereby ensuring the stability of the connection between the fixing member 106 and the locking member 112 to extend the service life of the locking assembly 108 and the entire cooking appliance 100.

An eighth embodiment of the fourth aspect of the present disclosure provides a cooking appliance 100. According to this embodiment that is based on the first embodiment of the fourth aspect, the fixing member 106 is connected to the cover body 136, and the mount 110 of the locking assembly 108 and the door seal 140 are of an integrated structure (this arrangement is not shown in the drawings, and this embodiment changes the arrangement position of the locking assembly 108 and the fixing member 106 with respect to the tenth embodiment of the fourth aspect so that a person skilled in the art can understand this embodiment).

The fixing member 106 is connected to the cover body 136. The structure of the cover body 136 is relatively simple, and the connection of the fixing member 106 with the cover body 136 can reduce the mounting difficulty of the fixing member 106, thus improving the assembly efficiency of the locking assembly 108 and the cooking appliance 100. Furthermore, the connection between the fixing member 106 and the cover body 136 can reduce the structural and manufacturing requirements of the cavity body 134 and further improve the manufacturing efficiency of the cavity body 134.

For example, a fastener 144, such as a screw, may be used to connect the fixing member 106 to the cover body 136, or a snap fit may be used.

In addition, the mount 110 of the locking assembly 108 is of an integrated structure with the door seal 140. For example, the mount 110 and the door seal 140 are of an integrated structure that, on the one hand, reduces the use of the connection between the mount 110 and the door seal 140, and, on the other hand, greatly enhances the strength of the connection between the mount 110 and the door seal 140, thereby ensuring the stability of the connection between the fixing member 106 and the locking member 112 to extend the useful life of the locking assembly 108 and the overall cooking appliance 100.

Based on any of the above embodiments, further, as shown in FIGS. 22 and 23, the cooking appliance 100 provided by the present disclosure includes, but is not limited to: a microwave oven, an oven, a steaming box or a steaming and roasting integrated machine.

Based on any of the embodiments described above, further, as shown in FIGS. 22, 23, 24 and 25, the locking assembly 108 is a child lock.

Based on any of the above-mentioned embodiments, further, as shown in FIGS. 28 and 33, in the cooking appliance 100 provided in the present disclosure, the first elastic member 114 includes a spring; the second elastic member 124 comprises a spring; the locking member 112 includes a locking member; the fixing member 106 includes a locking pin, and a fixing opening 146 is provided at a central portion of the locking pin.

Based on any of the embodiments described above, further, as shown in FIGS. 29, 30, 31, 32, and 43, the shape of the mount 110 of the locking assembly 108 is more flexible when the locking assembly 108 is provided in the cover body 136.

Based on any of the embodiments described above, further, as shown in FIGS. 37, 38, 39, and 40, when the locking assembly 108 is provided on the door body 138, the mount 110 of the locking assembly 108 needs to have a certain protrusion, thereby ensuring that the mount 110 can be connected to the door body 138 to avoid affecting the mounting of the locking assembly 108 due to the excessive thickness of the door body 138.

After cooking is done, a user can directly open a door body assembly 104 of a cooking appliance 100, and the food just cooked at this time tends to be at a higher temperature, with the possibility of scalding the user. Especially after the children cook food with the cooking appliance 100, accidents are more likely to occur.

Figure 25:
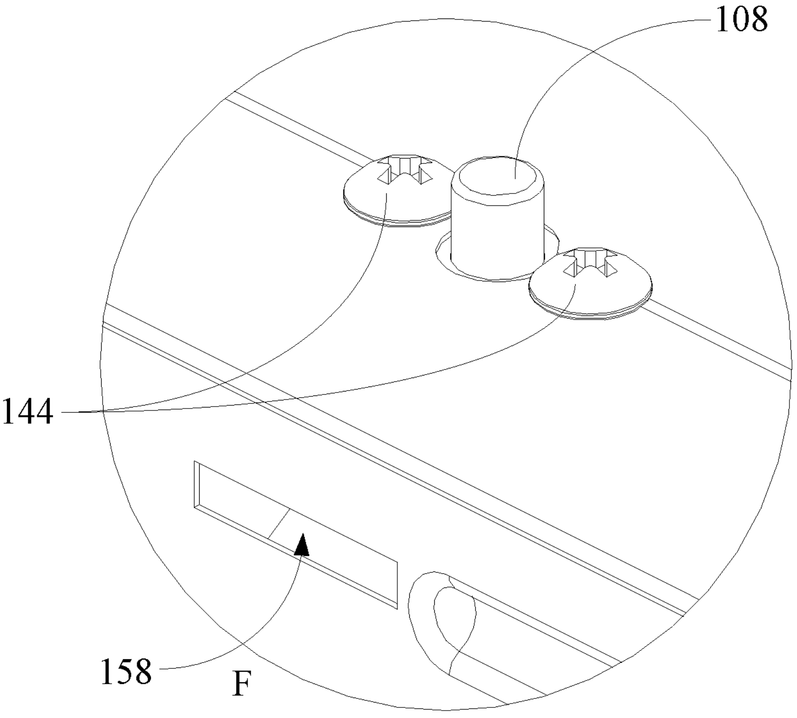
FIG. 25 is a partially enlarged view at F of the cooking appliance shown in FIG. 23.
Figure 26:
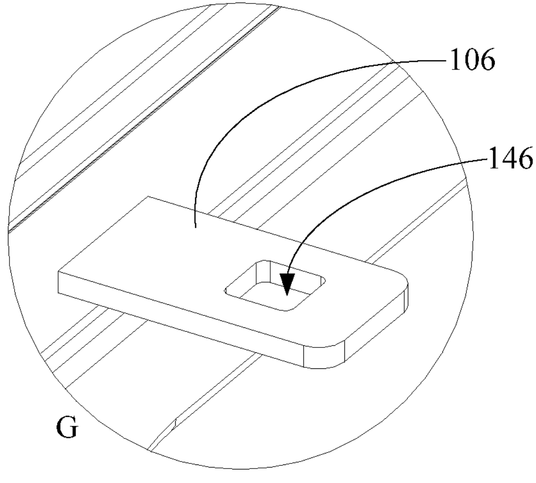
FIG. 26 is a partially enlarged view at G of the cooking appliance shown in FIG. 23.

Further to any of the above embodiments, as shown in FIG. 25, when the locking assembly 108 is provided in the cavity body assembly 102 and the fixing member 106 is provided in the door body assembly 104, the end plate 150 of the cavity body assembly 102 is provided with an insertion opening 158 into which the fixing member 106 can extend to lock the fixing member 106 to the locking member 112.

In the related art, a key-type lock structure is used to restrain the opening and closing of the door body assembly; however, when the door body assembly is opened, there is a case where the user falsely triggers a key-type structure, and at this time, the user cannot close the key-type lock structure, resulting in the impossibility of the user to close the door body assembly.

As shown in FIGS. 22, 23, 24, 25 and 26, the cooking appliance 100 provided in the present disclosure is provided with a lock structure, and the connection restraint between the locking assembly 108 and the fixing member 106 must be released before the door pressing or pulling action is completed to complete the door opening action.

In the cooking appliance 100 according to the present disclosure, the press-type locking assembly 108 is engaged with the fixing member 106, and this press-type locking assembly 108 can effectively prevent the door body assembly 104 from being closed due to the locking assembly 108 being mistakenly touched after the door body assembly 104 is opened.

As shown in FIG. 33, the locking assembly 108 includes a pressing member 164, a moving member 166, a locking member 112, a fixing bracket 126 with a guide structure 162, a first elastic member 114, a second elastic member 124, and a cover plate 130, etc. The fixing bracket 126 is then fixed to the external structure by screws. When the door body assembly 104 is in the closed state, the locking member 112 is extended downward into the fixing opening 146 of the fixing member 106 after the pressing member 164 is pressed, and the door cannot be opened by simply pulling the handle of the door body assembly 104 or simply pressing the door opening key of the door body assembly 104.

When the pressing member 164 is pressed for the first time, the pressing member 164 pushes the moving member 166 to compress the first elastic member 114 and the second elastic member 124, and at the same time, after the moving member 166 moves along the guide structure 162 to the critical point of the tip at the bottom of the guide structure 162, the moving member 166 rotates to the right side in the same direction and is caught at the end of the fixed guide structure 162. In this process, the lower locking member 112 is moved downward along the guide structure 162 by the first elastic force compressed until the lower end of the guide structure 162 is moved, at which time the locking member 112 enters the fixing opening 146 of the fixing member 106, and the locking action of the lock structure is completed.

When the pressing member 164 is pressed for a second time, and at the same time, the pressing member 164 pushes the moving member 166 to move to the critical point position of the tip of the guide structure 162 of the fixing bracket 126, the moving member 166 will return to the inside of the guide structure 162 and will move back to the top along the guide structure 162 due to the spring force provided by the first elastic piece 114 and the second elastic piece 124; at this time, the locking member 112 further moves away from the fixing opening 146 of the fixing member 106, thereby completing the locking operation of the lock structure.

In addition, the locking and unlocking actions of the lock structure are performed by pressing the pressing member 164 so that the locking member 112 enters or leaves the fixing opening 146 of the fixing member 106. To complete the closing of the door body assembly 104, the lock structure must be unlocked.

Furthermore, as shown in FIG. 22, when the door body assembly 104 is in the open state and there is also a false touch on the pressing member 164 to cause the locking assembly 108 to be locked, then in the process of completing the closing of the door body assembly 104, the inclined surface of the fixing member 106 starts to act on the driving inclined surface 120 of the locking member 112 with a vertical inclined surface force, which can be decomposed into a vertical direction and a horizontal direction force, and the vertical direction force can be decomposed to make the locking member 112 have an upward force so that the locking member 112 can compress and move the first elastic member 114 upward. As shown in FIG. 23, when the door body assembly 104 is fully closed, the compressed first elastic member 114 acts on the locking member 112, causing the locking assembly 108 to re-complete locking.

In certain embodiments, the locking assembly 108 and the fixing member 106 can be mounted in a variety of ways. For example, as shown in FIG. 45, the locking assembly 108 may be fitted to the housing of the cavity body assembly 102 by means of screws or the like; as shown in FIG. 46, the locking assembly 108 is also mounted to the end plate 150 of the cavity body assembly 102 by screws or the like. For example, as shown in FIG. 42, the fixing member 106 may be a unitary structure with the door seal 140 of the door body assembly 104; as shown in FIG. 43, the fixing member 106 can also be a separate structure, and is assembled to the door seal 140 of the door body assembly 104 by means of screws or the like; as shown in FIG. 23, the fixing member 106 may also be a separate structure and be fitted to the door body 138 of the door body assembly 104 by screws or the like.

In the present disclosure, the term "plurality" means two or more unless explicitly defined otherwise. The terms "mounted", "connected", "fixed", and the like are used broadly and should be construed to include, for example, "connected" may be a fixed connection, a detachable connection, or an integral connection; "connected" may be directly connected or indirectly connected through an intermediate. The specific meaning of the above terms in the present disclosure can be understood by a person skilled in the art as the case may be.

In the description of the present disclosure, the description of the terms "one embodiment", "some embodiments", "a specific embodiment," etc., mean that a particular feature, structure, material, or characteristic described in connection with the embodiment or example is included in at least one embodiment or example of the present disclosure. In this description, the schematic representations of the terms used above do not necessarily refer to the same embodiment or example. Furthermore, the particular features, structures, materials, or characteristics described may be combined in any suitable manner in any embodiment or example.

The above description is only directed to exemplary embodiments of the present disclosure and is not intended to limit the present disclosure, and various modifications and changes may be made to the present disclosure by those skilled in the art. Any modification, equivalent replacement, or improvement made within the spirit and principle of the present disclosure shall be included in the protection scope of the present disclosure.

What is claimed is:

1. A lock structure comprising:
- a fixing member; and
- a locking assembly comprising:
  - a mount;
  - a driving member, at least a portion of the driving member being provided within the mount;
  - a first elastic member, a first end of the first elastic member being connected to the driving member;
  - a locking member connected to a second end of the first elastic member, and the locking member being capable of moving relative to the mount under driving of the driving member and the first elastic member, and being locked to or separated from the fixing member; and a guide structure provided on the mount, at least a portion of the driving member being movable along the guide structure and restrained at an end of the guide structure, wherein the driving member comprises:

a pressing member provided through the mount and movably connected to the mount, wherein the pressing member comprises a first inclined surface; and a moving member slidingly connected to the guide structure, the moving member being connected to the first end of the first elastic member, the moving member being capable of being restrained to the end of the guide structure, wherein the moving member comprises a second inclined surface, and the first inclined surface can abut against the second inclined surface to drive the moving member to drive the locking member to switch a station of the locking member.

2. The lock structure according to claim 1, wherein:

the moving member comprises a sliding jaw sleeve;

a sidewall of the sliding jaw sleeve is provided with a first protruding portion which is slidably connected to the guide structure and can abut against the end of the guide structure; and the second inclined surface is provided on the first protruding portion.

3. The lock structure according to claim 1, wherein:

an interior of the moving member is hollow, a sidewall of the moving member is provided with a guide groove, and an extending direction of the guide groove coincides with a moving direction of the locking member; and at least a portion of the locking member is located in the moving member, and a sidewall of the locking member is provided with a second protruding portion slidably connected to the guide groove.

4. The lock structure according to claim 1, wherein the locking member further comprises:

a driving inclined surface abutting against the fixing member to drive the locking member to move relative to the mount.

5. The lock structure according to claim 1, wherein the locking assembly further comprises:

a second elastic member provided in the mount and connected to the driving member and the mount for moving the locking member back, wherein at least a portion of the first elastic member is located inside the locking member, and the second elastic member is sleeved on the locking member.

6. The lock structure according to claim 1, wherein the mount further comprises:

a fixing bracket;

a first opening provided in the fixing bracket, wherein the driving member is provided through the first opening;

a cover plate connected to the fixing bracket; and a second opening provided in the cover plate, wherein the locking member can be provided through the second opening.

7. A cooking appliance comprising:

a cavity body assembly;

a door body assembly in an open-close connection with the cavity body assembly; and the lock structure according to claim 1, wherein the fixing member is provided in one of the cavity body assembly and the door body assembly, and the locking assembly is provided in the other of the cavity body assembly and the door body assembly.

8. The cooking appliance according to claim 7, wherein the cavity body assembly comprises:

a cavity body; and a cover body surrounding at least a portion of the cavity body.

9. The cooking appliance according to claim 8, wherein the mount is connected to the cavity body based on the locking assembly being provided in the cavity body assembly.

10. The cooking appliance according to claim 8, wherein the mount is connected to the cover body based on the locking assembly being provided in the cavity body assembly.

11. The cooking appliance according to claim 8, wherein the fixing member is connected to the cavity body based on the fixing member being provided in the cavity body assembly.

12. The cooking appliance according to claim 8, wherein the fixing member is connected to the cover body based on the fixing member being provided in the cavity body assembly.

13. The cooking appliance according to claim 7, wherein the door body assembly comprises:

a door body;

a door seal connected to the door body; and a lock catch provided on the door body or the door seal for an open-close connection with the cavity body assembly.

14. The cooking appliance according to claim 13, wherein the fixing member is connected to the door body or connected to the door seal based on the fixing member being provided on the door body assembly.

15. The cooking appliance according to claim 13, wherein the fixing member is of an integrated structure with the door body or an integrated structure with the door seal based on the fixing member being provided on the door body assembly.

16. The cooking appliance according to claim 13, wherein the mount is connected to the door body or connected to the door seal based on the locking assembly being provided on the door body assembly.

17. The cooking appliance according to claim 13, wherein the mount may be of an integrated structure with the door body or an integrated structure with the door seal based on the locking assembly being provided on the door body assembly.

18. The cooking appliance according to claim 7, wherein the cooking appliance comprises a wave oven, an oven, a steaming box, or a steaming and roasting integrated machine.

19. A lock structure comprising:

a fixing member; and a locking assembly comprising:

a mount;

a driving member, at least a portion of the driving member being provided within the mount;

a first elastic member, a first end of the first elastic member being connected to the driving member;

a locking member connected to a second end of the first elastic member, and the locking member being capable of moving relative to the mount under driving of the driving member and the first elastic member, and being locked to or separated from the fixing member; and a second elastic member provided in the mount and connected to the driving member and the mount for moving the locking member back, wherein at least a portion of the first elastic member is located inside the locking member, and the second elastic member is sleeved on the locking member.

20. A lock structure comprising:

a fixing member; and a locking assembly comprising:

a mount;

a driving member, at least a portion of the driving member being provided within the mount;

a first elastic member, a first end of the first elastic member being connected to the driving member;

a locking member connected to a second end of the first elastic member, and the locking member being capable of moving relative to the mount under driving of the driving member and the first elastic member, and being locked to or separated from the fixing member; and a fixing bracket;

a first opening provided in the fixing bracket, wherein the driving member is provided through the first opening;

a cover plate connected to the fixing bracket; and a second opening provided in the cover plate, wherein the locking member can be provided through the second opening.

* * * * *